(12) United States Patent
Hinque et al.

(10) Patent No.: US 8,955,567 B2
(45) Date of Patent: *Feb. 17, 2015

(54) AIR MAINTENANCE TIRE AND INTEGRAL PUMP ASSEMBLY

(75) Inventors: Daniel Paul Luc Marie Hinque, Habay-le-Neuve (BE); Gilles Bonnet, Niederfeulen (LU); Olivier Di Prizio, Hettange-Grande (FR); Michel Jacques Albert Ghislain Meunier, Gouvy (BE); Germain Dehez, Gouvy (BE)

(73) Assignees: Richard B. O'Planick; The Goodyear Tire & Rubber Company

( * ) Notice: Subject to any disclaimer, the term of this patent is extended or adjusted under 35 U.S.C. 154(b) by 482 days.

This patent is subject to a terminal disclaimer.

(21) Appl. No.: 13/332,952

(22) Filed: Dec. 21, 2011

(65) Prior Publication Data
US 2013/0160917 A1 Jun. 27, 2013

(51) Int. Cl.
*B60C 23/00* (2006.01)
*B60C 23/10* (2006.01)
*B60C 19/00* (2006.01)

(52) U.S. Cl.
USPC .......................................... 152/450; 152/415

(58) Field of Classification Search
None
See application file for complete search history.

(56) References Cited

U.S. PATENT DOCUMENTS

| | | | |
|---|---|---|---|
| 1,050,886 A | 1/1913 | Wetherell | |
| 1,134,361 A | 4/1915 | Wetherell | |
| 3,304,981 A | 2/1967 | Sheppard | 152/426 |
| 3,833,041 A | 9/1974 | Glad et al. | 152/347 |
| 4,922,984 A | 5/1990 | Dosjoub et al. | 152/415 |
| 5,052,456 A | 10/1991 | Dosjoub | 152/415 |
| 7,117,731 B2 | 10/2006 | Hrabal | 73/146 |
| 7,225,845 B2 | 6/2007 | Ellmann | 152/426 |
| 8,042,586 B2 | 10/2011 | Losey et al. | 152/426 |

(Continued)

FOREIGN PATENT DOCUMENTS

| | | | | |
|---|---|---|---|---|
| CN | 1111575 | 11/1995 | | B60C 23/10 |
| DE | 3433318 | 9/1984 | | B60C 23/00 |
| DE | 3433318 | 3/1986 | | B60C 23/12 |

(Continued)

OTHER PUBLICATIONS

European Search Report received by Applicants Dec. 16, 2013.

(Continued)

*Primary Examiner* — Justin Fischer
(74) *Attorney, Agent, or Firm* — Richard B. O'Planick

(57) ABSTRACT

An air maintenance tire includes a tire carcass; a flexible tire component strip such as a chafer component forming a portion of the tire carcass, the tire component strip having a channel formed within an upper surface defined by opposed strip lip portions and a channel bottom wall; an air passageway within the flexible tire component extending between air inlet and air outlet cavities in the flexible tire component, the air passageway extending at least a partial circumferential path around the tire carcass; and an elongate passageway-shaping strip assembly occupying and enclosed within the air passageway of the flexible tire component, the passageway-shaping strip assembly operative forming and maintaining the air passageway to a cross-sectional configuration replicating a cross-sectional configuration of the passageway-shaping strip assembly. The passageway-shaping strip is removable from the air passageway in a post-cure procedure to make the air passageway unobstructed and in a preferred cross-sectional configuration.

17 Claims, 73 Drawing Sheets

(56) References Cited

U.S. PATENT DOCUMENTS

| | | | |
|---|---|---|---|
| 2009/0294006 A1 | 12/2009 | Hrabal | 152/426 |
| 2010/0243121 A1 | 9/2010 | Elgenbrode | 152/419 |

FOREIGN PATENT DOCUMENTS

| | | | |
|---|---|---|---|
| DE | 3711785 | 10/1988 | B60C 5/20 |
| DE | 3881591 | 9/1993 | B60C 23/00 |
| DE | 4323835 | 1/1995 | B60C 23/00 |
| DE | 102007018437 | 12/2007 | B60C 23/16 |
| EP | 1648721 | 11/2006 | B60C 23/00 |
| EP | 2025535 | 2/2009 | B60C 23/00 |
| EP | 2338703 | 6/2011 | B60C 29/04 |
| EP | 2384912 | 11/2011 | B60C 23/12 |
| WO | 2007/134556 | 11/2007 | B60C 23/00 |
| WO | 2010/008338 | 1/2010 | B60C 23/12 |

OTHER PUBLICATIONS

European Search Report recieved by Applicants May 10, 2013.

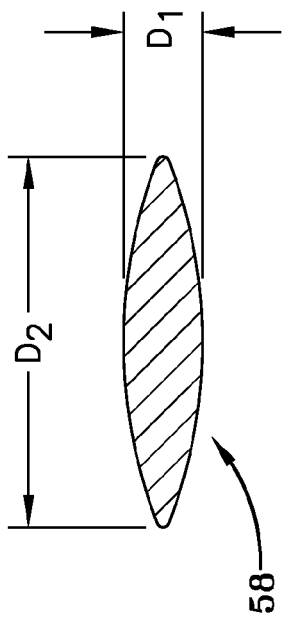
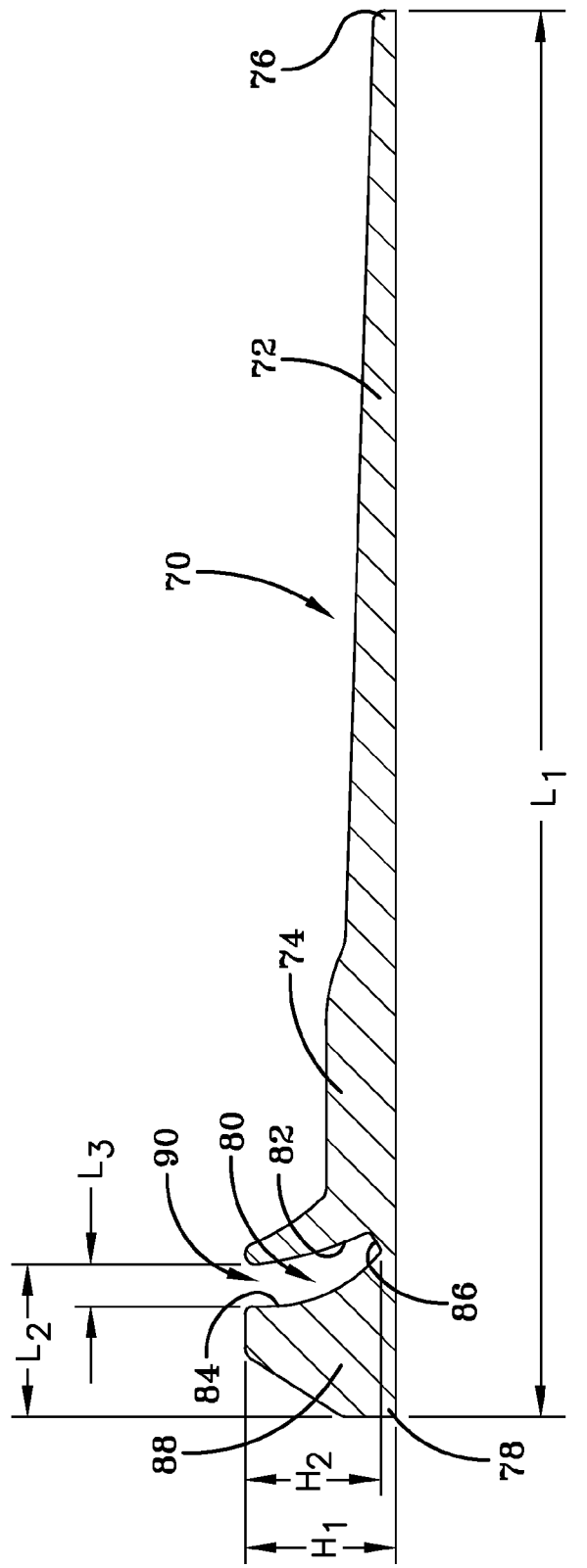

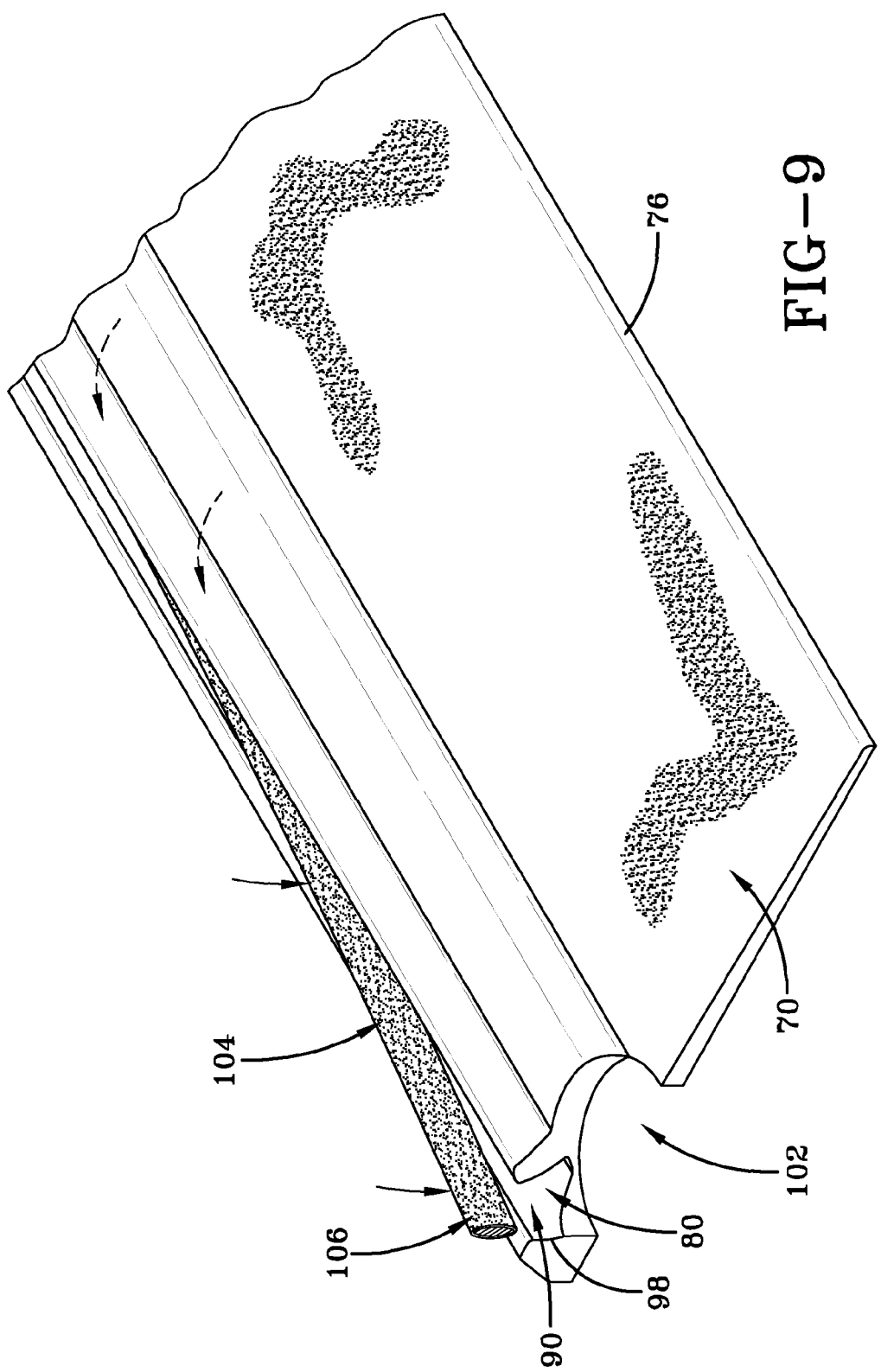

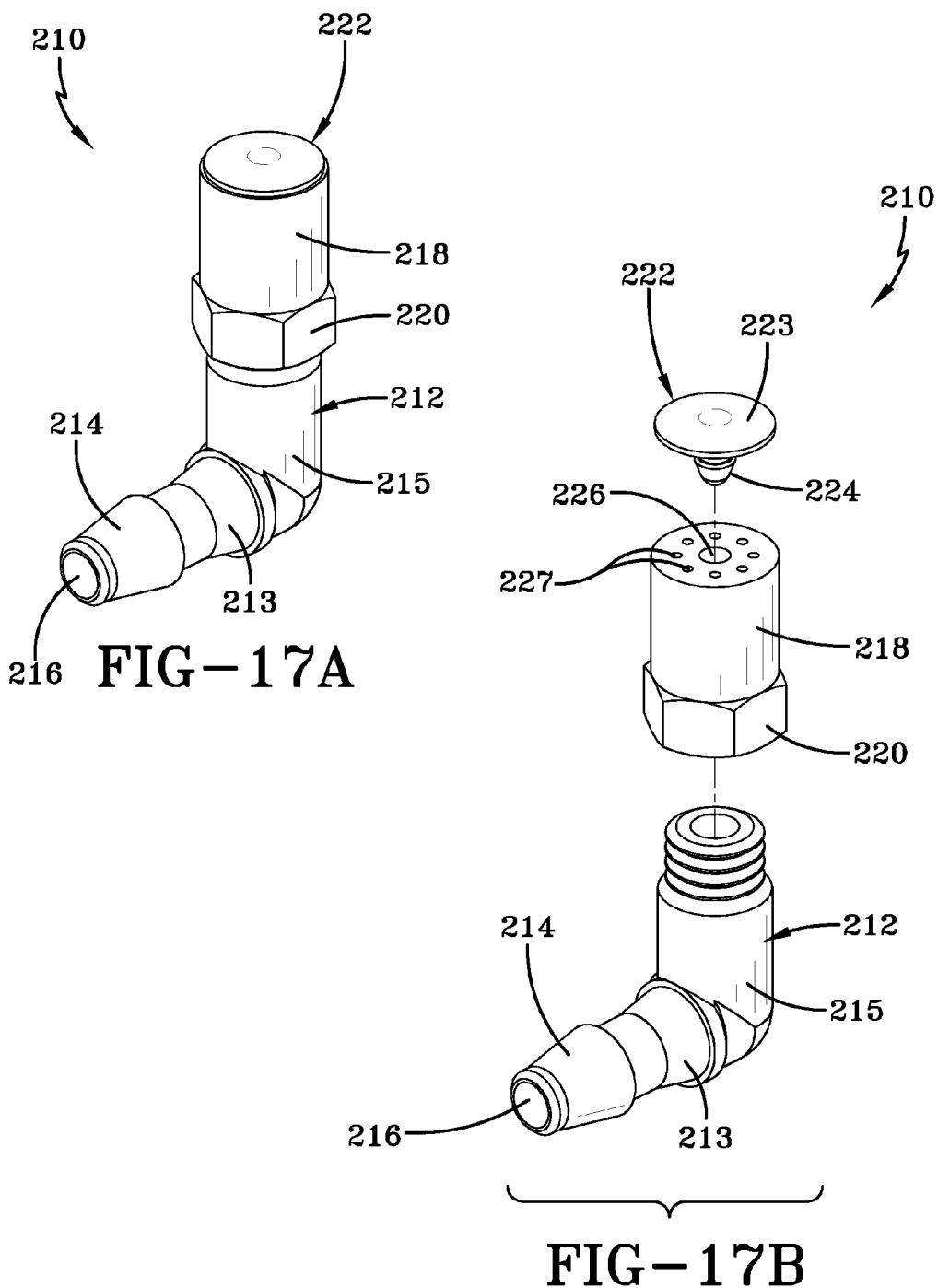

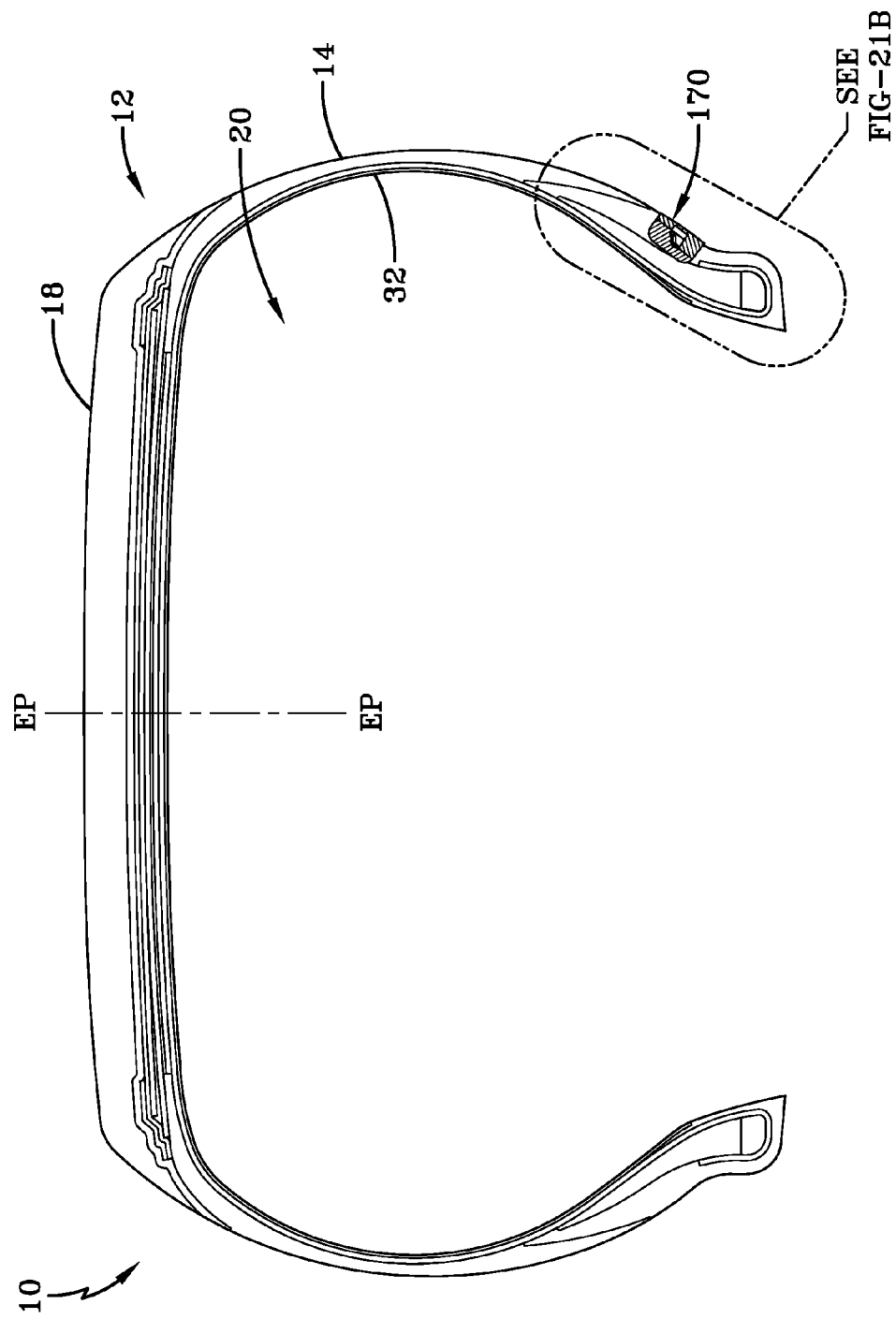

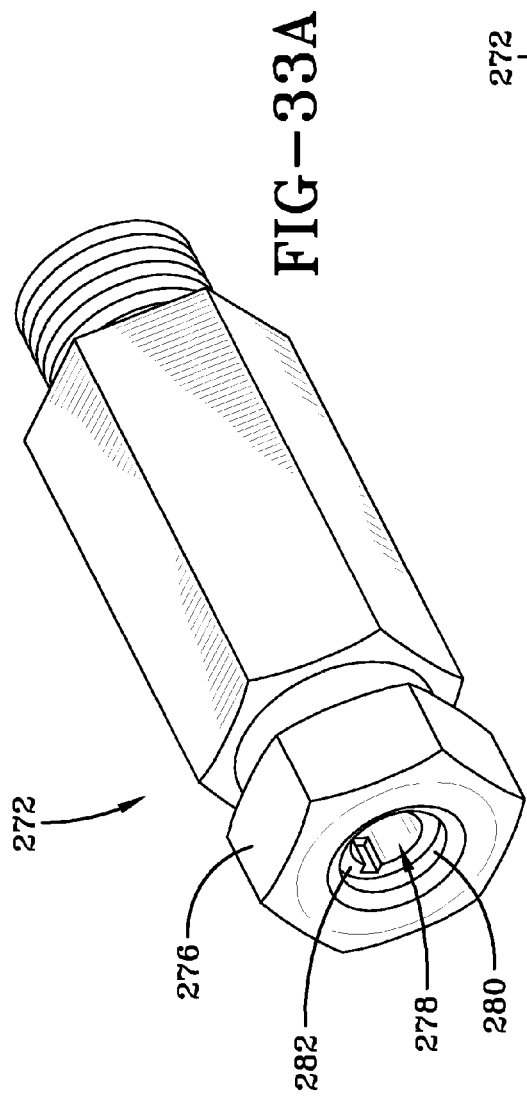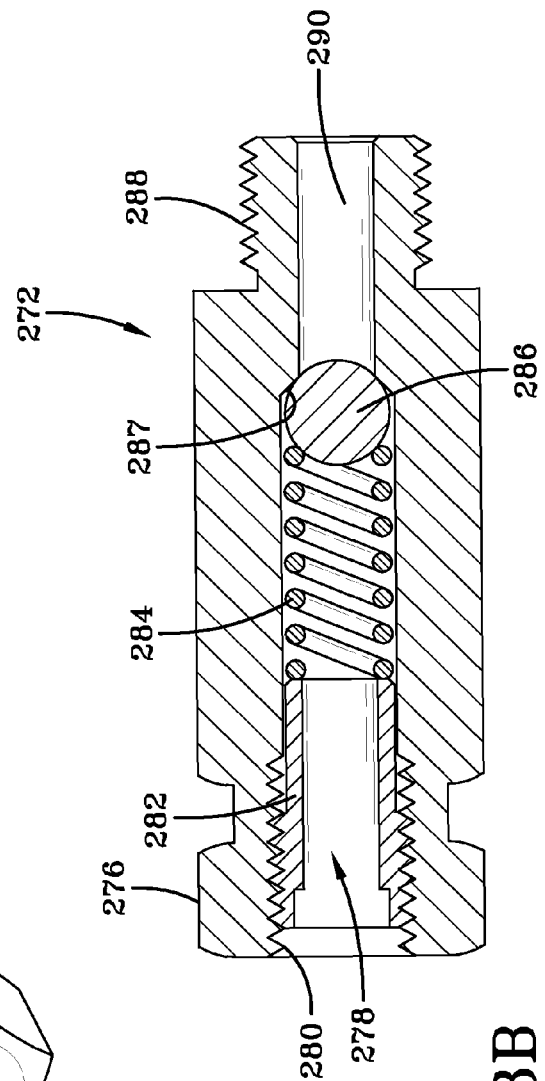

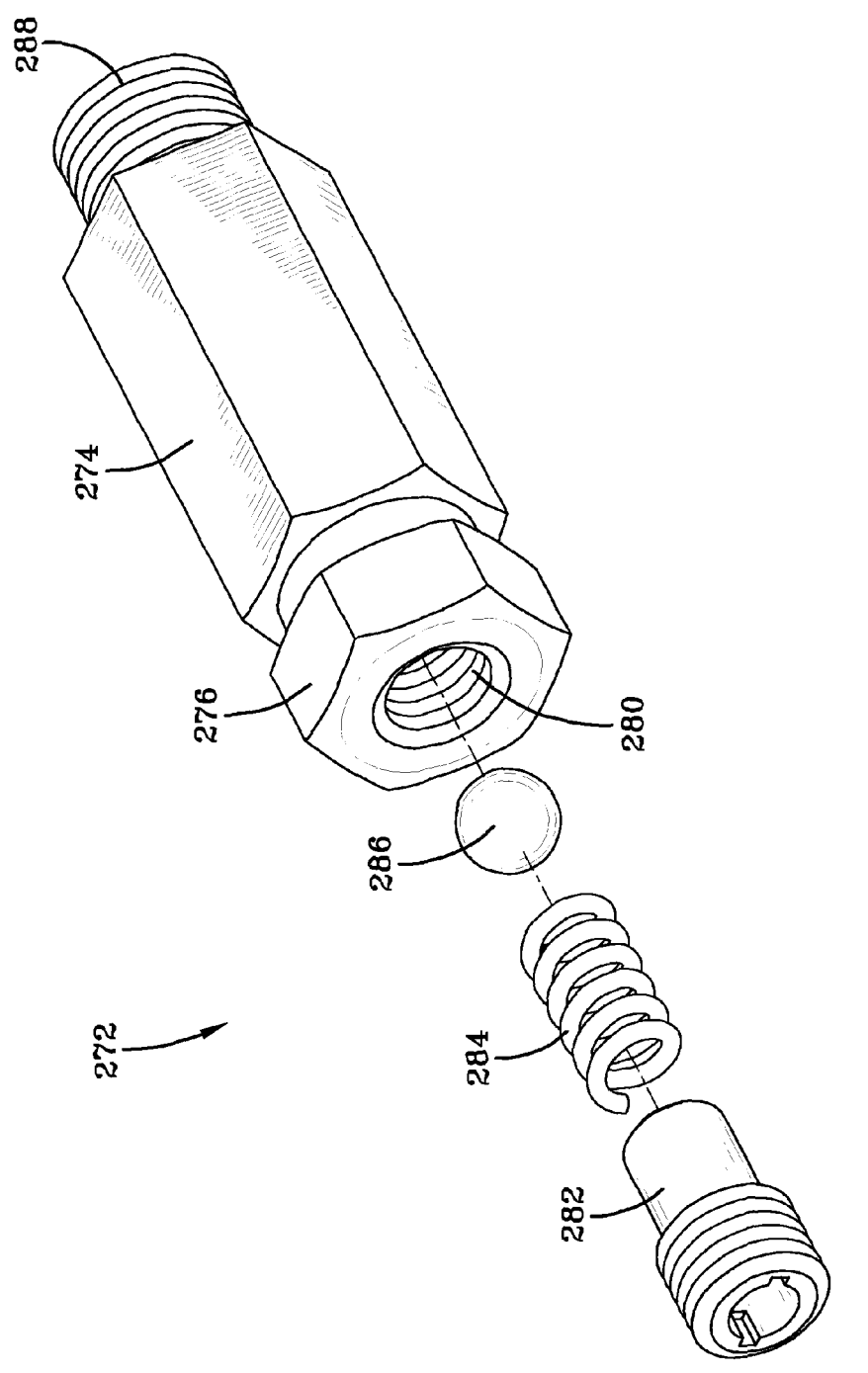

AIR MAINTENANCE TIRE AND INTEGRAL PUMP ASSEMBLY

FIELD OF THE INVENTION

The invention relates generally to air maintenance tires and, more specifically, to an integral pumping assembly in a tire.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will re-inflate the tire in order to compensate for normal air diffusion over time without the need for driver intervention

SUMMARY OF THE INVENTION

In one aspect of the invention, an air maintenance tire includes a tire carcass; a flexible tire component strip forming a portion of the tire carcass, the tire component strip having a channel formed within an upper surface defined by opposed strip lip portions and a channel bottom wall; an air passageway within the flexible tire component extending between an air inlet cavity and an air outlet cavity in the flexible tire component, the air passageway extending at least a partial circumferential path around the tire carcass; and an elongate passageway-shaping strip assembly occupying and enclosed within the air passageway of the flexible tire component, the passageway shaping strip assembly operative to form and maintain the air passageway to a cross-sectional configuration replicating a cross-sectional configuration of the passageway-shaping strip assembly.

In another aspect, the passageway-shaping strip is removable from the air passageway and includes a free end portion accessible to at least one of the air inlet and air outlet cavities, whereby the passageway-shaping strip may be removed by a longitudinal end-to-end withdrawal force application to the free end portion of the passageway-shaping strip.

According to another aspect, the passageway-shaping strip has a substantially elliptical cross-sectional configuration and is structured having a core composed of a silicone material encased by a sheath composed of a release material such as a rubber composition.

The flexible tire component may, in yet another aspect, embody a chafer component strip which increases in sectional thickness from a radially outward region to a radially inward region, the channel residing within the radially inward region.

DEFINITIONS

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tire wall that may extend circumferentially or laterally about the tire wall. The "groove width" is equal to its average width over its length. A groove is sized to accommodate an air tube as described.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which:

FIG. 5 is a dimensioned sectioned view of the silicone core.

FIG. 6 is a dimensioned sectioned view of extruded chafer strip.

FIG. 9 is an enlarged perspective view of the silicone core strip being assembled into the chafer strip.

FIG. 17A shows an alternative embodiment of threaded elbow and one-way valve assembly.

FIG. 17B is an exploded view of FIG. 17A showing the elbow valve housing with air passage ways and membrane cover.

FIG. 21A is a section view taken from FIG. 20 showing the inlet core location.

FIGS. 33A through 33C are detailed views of a second embodiment outlet valve.

DETAILED DESCRIPTION OF THE INVENTION

Figure 1:
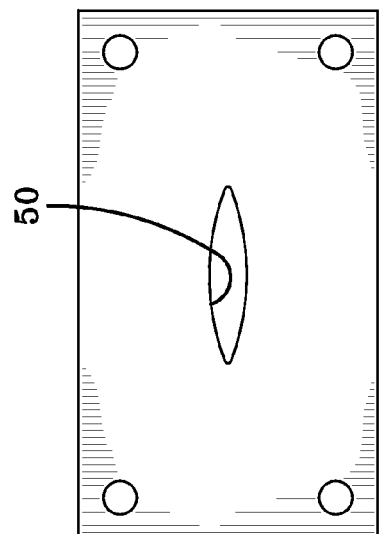
FIG. 1 is a detail view of the silicone core die.
Figure 2:
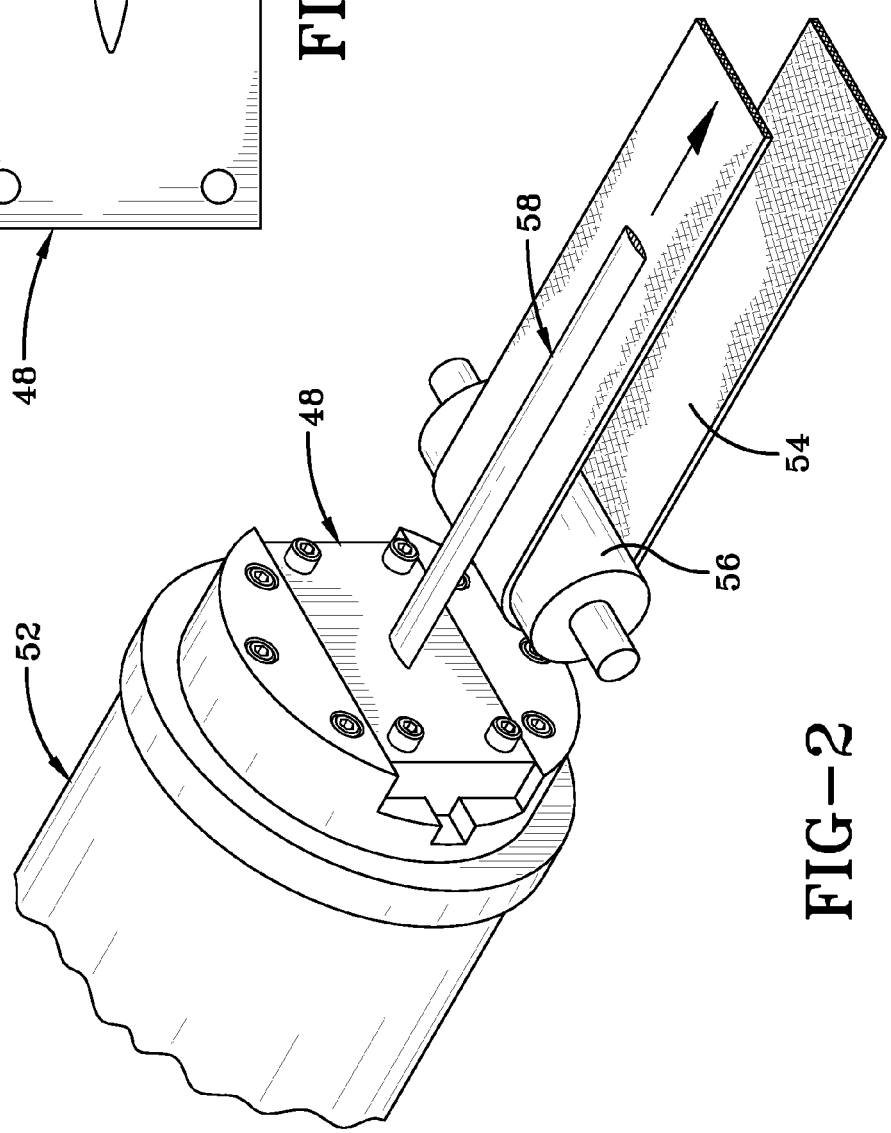
FIG. 2 is a perspective view of a basic silicone core extruder and conveyor.

Referring initially to FIGS. 38, 41, 44, 42A and 42B, an air maintenance assembly and tire system 10 is shown. The system incorporates air maintenance apparatus with a tire for the purpose of maintaining air pressure within the tire at a desired level without operator intervention. The system 10 includes a tire 12 of generally conventional construction and including a pair of sidewall components 14, 16 and a tread 18 enclosing a tire cavity 20. The sidewalls 14, 16 extend from a pair of tire beads 22, 24 to the tread 18. Pursuant to conventional construction, the tire 12 has an apex component 26 disposed radially adjacent each bead and a chafer component 28 surrounding each bead region. The tire 12 mounts to a wheel 36 and is seated on a rim surface 40. An air maintenance assembly 42, as will be explained, may be provided within one or both sides of the tie 12 if desired. Each air maintenance assembly 42 is configured to extend between an air entry or inlet cavity 44 and an air exit/outlet cavity 46. Pursuant to the invention, the air maintenance assembly 42 incorporates a thin tube as a hollow within a flexible tire component such as the chafer 28 during tire construction. The location selected for the hollow tube within the tire is in a tire component residing within a high flex region of the tire sufficient to progressively collapse the peristaltic internal tire tube as the tire rotates, whereby forcing air along the tube from the inlet to the outlet where the air is directed to the tire cavity for pressure maintenance. The AMT assembly 42 thus operates as an internal peristaltic air pump to the tire.

Figure 3:
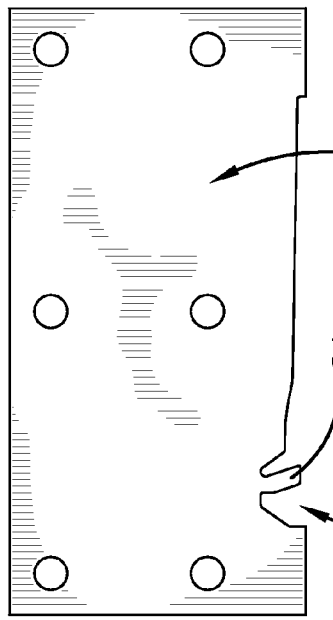
FIG. 3 is a detail of a chafer die.
Figure 4:
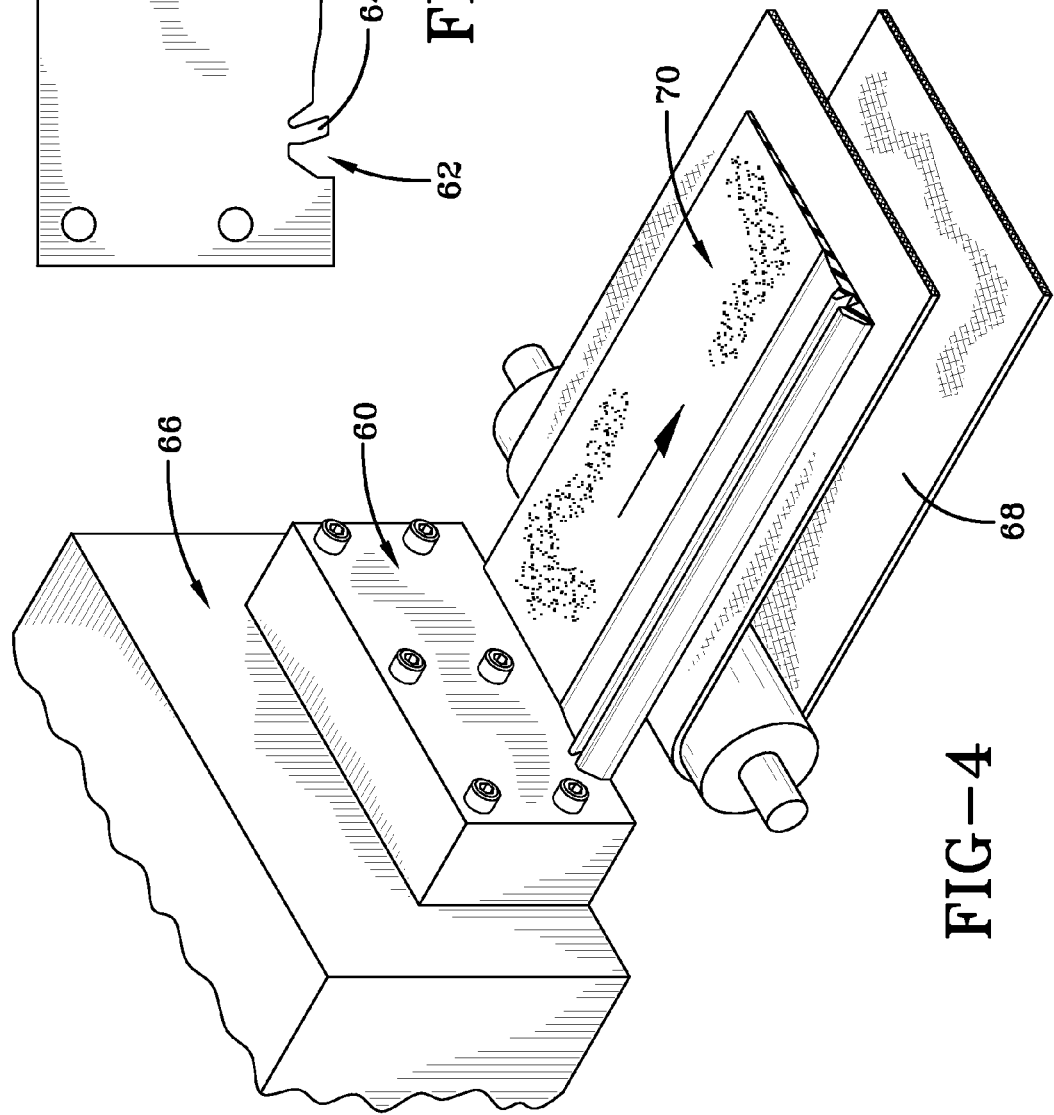
FIG. 4 is a perspective view of a basic chafer strip extruder and conveyor.

With reference to FIGS. 1, 2, 3, 4, 5 and 6, a silicone core strip 58 is formed by means of die 48 having a profiled orifice 50 therethrough. The orifice is elongate and generally lens shaped in section with the extruded strip 58 of like sectional geometry. The lens shape may have a dimension of, by way of example without limitation intent, 2.7 mm length D2×0.5 mm at D1. While the preferred composition of the strip 58 is silicone, other materials such as cable or monofilament may be used if desired. The die 48 is affixed to a basic extruder of conventional configuration and deposits a formed core strip 58 on a conveyer belt moved by drive roller 56. The length of the strip 58 is predetermined as will be appreciated from the explanation following. As shown in FIGS. 3 and 4, a chafer strip 70 is formed by extrusion die 60 affixed to extruder 66 and deposited on roller 68. The die 60 is formed having along a chafer forming opening 62 along a bottom side and a downward projection finger 64 projecting into the opening 62. FIG. 6 shows a sectioned view of the extruded chafer strip. As seen, the strip 70 widens in section from a low width or thinner end region 72 to a stepped wider or thicker region 74 to a wider or thicker opposite region 88. The die finger 64 forms an incut, arching chafer channel or tube 80 extending the length of the chafer strip, defined by channel sidewalls 82, 84 and bottom wall 86. The channel is open initially as shown at 90. Representative dimensions as seen in FIG. 6 are within a range of 25 to 100 mm; L2=13+/−10; L3=1+/−0.5; H1=5+/−4; and H2=4.5+/−4; however the chafer strip dimensions may be varied to suit the particular tire sizing needs and the tire construction characteristics desired. In addition, if so desired, the silicone strip 58 may be molded instead of extruded.

Figure 7A:
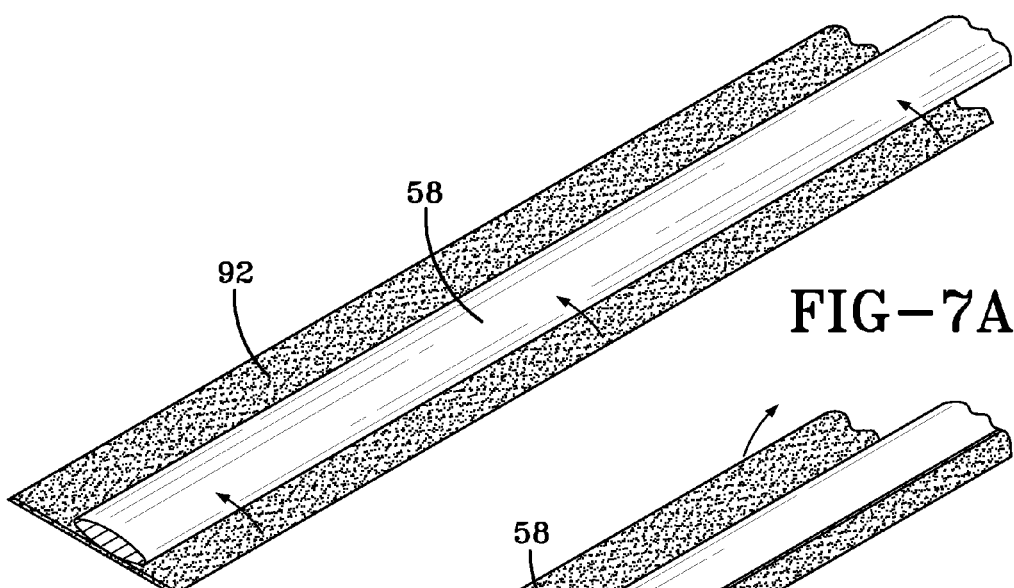
FIGS. 7A through 7C are detailed views showing the silicone core strip being coated with soft rubber gum strip.
Figure 7B:
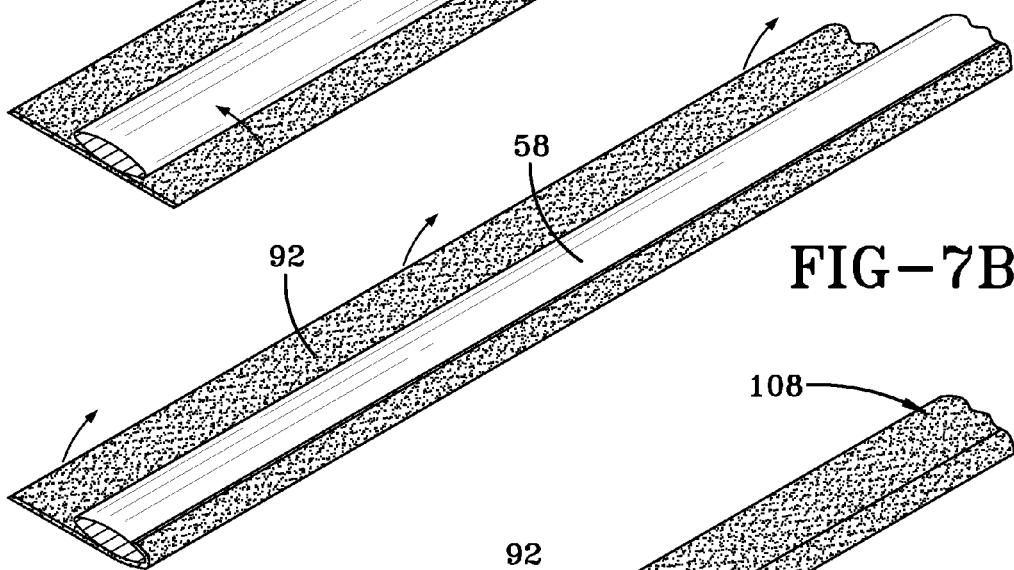
Figure 7C:
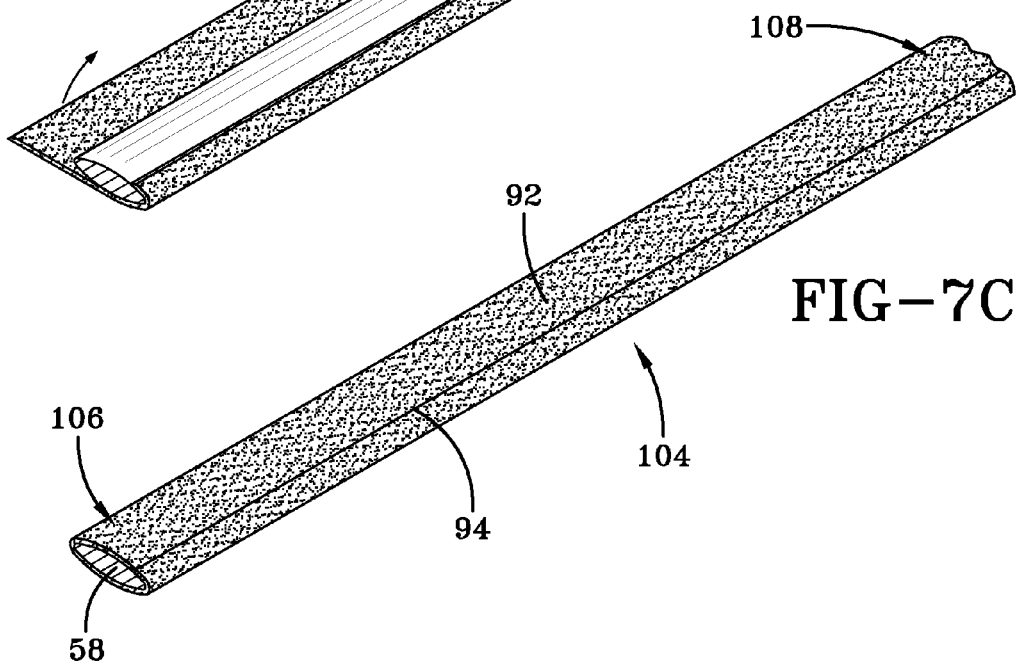
Figure 8:
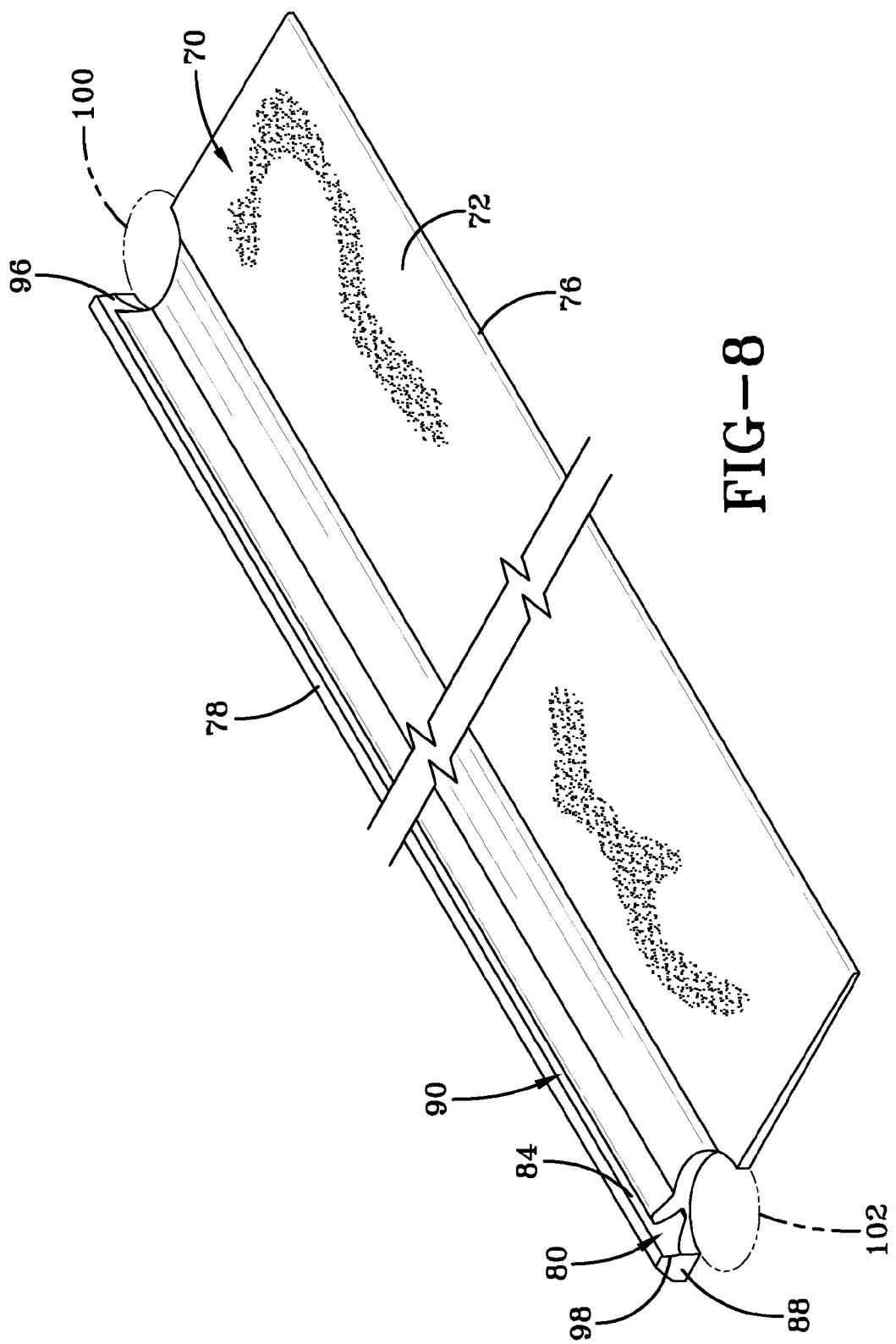
FIG. 8 is a detail view of the chafer strip with punched hole locations.

A flexible tire component, such as a chafer segment, is provided with a groove 80, as best seen in section from FIG. 6, is defined by groove lips 82, 84 that angle inwardly from top to bottom to a bottom groove wall 86. The groove 80, formed within a axially outward thicker side 88 of the chafer strip is accordingly open at groove opening 90. The groove 80 formed within the chafer is as a result angles axially outward from the opening 90 to the bottom wall 86 at an acute angle θ preferably within a range of −20 to +20 degrees. As shown in FIGS. 7A through 7C, the silicone strip 58 can be enveloped within an outer sheath or covering 92 formed of rubber gum or other suitable material. The rubber gum strip 92 is folded over the strip 58 to form an overlap seam 94 to enclose the silicone strip 58 and thus forms therewith a sheathed silicone strip assembly 104. The strip assembly 104, as explained following, will be used to form peristaltic tube within a green tire during green tire construction. The general purpose of strip assembly 104 is to form within a green tire component, such as chafer 28, a core air passageway which, once the strip assembly is removed, forms a peristaltic tube integrally within and enclosed by the tire component. The angled groove 80 is formed within the chafer strip as a slot, with the lips 82, 84 in a close opposed relationship. The groove 80 is then opened to receive the strip assembly 104 by an elastic spreading apart of groove lips 82, 84. Thereafter, the assembly 104 is positioned downward into the groove 80 until reaching a position adjacent to the bottom wall 86. A release of the lips 82, 84 causes the lips to elastic resume their close opposed original orientation. The lips 82, 84 are then stitched together in a rolling operation wherein a roller (not shown) presses the lips 82, 84 into the closed orientation shown in FIGS. 6 and 8 and become entrapped within the chafer strip by a folding over the chafer strip over the top as seen in FIG. 10C. The angle θ of the channel 80 with respect to a bottom surface of the chafer strip enables a complete capture of the silicone strip assembly 104 within the tire component, chafer 28, entirely surrounded by the chafer strip material composition.

Figure 10A:
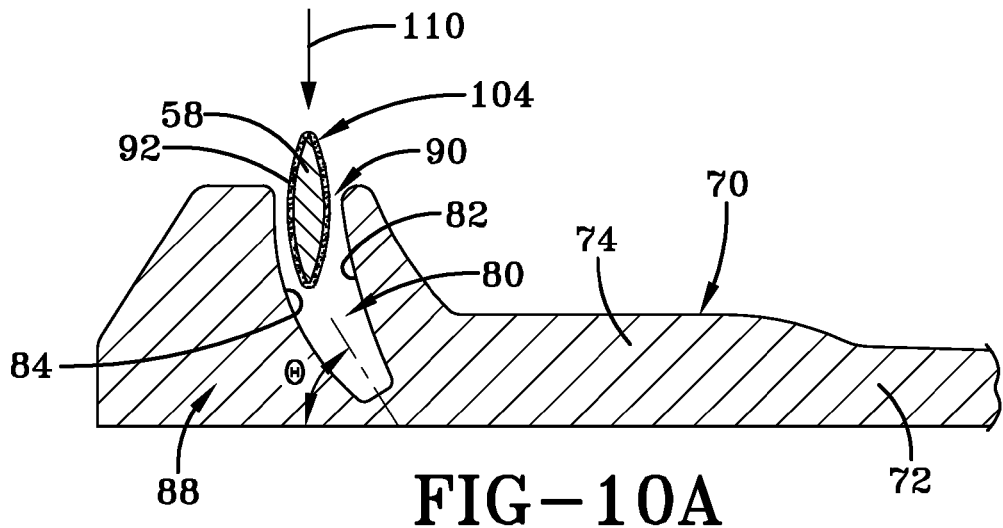
FIGS. 10A through 10C are sectioned views showing the coated silicone core and the chafer strip assembly.
Figure 10B:
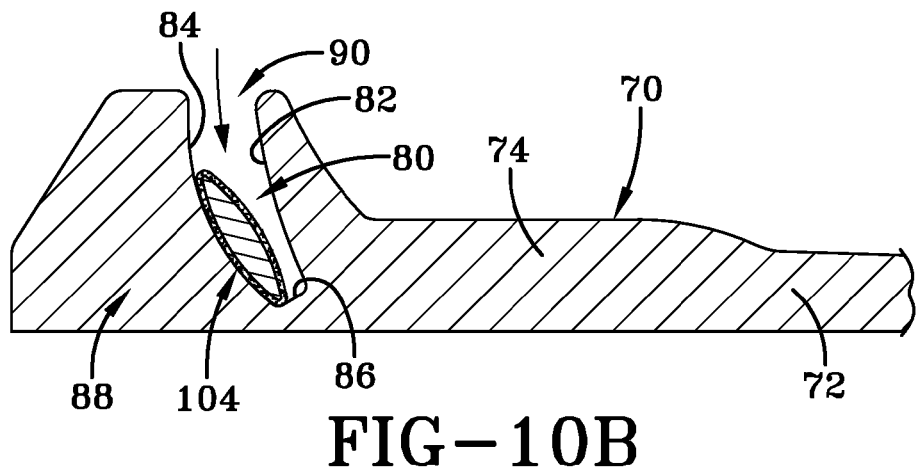
Figure 10C:
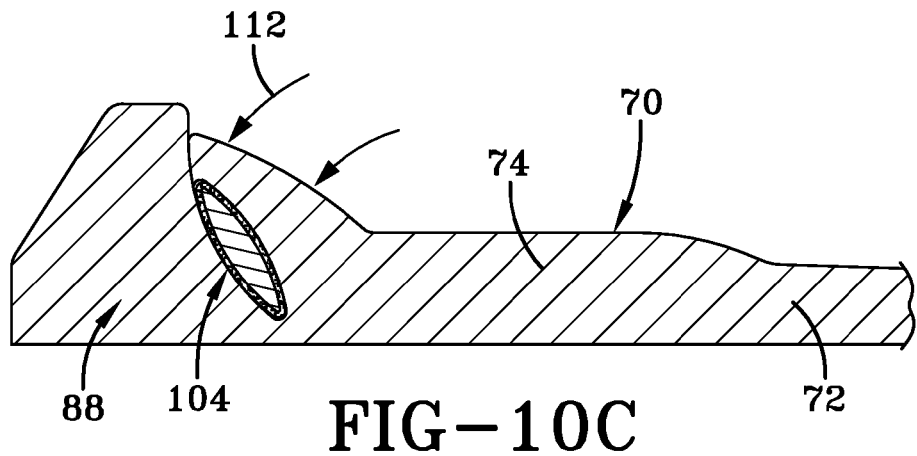

With reference to FIGS. 8, 9, 10A through 10C and 7A through 7C, the channel 80 is destined to become the tube component to a peristaltic pump assembly within the tire chafer 70 and generally extends from chafer strip end 96 to end 98. The chafer is cut at a given length depending on the pump length that is desired when the tire is cured. Formed within each end of the chafer by a punching operation or cutting operation are enlarged diameter circular holes 100, 102. The holes 100, 102 are adjacent the ends of the channel 80 and are sized to accommodate receipt of peristaltic pump inlet and outlet devices as will be explained. The lips 82, 84 of the chafer channel 80 are pulled apart. The wrapped silicone strip assembly 104 is inserted at direction arrow 110 into the channel 80 as shown in FIGS. 10A through 10C until adjacent and contacting the lower wall 86 of the channel 80. Thereupon, the silicone strip assembly 104 is enclosed by the chafer by a folding over of the chafer lip flap 82 in direction 112. The channel 80 is thus closed and subsequently stitched in the closed position by a pair of pressure contact rolls (not shown). So enclosed, the assembly 104 will preserve the geometry of the channel 80 from green tire build until after tire cure when the assembly 104 is removed. The silicone strip assembly 104 is dimensioned such that assembly ends 106, 108 extend free from the chafer strip 70 and the chafer strip channel 80, and extend a distance beyond the punched holes 100, 102 at opposite ends of the chafer strip.

Figure 11A:
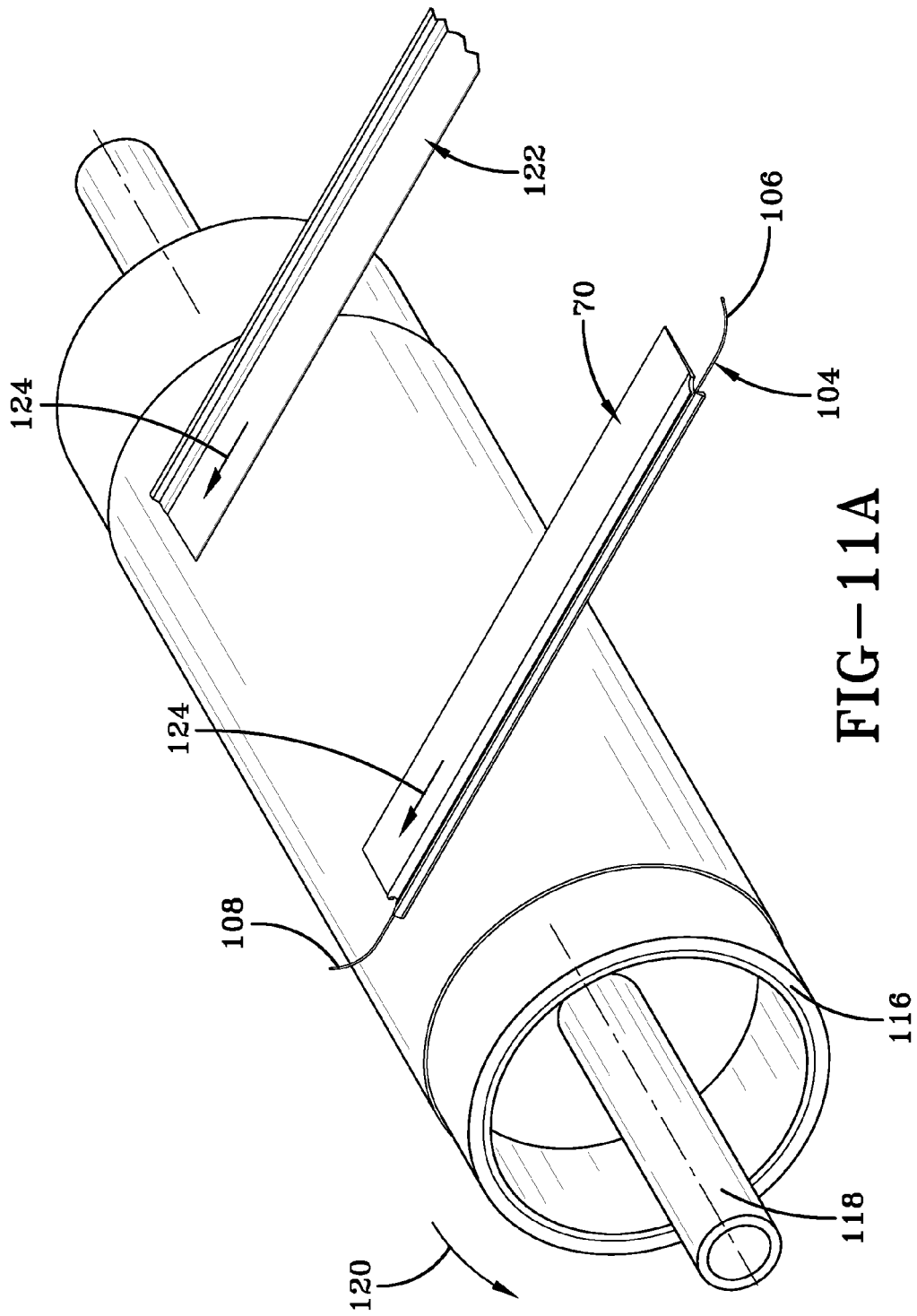
FIG. 11A is a perspective view of a tire build up drum with assembled 180 degree core/chafer strip being applied, with a normal chafer strip placement on opposite end.
Figure 11B:
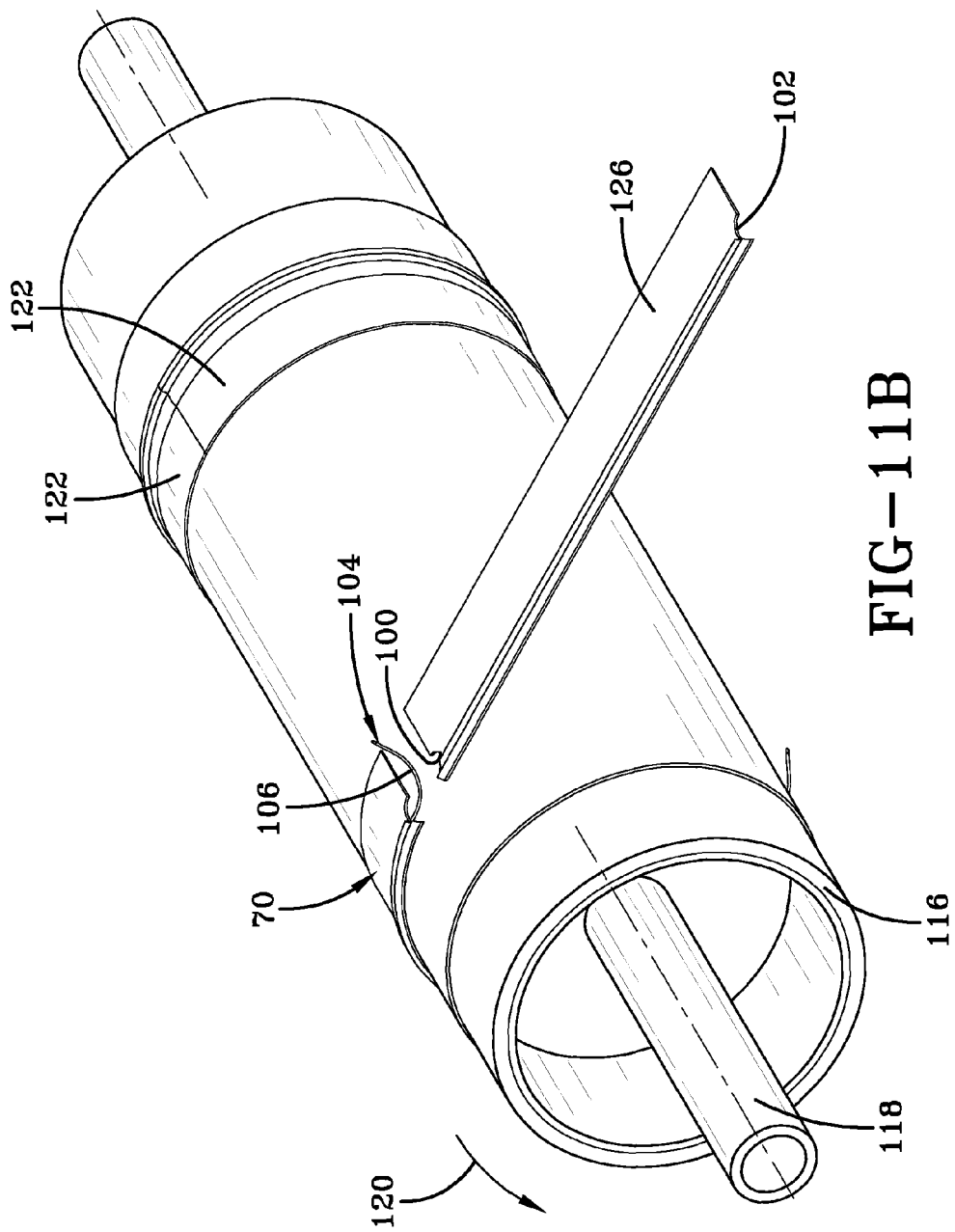
FIG. 11B is a perspective view of a tire build up drum with a normal 180 degree chafer strip being placed abutting the 180 degree core/chafer strip.
Figure 12:
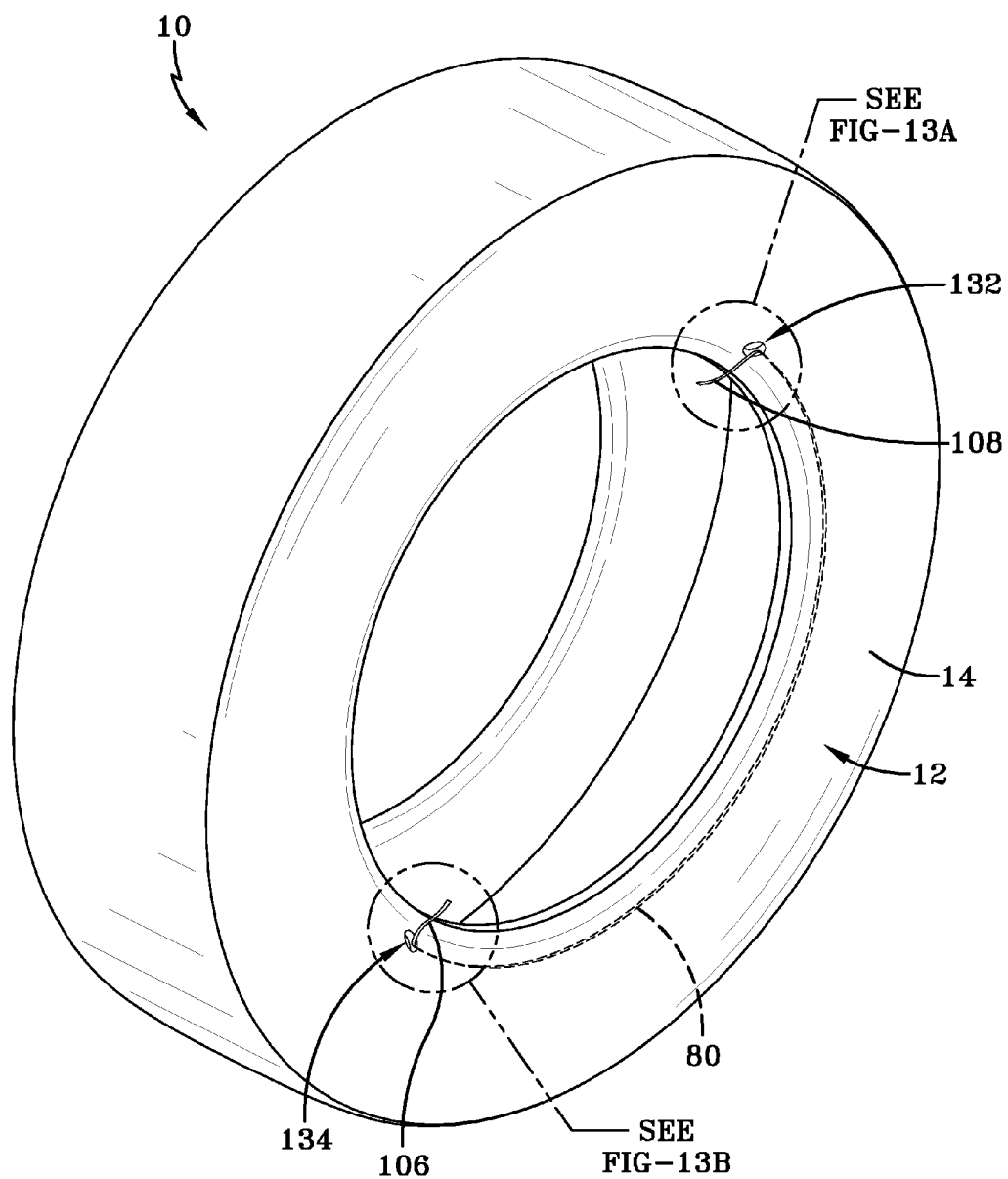
FIG. 12 is a perspective front view of a formed green tire showing inlet and outlet locations with the core strip extending from openings and the tire ready for core forming devices.
Figure 13A:
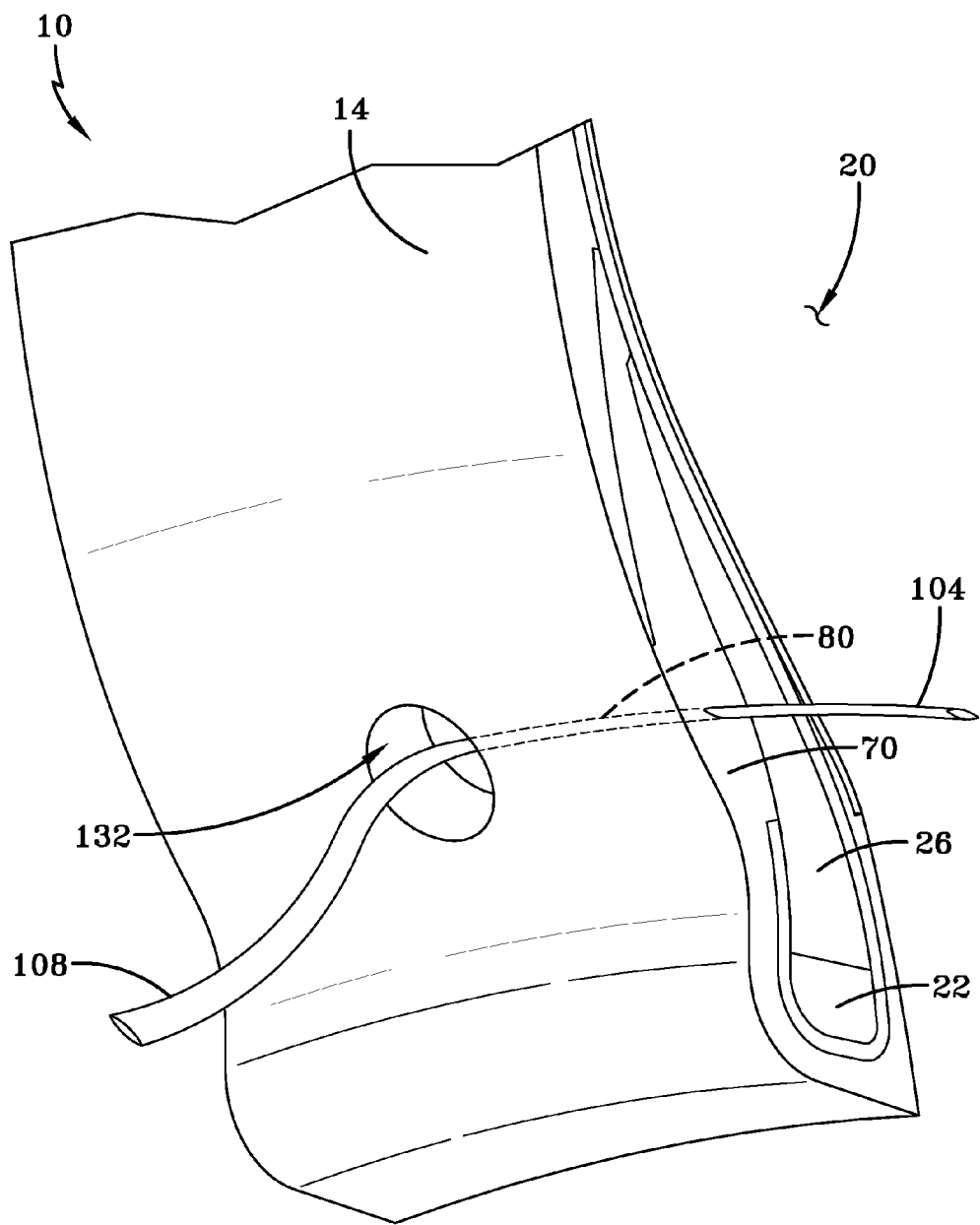
FIG. 13A is an enlarged sectioned view showing the inlet cavity and the silicone core ready for placement of the inlet core device.
Figure 13B:
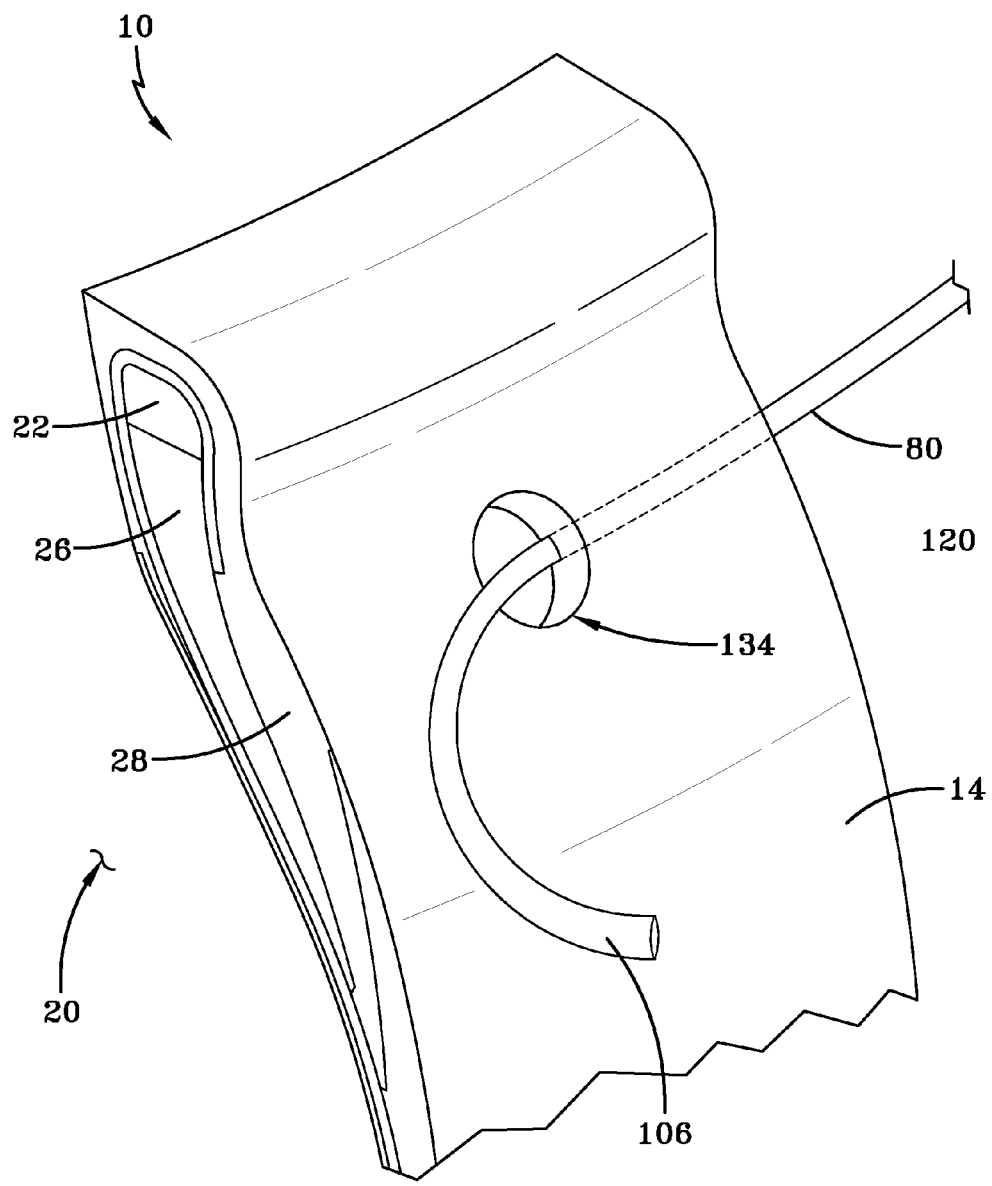
FIG. 13B is an enlarged sectioned view showing the outlet cavity and the silicone core ready for placement of the outlet core device.

Referring to FIGS. 11A, 11B and 12, a conventional green tire building station is depicted to include a build drum 116 rotational about an axial support 118. The chafer strip 70 containing silicone strip assembly 104 and an opposite chafer strip 122 that does not incorporate a strip assembly 104 are positioned along opposite sides of the build drum 116 in direction 124 in an initial 180 degree chafer build-up. The chafer strip 70 is thus combined with a normal chafer strip 126 length to complete the circumference. The second strip 126 is applied to the building drum in alignment with and abutting strip 70 as shown in FIG. 11B to complete a 360 degree chafer construction on the drum. The opposite side of the drum receives two 180 degree normal strips 122 in abutment to complete the chafer build on that side. It will be noted that the chafer strip 70 contains the silicone strip assembly while the abutting strip 126 does not. However, if desired, both of the chafer strips 70, 126 as well as one or both of the strips 122 may be configured to contain a silicone strip assembly 104 to create a 360 degree peristaltic pump tube on one side or both sides of the green tire. For the purpose of explanation, the embodiment shown creates a pumping tube of 180 degree extent in one chafer component only. In FIG. 11B, it will be noted that chafer strip 126 is configured to complement the construction of strip 70 shown in FIGS. 8 and 9. Circular punch holes 100, 102 are at opposite ends of the complementary strip 126. When abutted against the strip 70, the punch holes 100, 102, create 180 degree opposite cavities 132, 134 as seen in FIGS. 13A and 13B.

The free end 106 for the purpose of explanation will hereafter be referred to as the "outlet end portion" of the silicone assembly 104 extending through the outlet cavity 134; and the free end 108 the "inlet end portion" of the assembly 104 extending through the circular inlet cavity 132. FIG. 12 illustrates the 180 degree extension of the silicone assembly 104 and FIGS. 13A, 13B show the relative location of the assembly 104 to the lower tire bead and apex components. FIG. 13A shows the inlet cavity 132 and silicone core assembly 104 ready for placement of a temporary inlet core device and FIG. 13B shows the outlet cavity 134 ready for placement of a temporary outlet core device.

Figure 14A:
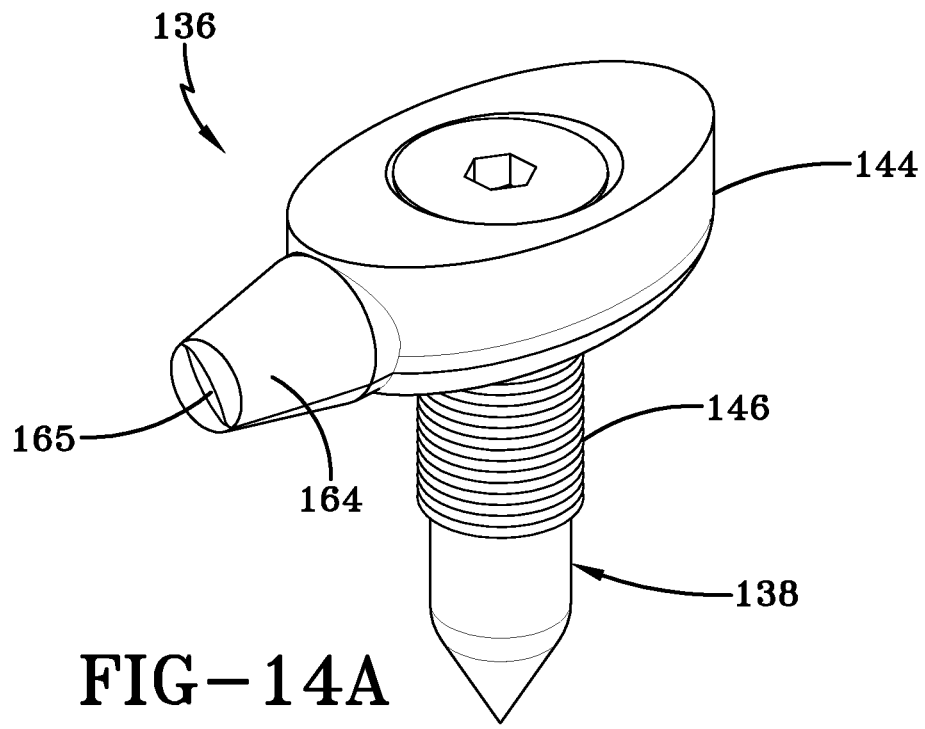
FIG. 14A is a top perspective view showing a first embodiment outlet core assembly with screw punch attached.
Figure 14B:
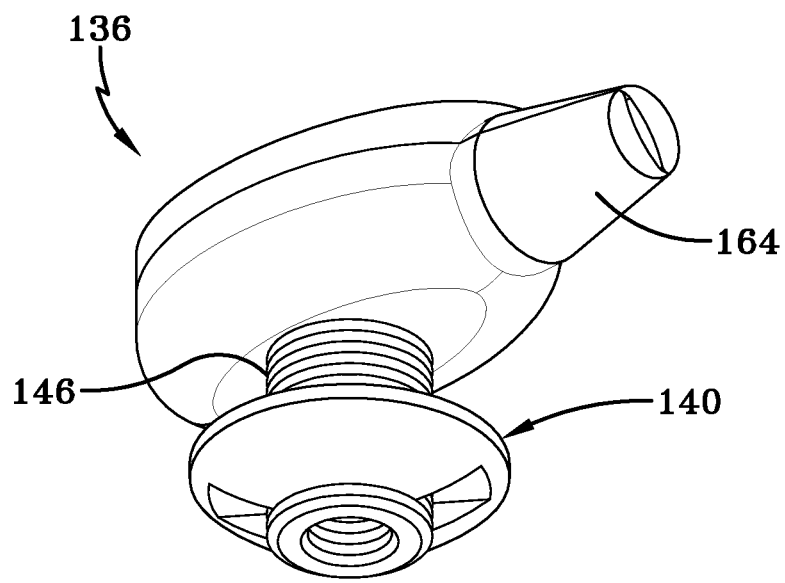
FIG. 14B is a bottom perspective view showing the outlet core assembly with screw punch removed and the nut attached.
Figure 14C:
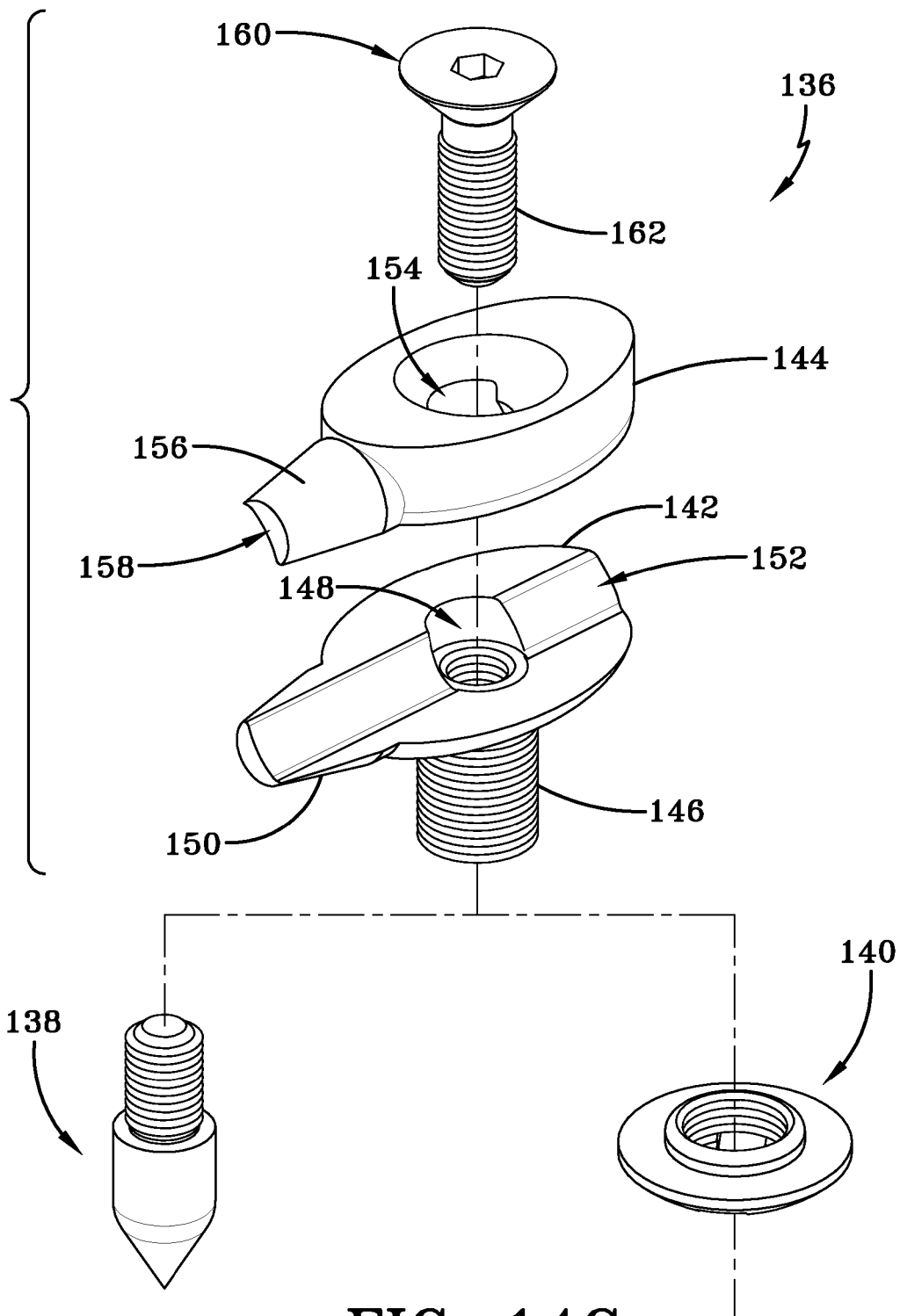
FIG. 14C is a top exploded view of the outlet core assembly showing top/bottom core halves and mounting screw with the screw punch and hold down nut.
Figure 14D:
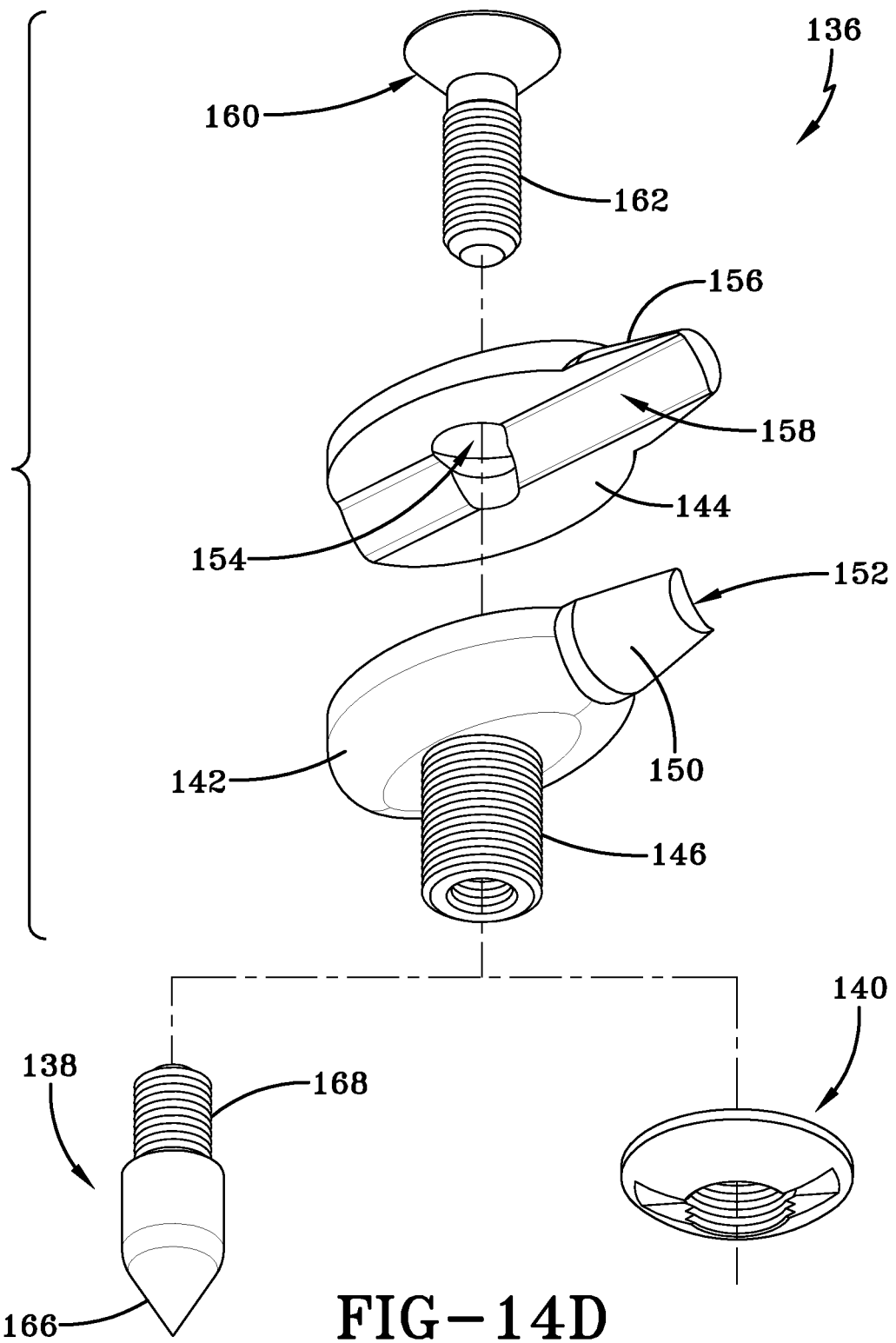
FIG. 14D is a bottom exploded view of FIG. 14C.

FIGS. 14A through 14D show a first embodiment of a pre-cure, temporary outlet core assembly 136 with attached screw punch 138 and replacement nut 140. The temporary outlet core assembly 136 includes mating bottom half-housing component 142 and a top half-housing component 144 connecting by means of a coupling screw 160. The bottom half-housing component 142 has a dependent cylindrical screw threaded sleeve 146; an upper socket 148 extending downward into the component 142 and communicating with the upward facing opening of sleeve 146; and a half-protrusion 150 having an axial half-channel formed to extend across housing 142. The top-half-housing component 144 has a central through bore 154, a half-protrusion housing 156 and a half-channel formed to extend side to side across an underside of the housing 144. United as shown in FIGS. 14A and 14B, the two half-housing components 142, 144 are assembled by screw 160 threading bolt 162 down through the bore 154 and into the sleeve 146. So assembled, the half-protrusion housings 150 and 156 unite as well as the half-channels 152, 158. In the assembled state, as seen in FIGS. 14A and 14B, the protrusion housings 150, 156 form an outwardly projecting conical tube-coupling protrusion 164 away from the combined housing halves 142, 144 and defining an axial air passageway channel 165 having a sectional shape and dimension corresponding with the silicone strip assembly 104 within chafer strip 126 of the tire.

The inwardly and outwardly threaded shaft 146 of the temporary outlet core assembly 136 receives and couples with an externally threaded shaft 168 of the screw punch accessory device 138. As will be explained below, screw punch device 138 will in the course of peristaltic tube assembly formation be replaced with the threaded collar or nut 140 as shown in FIG. 14B.

Figure 15A:
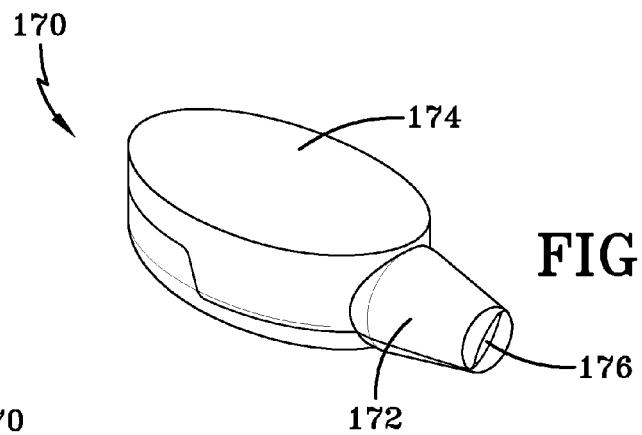
FIG. 15A is a top perspective view of a first embodiment inlet core assembly.
Figures 15B, 15C:
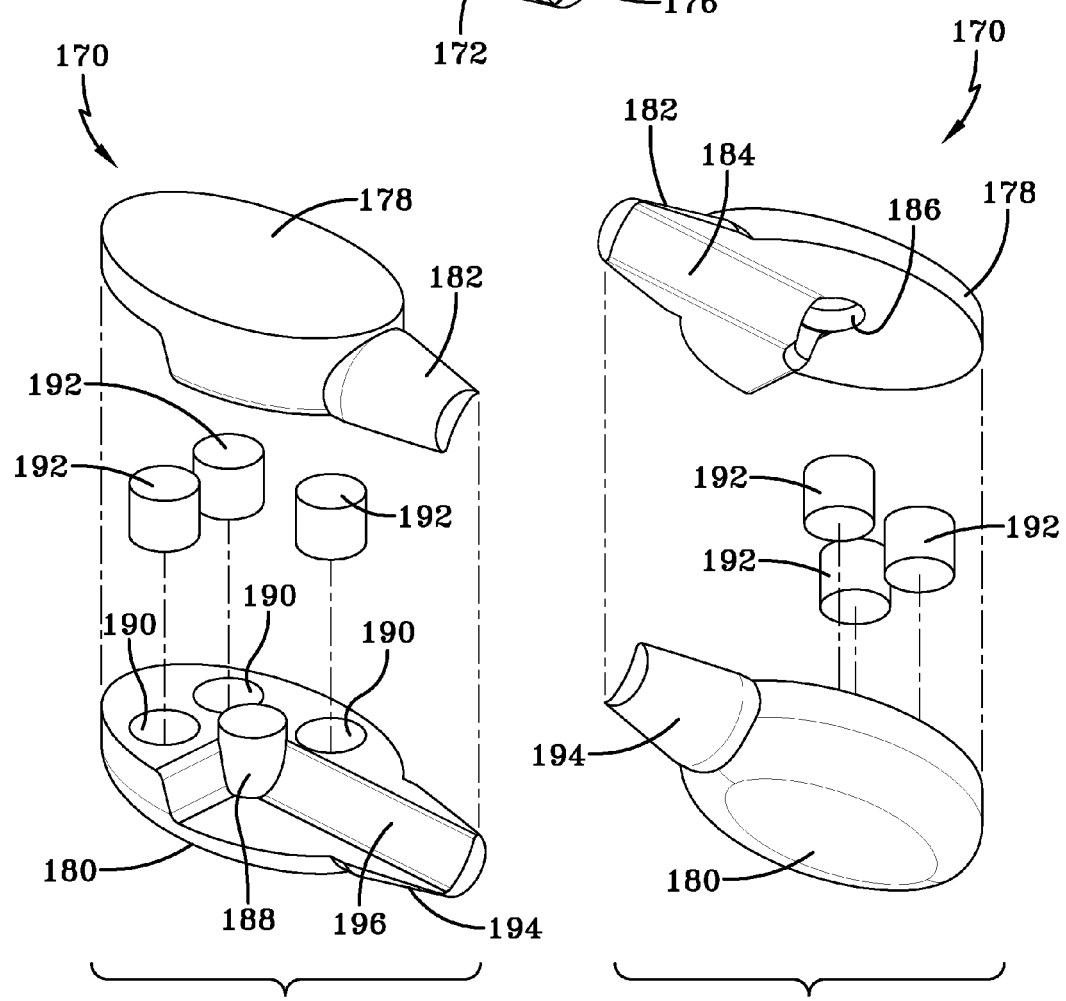
FIG. 15B is a top exploded view of the inlet core assembly showing top/bottom core halves and magnetic inserts.
FIG. 15C is a bottom exploded view of FIG. 15B.

With reference to FIGS. 15A through 15C, a metallic first embodiment of a pre-cure, temporary inlet core assembly 170 is shown forming a housing body 174 from which a conical coupling housing protrusion 172 extends. An axial air passageway through-channel 176 extends through the housing body 174 and the protrusion 172 having a sectional shape and dimension corresponding with the shape and dimensions of the silicone strip assembly 104 within the chafer strip 126 of the green tire. The housing body 175 is formed by a combination of half-housing 178, 180, each providing a half-coupling protrusion 182, 194, respectively in which a half-channel 184, 196 is formed, respectively. A central assembly socket 186 extends into the internal underside of half-body 178 and receives an upright post 188 from the lower half-body 180 to center and register the two half-bodies together. Three sockets 190 are formed within the lower half-body 180 with each socket receiving a magnetic insert 192. The magnets 192 operate to secure the metallic half-housings 178, 180 together.

Figure 16A:
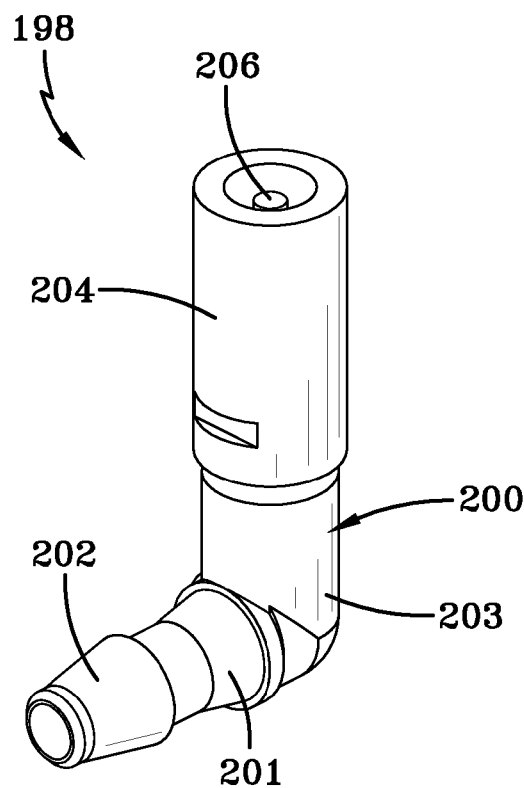
FIG. 16A is a threaded elbow and valve housing assembly.
Figure 16B:
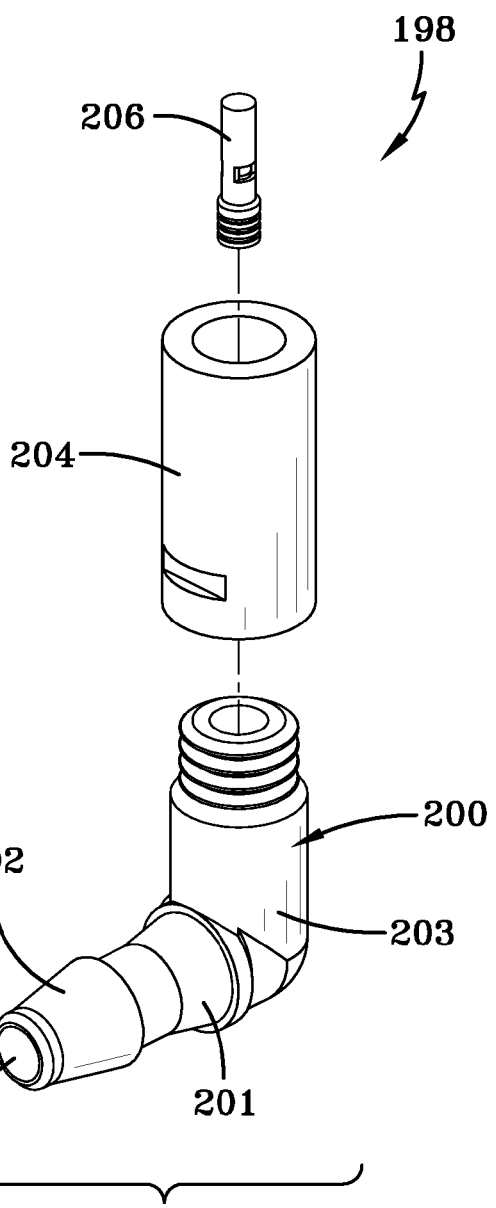
FIG. 16B is an exploded view of FIG. 16A showing the elbow, valve housing and Lee valve.

Referencing FIGS. 16A and 16B, a threaded elbow and valve housing assembly 198 is shown for use as a permanent outlet core valve assembly. The housing assembly 198 is formed of a suitable material such as a nylon resin. The assembly 198 includes an elbow housing 200 having a conical remote end 202 and a cylindrical valve housing 2004 affixed to an opposite end. A one-way valve, such as a Lee valve, is housed within the valve housing 204. An axial air passageway 2008 extends through the L-shaped assembly 198 and through the Lee valve seated in-line with the passageway. A Lee valve is a one-way valve which opens at a prescribed air pressure to allow air to pass and is commercially available from The Lee Company, located in Westbrook, Conn., U.S.A. Other valve devices may be employed alternatively, such as a Norgren valve commercially available from Norgren N.V., located in Lot, Belgium, or a Beswick valve commercially available from Beswick Engineering located in Greenland, N.H., U.S.A.

FIGS. 17A and 17B show an alternative embodiment of an elbow connector and one-way post-cure outlet valve assembly 210. An L-shaped elbow connector housing 212 has a conical forward arm end 214 and an axial passageway 216 that extends through the L-shaped housing 212. An umbrella-type valve 218 of a type commercially available from Mini-Valve International located in Oldenzaal, The Netherlands, attaches to a threaded end of housing 212 by means of nut 220. The valve 218 has a circumferential array of air passages 227 that allow the passing of air from the housing of the valve. The valve 218 includes an umbrella stop member 222 having a frustro-conical depending protrusion 224 that fits and locks within a valve central bore 226 and a flexible circular stop membrane 223. The protrusion 224 of stop member 222 locks into the axial bore 226. The flexible membrane 223 is in a closed or down position when air pressure on the membrane is at or greater than a prescribed pressure setting. In the down position, membrane 223 covers the apertures 227 of the valve body and prevents air from passing. The membrane 223 moves to an up or open position when the air pressure outside the membrane falls to a pressure less than the preset pressure setting. In the up or open position, air can flow from the apertures 227 into the tire cavity.

Figure 18A:
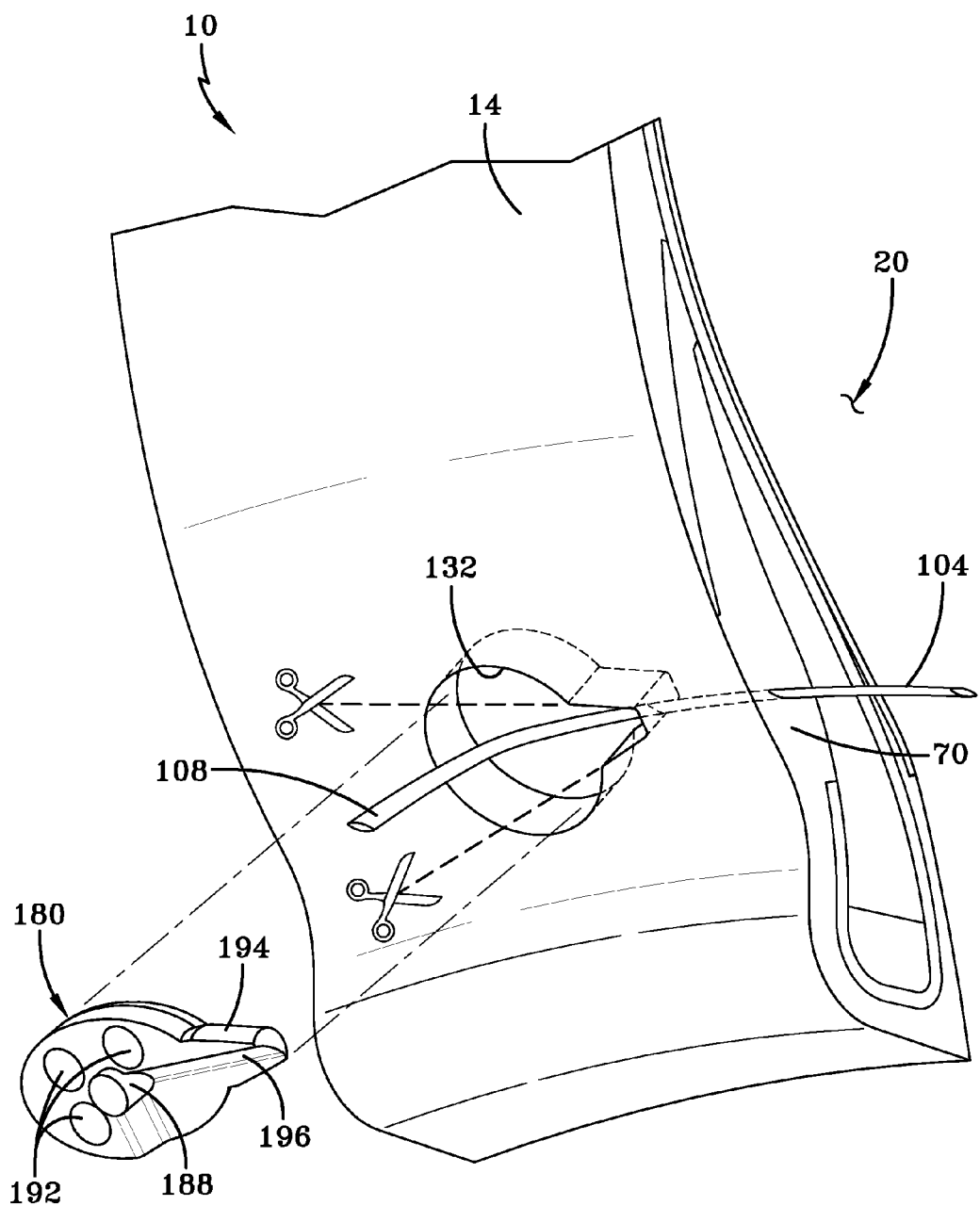
FIG. 18A is an enlarged sectioned view showing the inlet bottom core being inserted into the cavity under core strip and the chafer groove re-opened to allow room of the conical end of the inlet core to be fully seated into cavity.
Figure 18B:
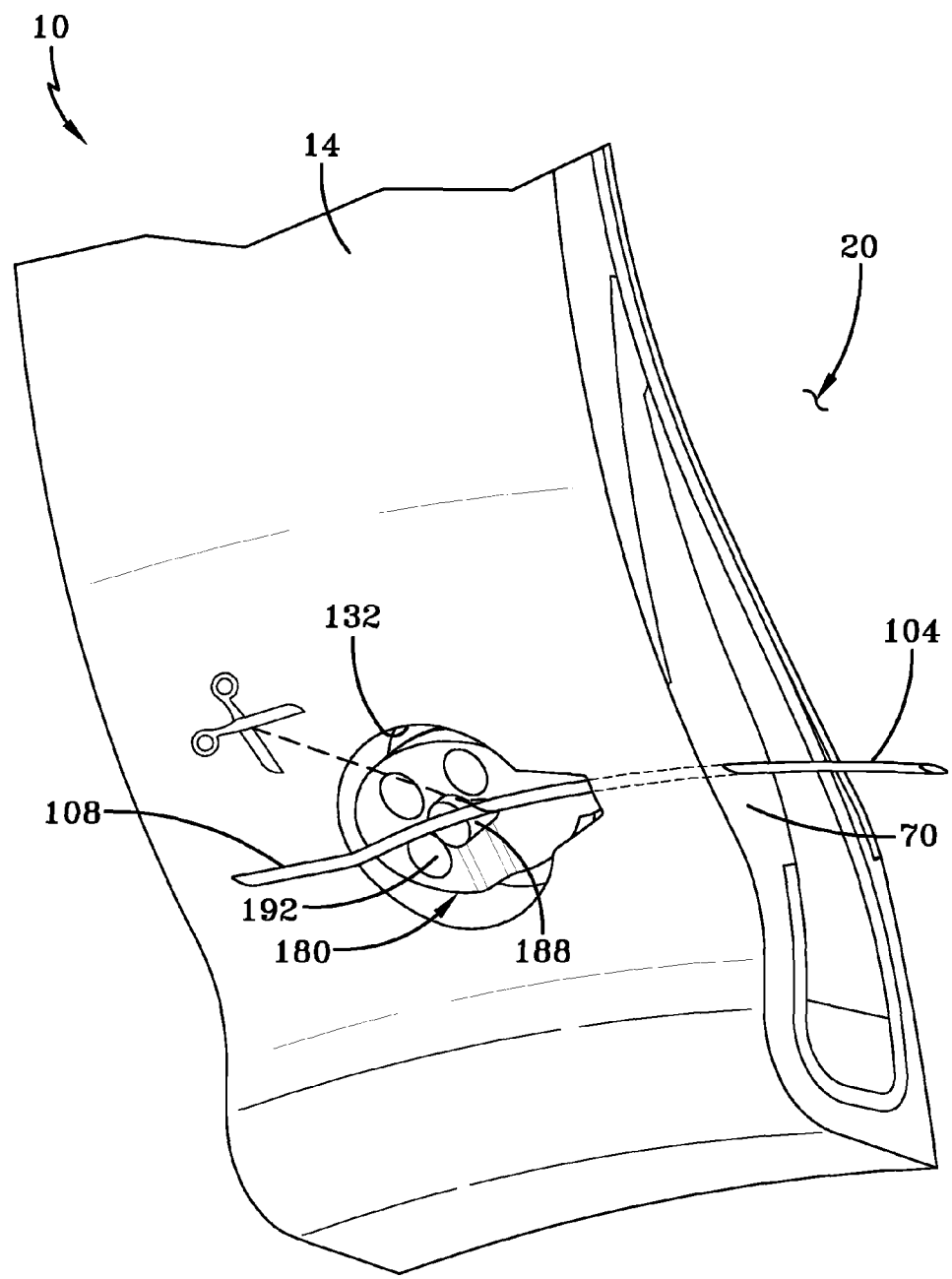
FIG. 18B is an enlarged sectioned view showing the inlet bottom core fully inserted into the cavity and the core strip being trimmed to length.
Figure 18C:
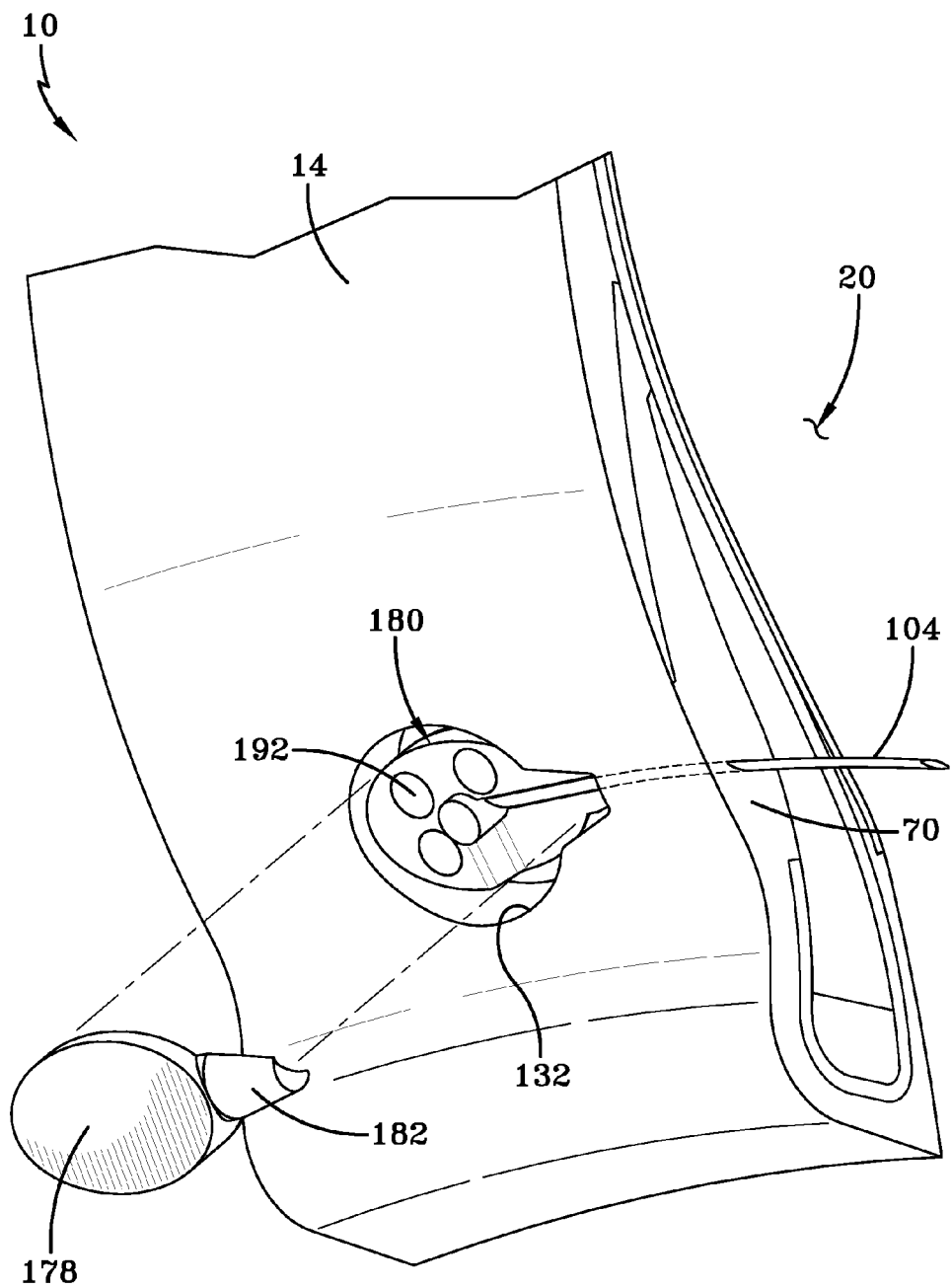
FIG. 18C is an enlarged sectioned view showing the inlet top core ready for placement into the cavity.
Figure 18D:
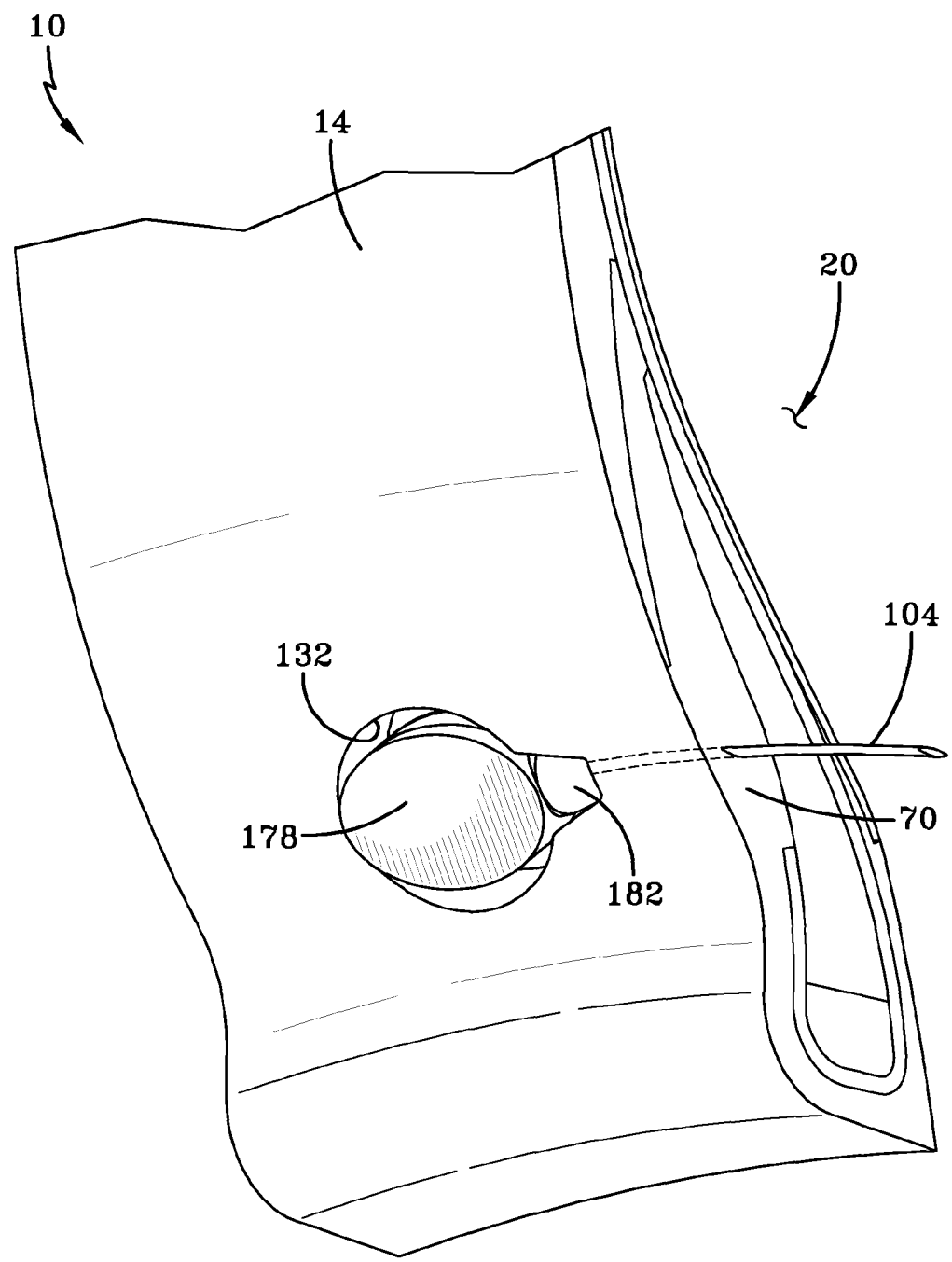
FIG. 18D is an enlarged section view showing the inlet core assembly fully assembled into cavity.
Figure 18E:
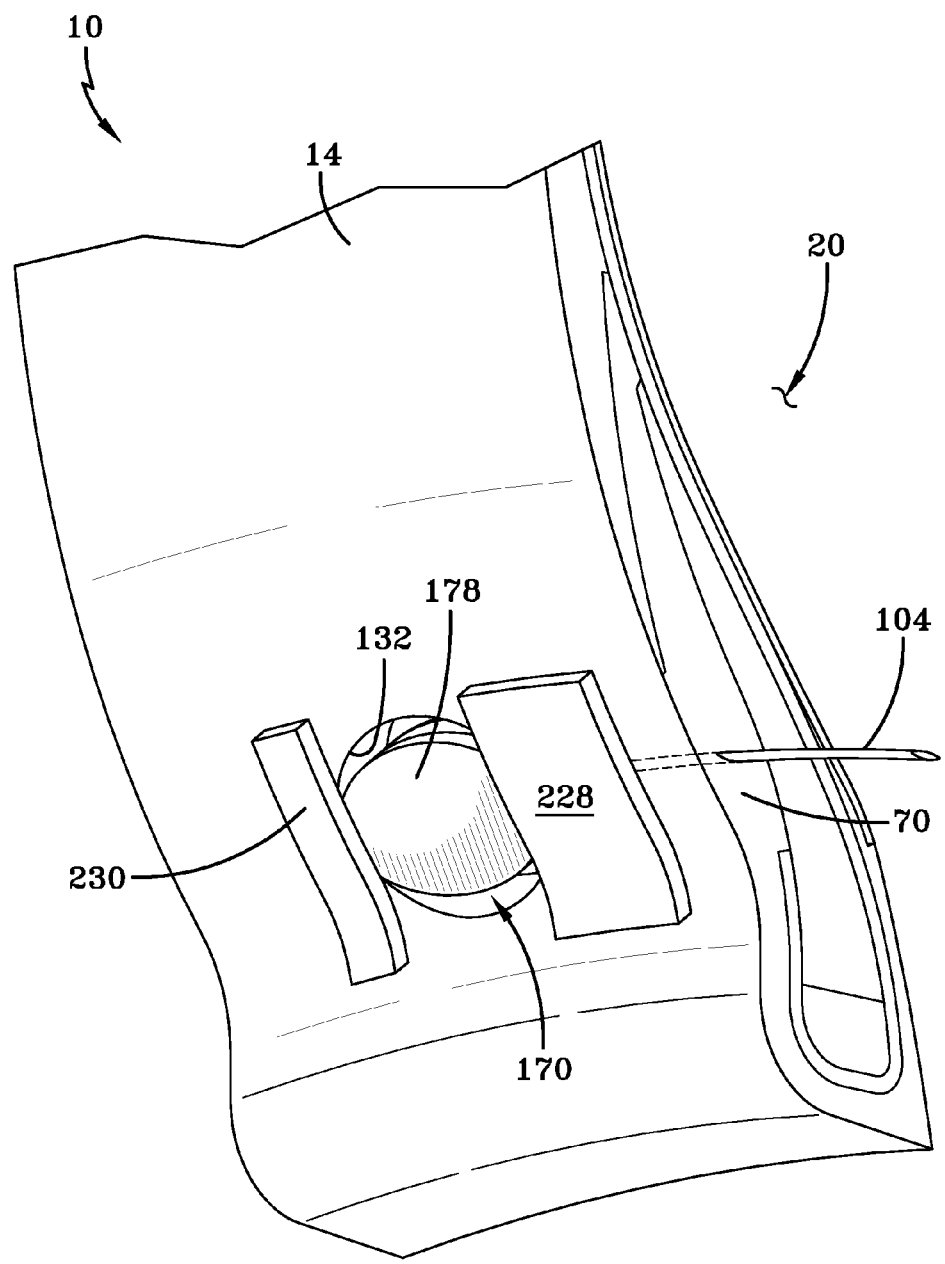
FIG. 18E is an enlarged section view showing the inlet core assembly held in place with thin rubber patches is ready for curing.

FIGS. 18A through 18D represent sequential views showing the installation of the inlet core assembly embodiment of FIGS. 15A through 15C connecting into the green tire silicone strip assembly 104 after green tire build and prior to curing of the green tire. In FIG. 18A, the bottom half housing component 180 is inserted into the inlet cavity 132 after the cavity 132 has been enlarged into generally a key shape as indicated by the scissor representation. The cutting implement opens the chafer strip groove, still occupied by silicone strip assembly 104, to accommodate receipt of the conical half-protrusion 194 of half-housing 180. The tapered end of conical half-protrusion 194 fits into the chafer channel occupied by strip assembly 104 as shown in FIG. 18B, as the strip assembly 104 is position within the half-channel 196 across the housing 180. The extra length of inlet end portion 108 is cut and removed, whereby positioning a terminal end of the strip assembly 104 within the housing component 180. The upper, outer, top half-housing component 178 is thereupon assembled over the housing component 180, as seen in FIG. 18D, capturing the strip assembly 104 within the channel formed by upper and lower half-channels 184, 196. The magnets 192 secure the metallic half-housings 178, 180 together. Rubber patches 228, 230 as seen in FIG. 18D are applied over the temporary inlet core assembly 170 to secure the assembly in place for the tire cure cycle. The hollow metallic housings 178, 180 are held together by the magnets. It will be appreciated that a non-metallic hollow housing may be employed if desired, such as a hollow housing made of molded plastic, with housing components held together by locking detent techniques known in the plastic casing art.

Figure 19A:
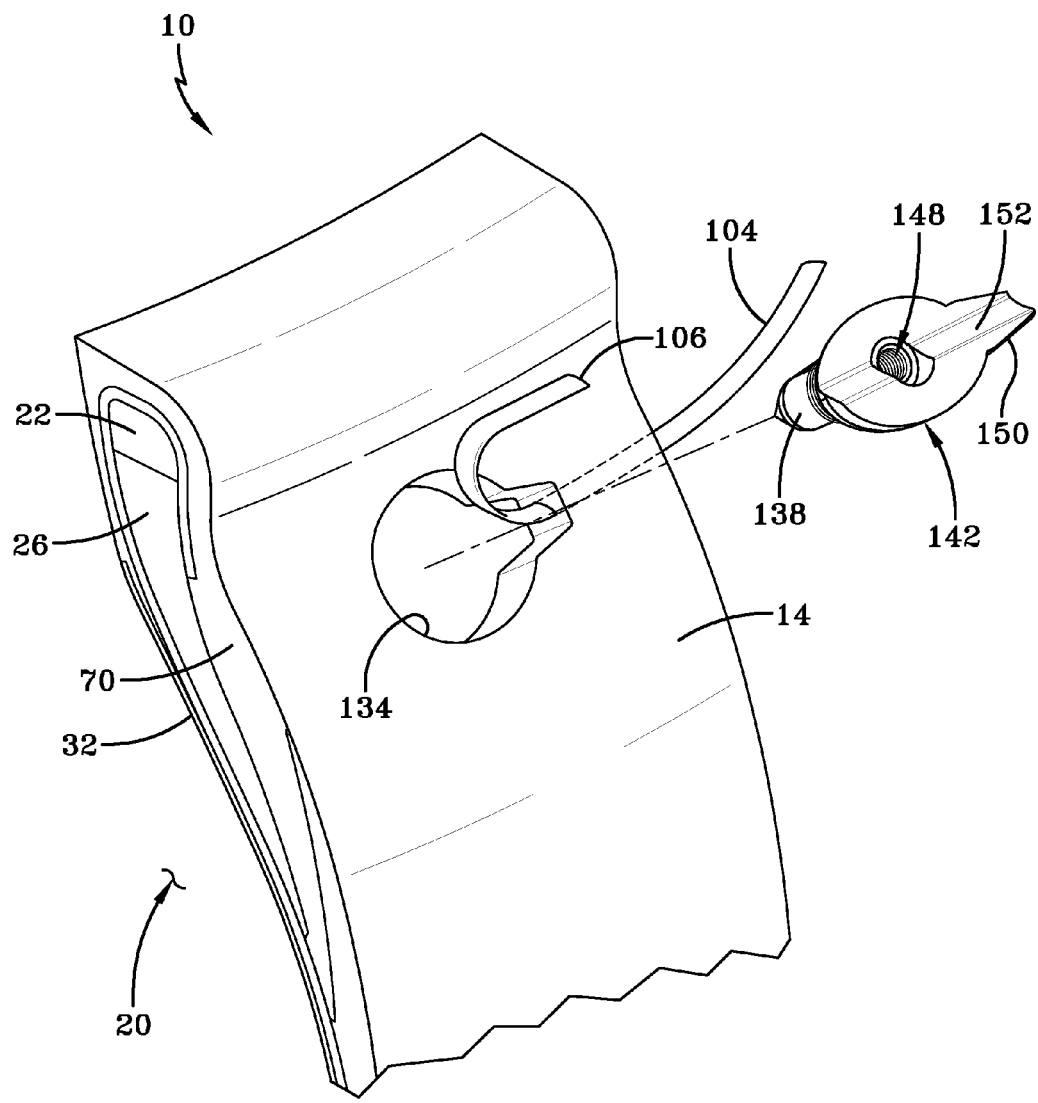
FIG. 19A is an enlarged sectioned view showing the outlet bottom core unit being inserted into the cavity under the core strip and the punch forced through the tire wall into the cavity chamber with the chafer groove re-opened to allow room for the conical end of the outlet core bottom unit to be fully seated into cavity.
Figure 19B:
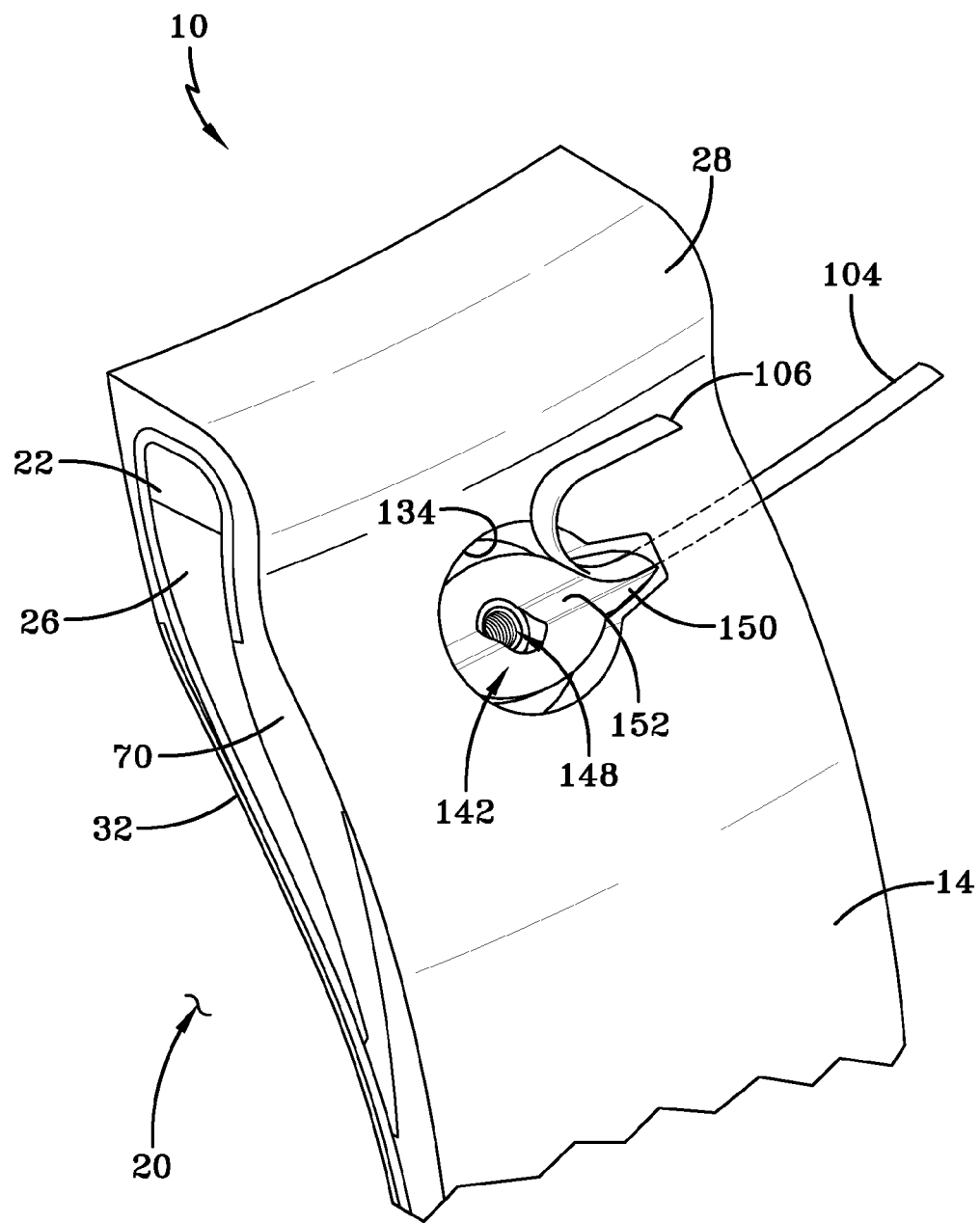
FIG. 19B is an enlarged sectioned view of the bottom outlet core unit fully seated into the cavity.
Figure 19C:
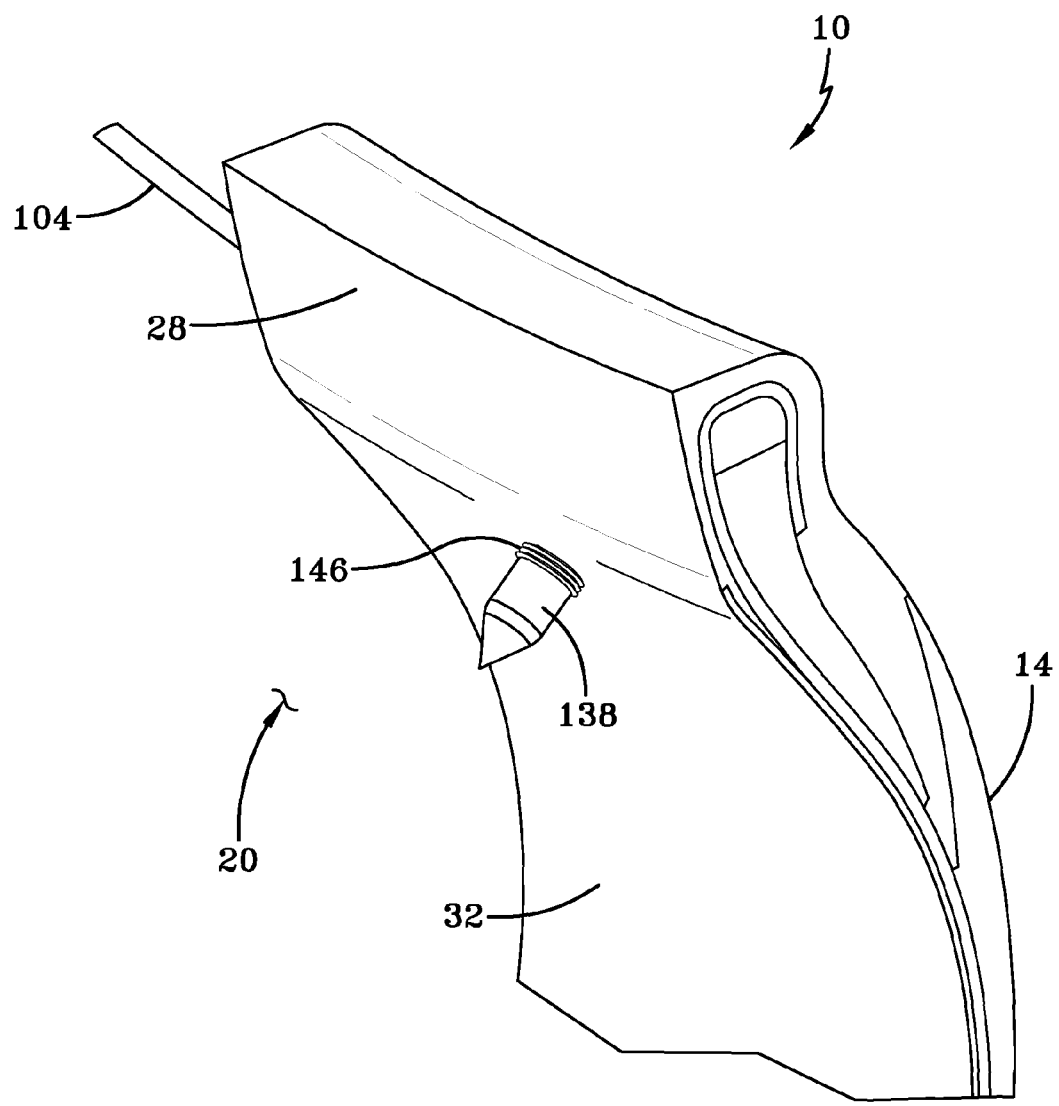
FIG. 19C is an enlarged sectioned view from cavity side showing the screw punch fully inserted through the tire wall.
Figure 19D:
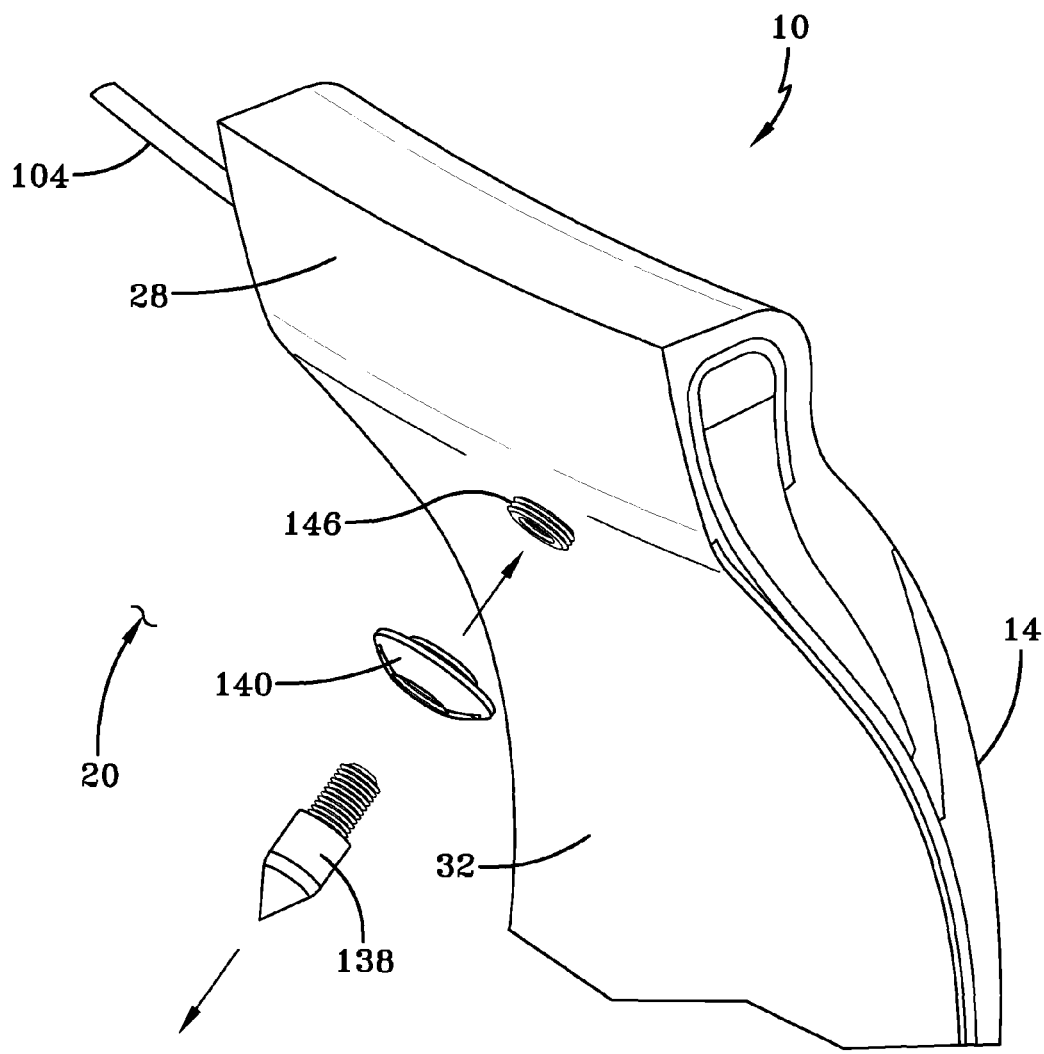
FIG. 19D is an enlarged sectioned view of the screw punch removed from the outlet bottom core half component with the nut attached to thread shaft.
Figure 19E:
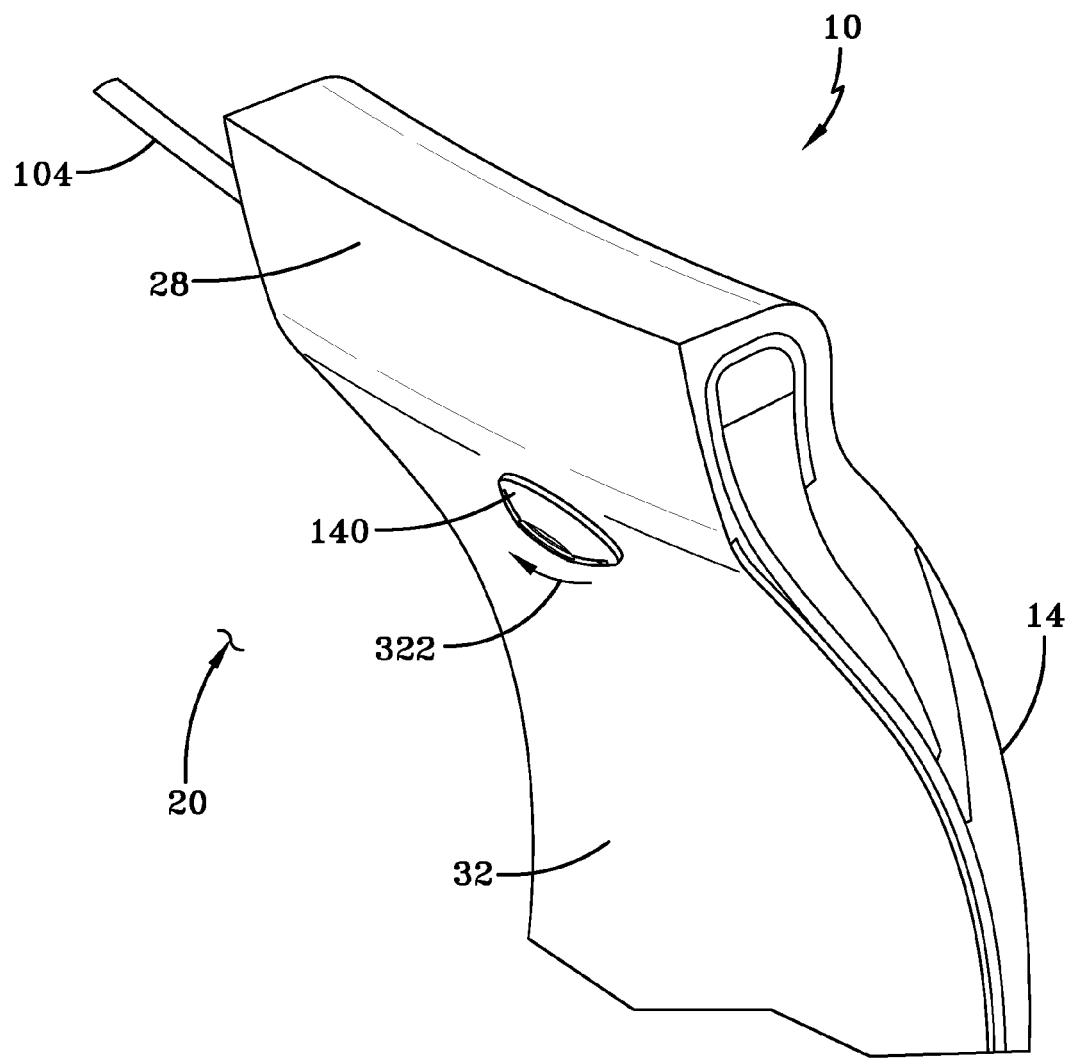
FIG. 19E is an enlarged sectioned view showing the nut fully attached to the outlet bottom core shaft.
Figure 19F:
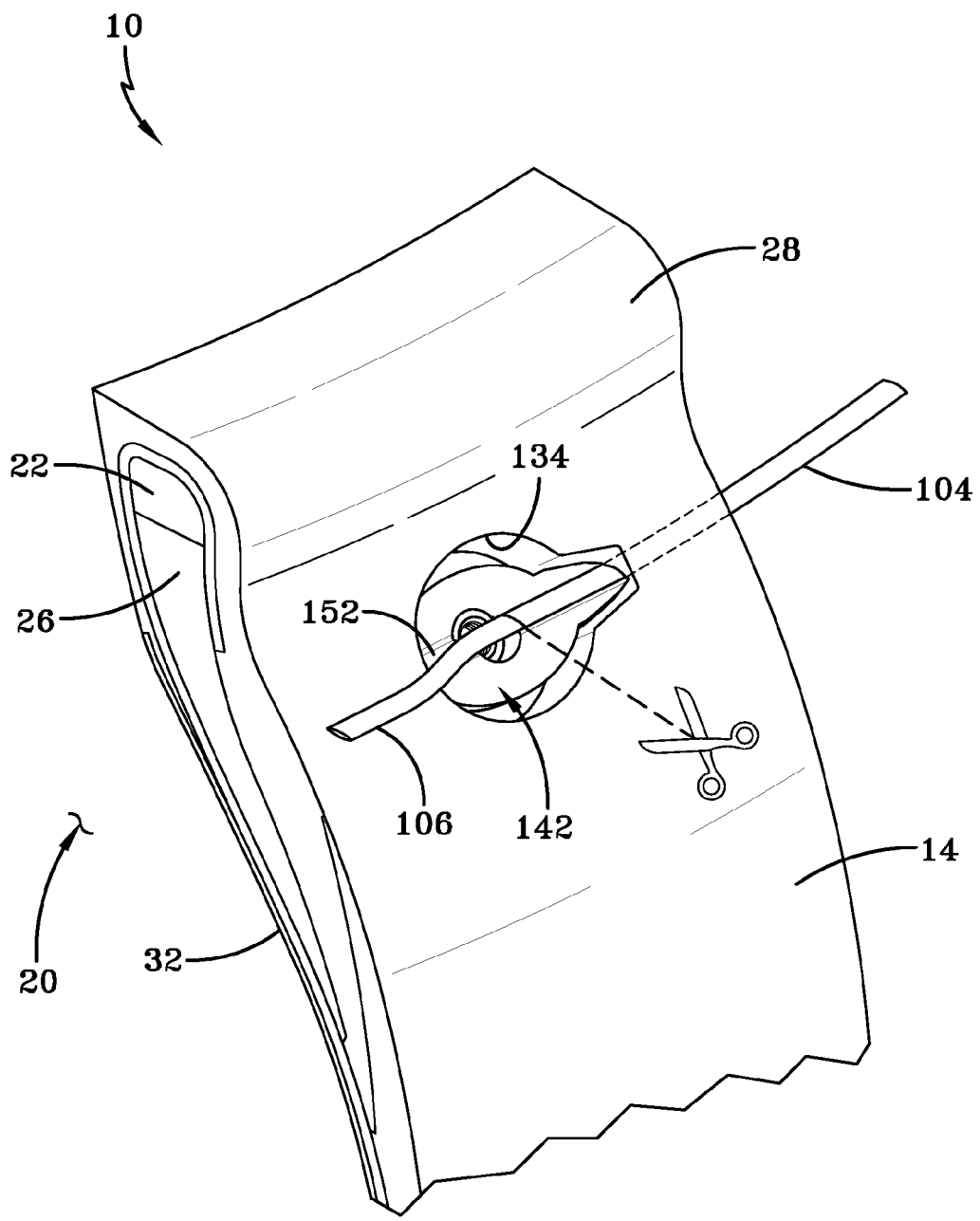
FIG. 19F is an enlarged sectioned view of the core strip cut to length at the outlet bottom core strip cavity.
Figure 19G:
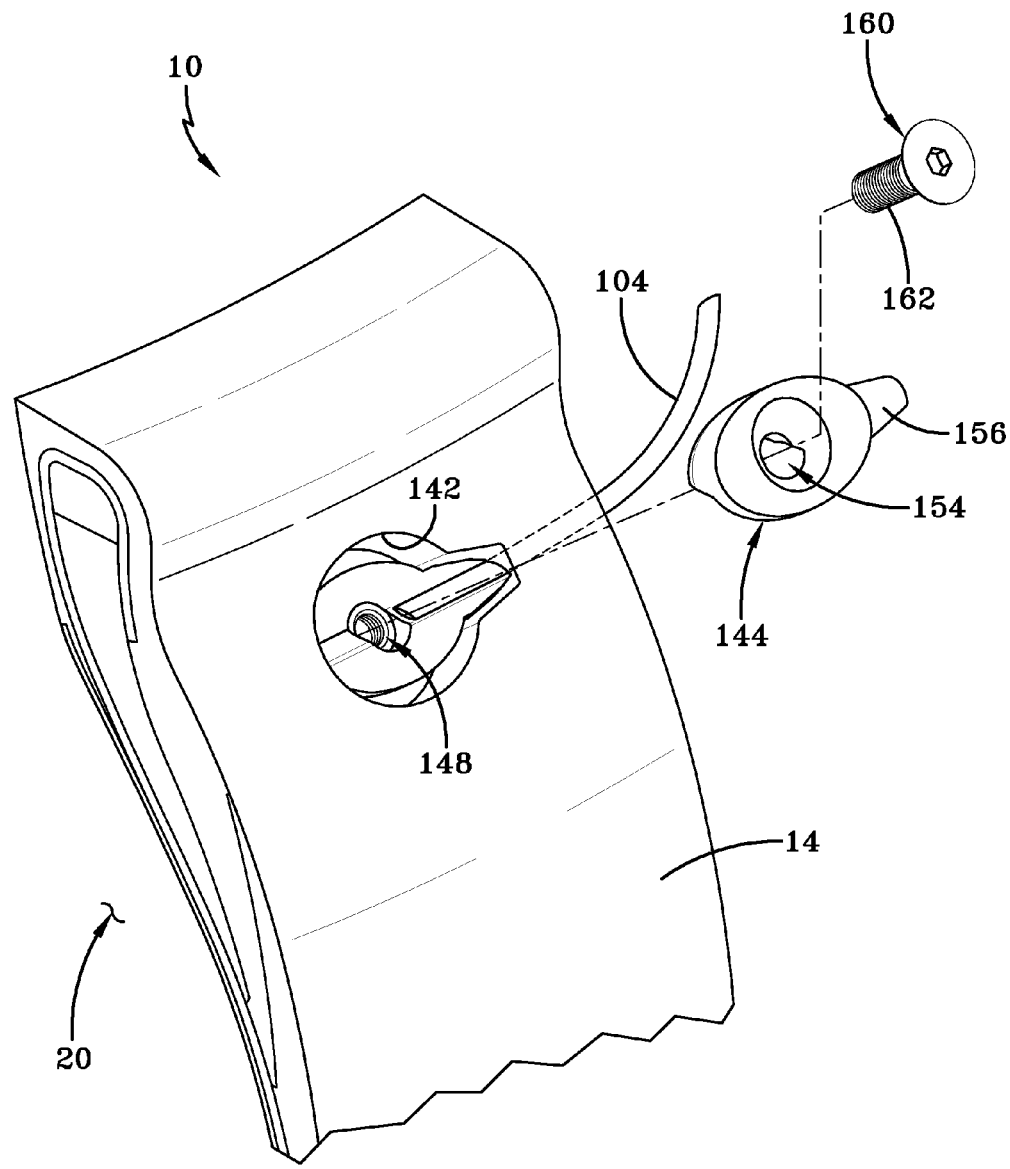
FIG. 19G is an enlarged sectioned view of the outlet top core component placed into the cavity and screwed into place.
Figure 19H:
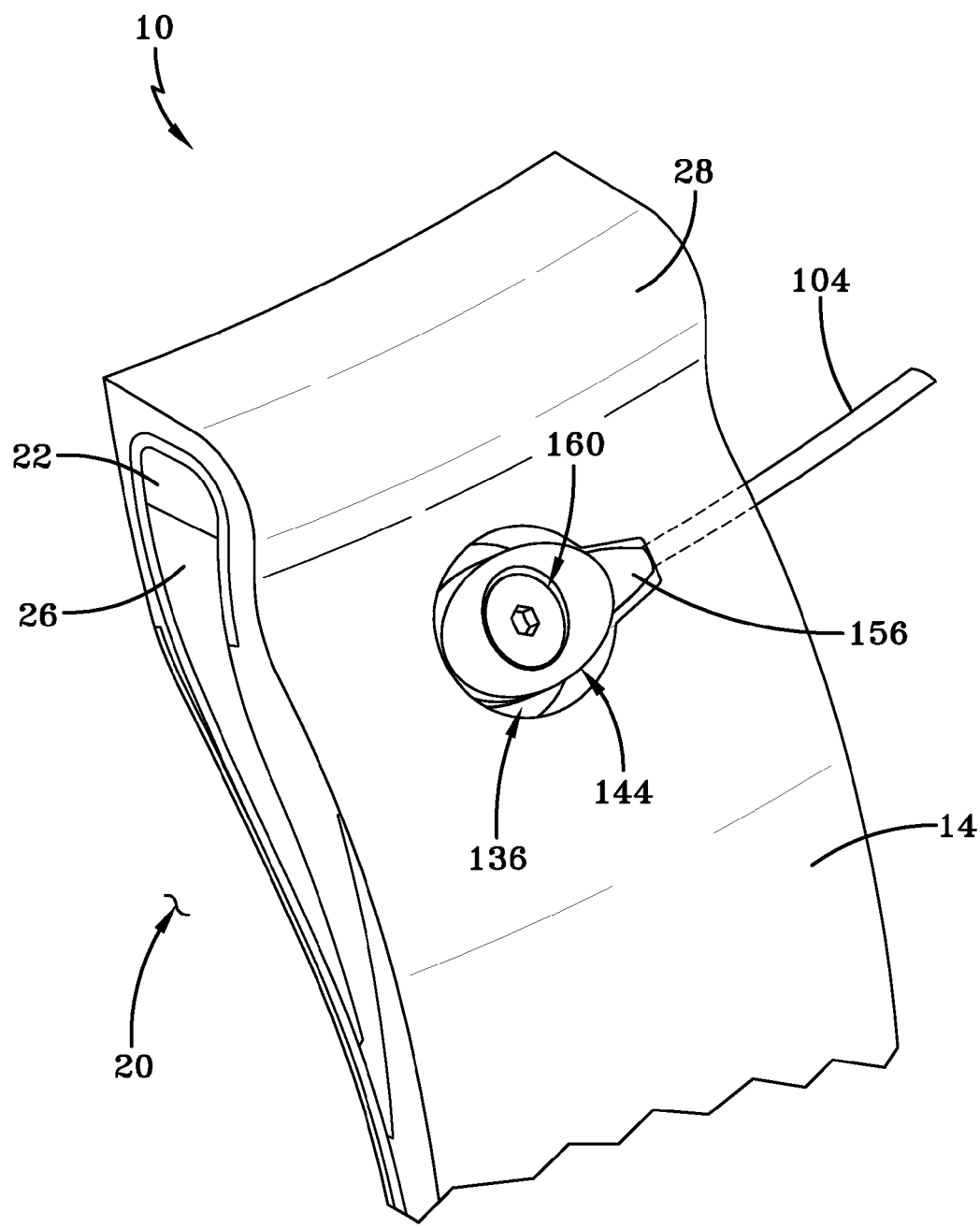
FIG. 19H is an enlarged sectioned view showing the outlet core halves and screw fully assembled.
Figure 19I:
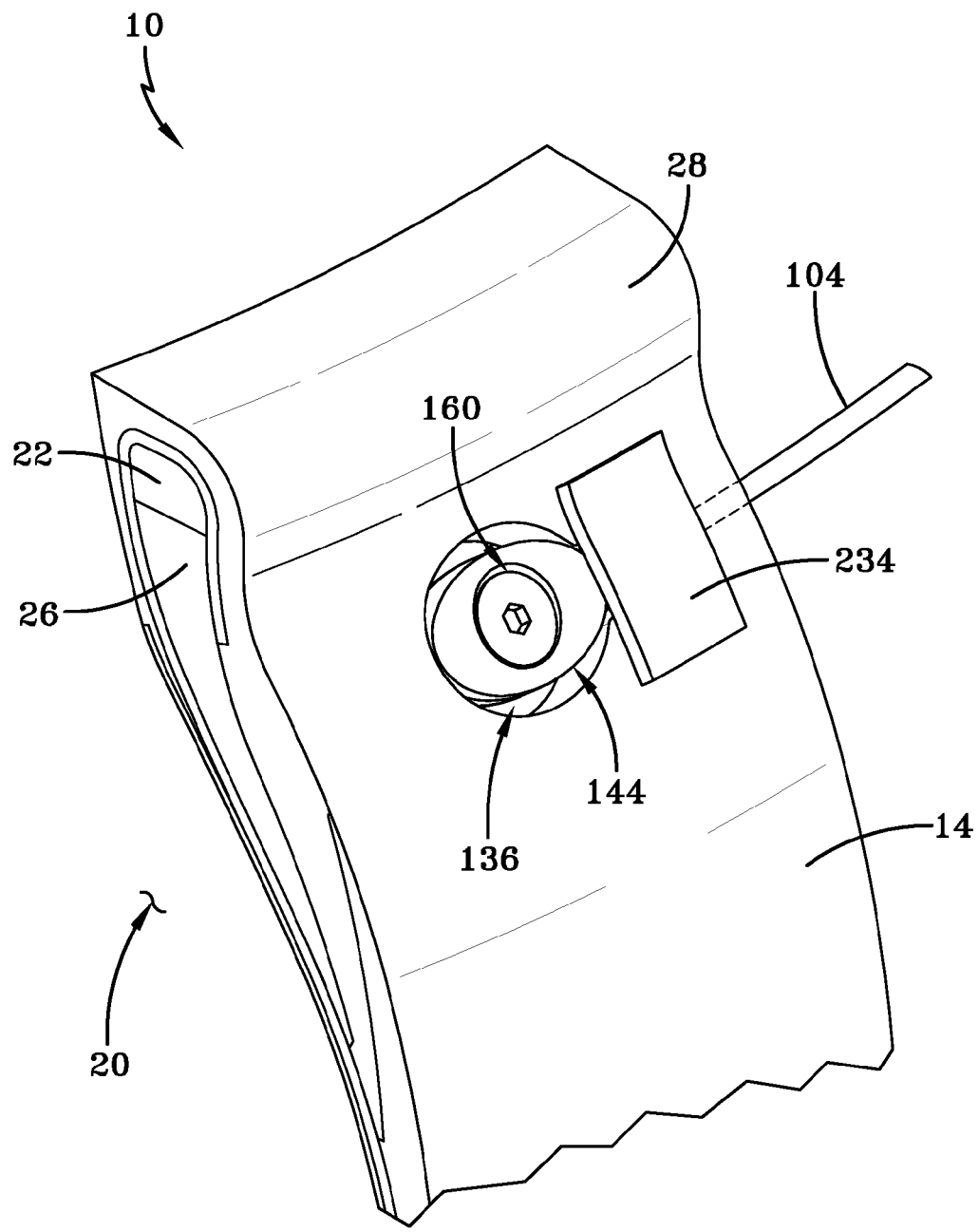
FIG. 19I is an enlarged sectioned view showing the conical end of outlet core assembly covered with a rubber patch.
Figure 20:
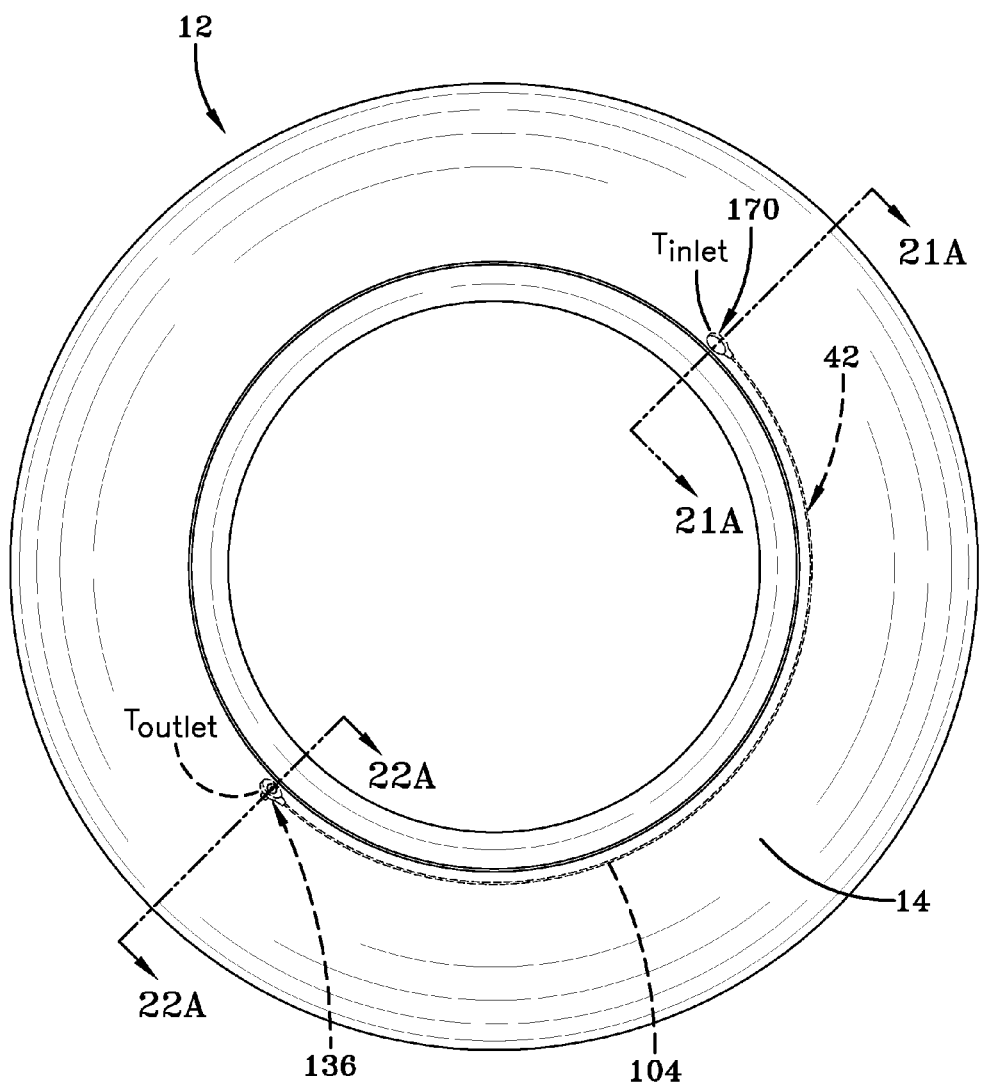
FIG. 20 is a side view of a tire showing the inlet and outlet core locations before curing.

FIGS. 19A through 19I show sequential assembly of the outlet core assembly embodiment of FIGS. 14A through 14D into the green tire outlet cavity 134 and to the outlet end portion 106 of the silicone strip assembly 104. In FIG. 19A, the bottom half-component 142 is inserted into the cavity 134 after the circular cavity 134 has been enlarged into a keyhole configuration to accommodate the geometry of the component 142. The screw punch 138 is pushed through to protrude through tire wall into the tire cavity 20 from the cavity 134 as seen in FIG. 19C. FIG. 19B shows the component 142 fully seated into the cavity 134, the tapered conical half-protrusion 159 projecting into the chafer channel occupied by strip assembly 104 with the strip assembly 104 residing within half-channel 152. In FIG. 19D and 19E, the screw punch 138 is removed and replaced by the nut 140 attached to the screw thread 146. In FIG. 19F, the outlet end portion 106 of silicone core strip 104 is cut to length at the outlet cavity 134 and placement of the outlet top half-housing 144 over the bottom half-housing 142 within cavity 134. The screw 160 is threaded at 162 into socket 148 to affix both half-housings 142, 144 together as shown in FIGS. 19G and 19H. A rubber patch 234 is affixed over the outlet core assembly 136 in place for tire cure.

Figure 21B:
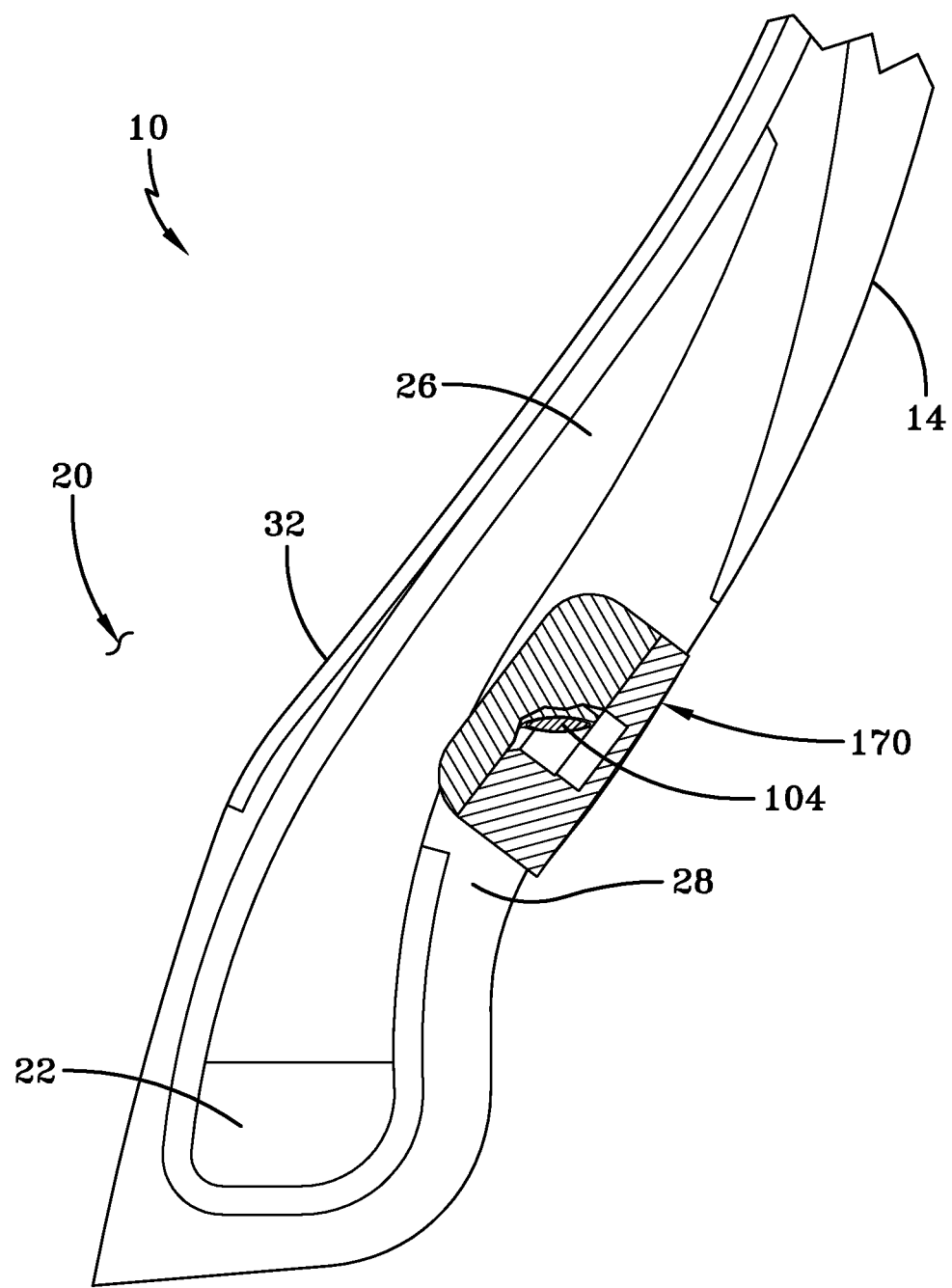
FIG. 21B is an enlarged view of the inlet core taken from FIG. 21A.
Figure 22A:
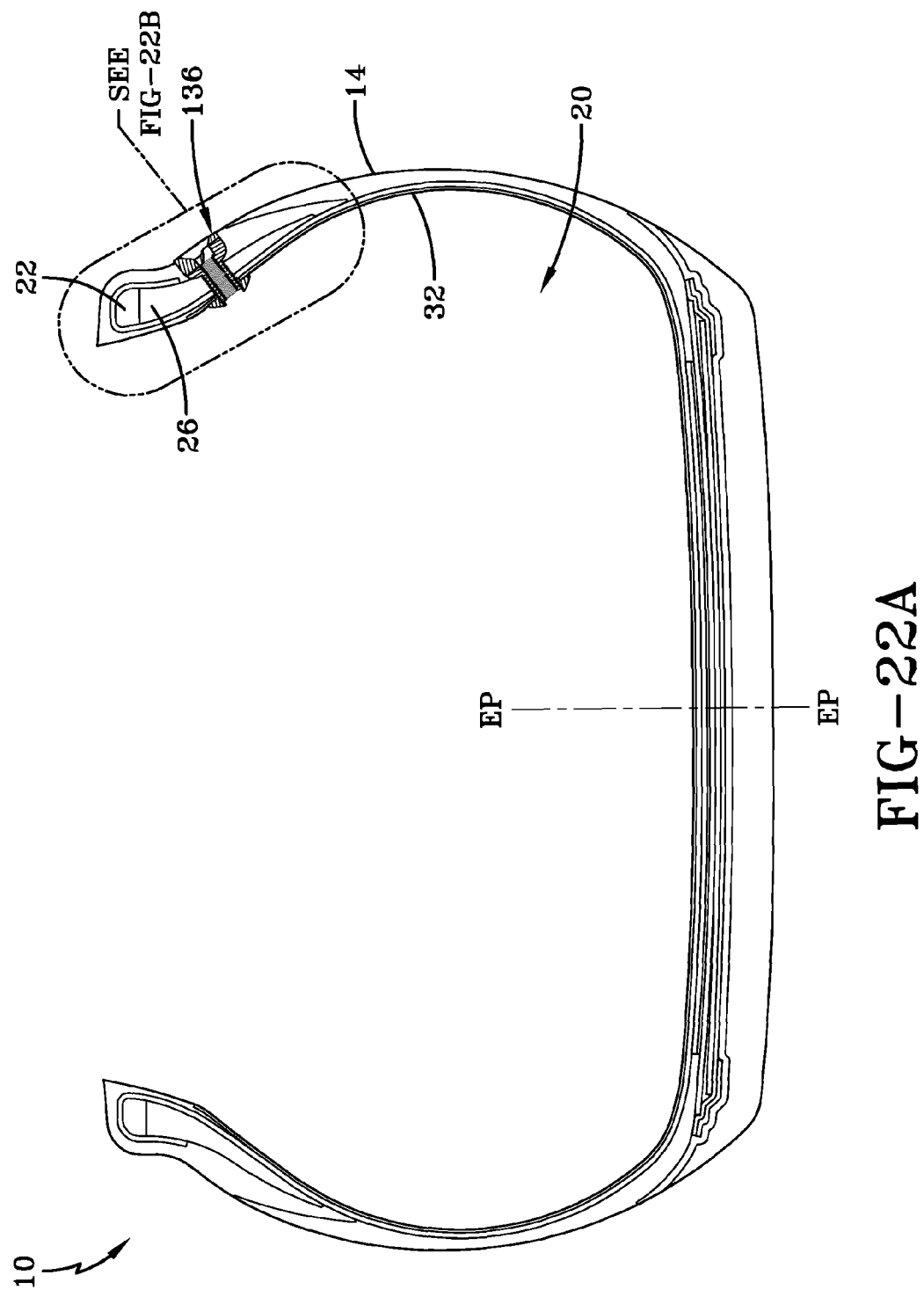
FIG. 22A is a section view taken from FIG. 20 showing the outlet core.
Figure 22B:
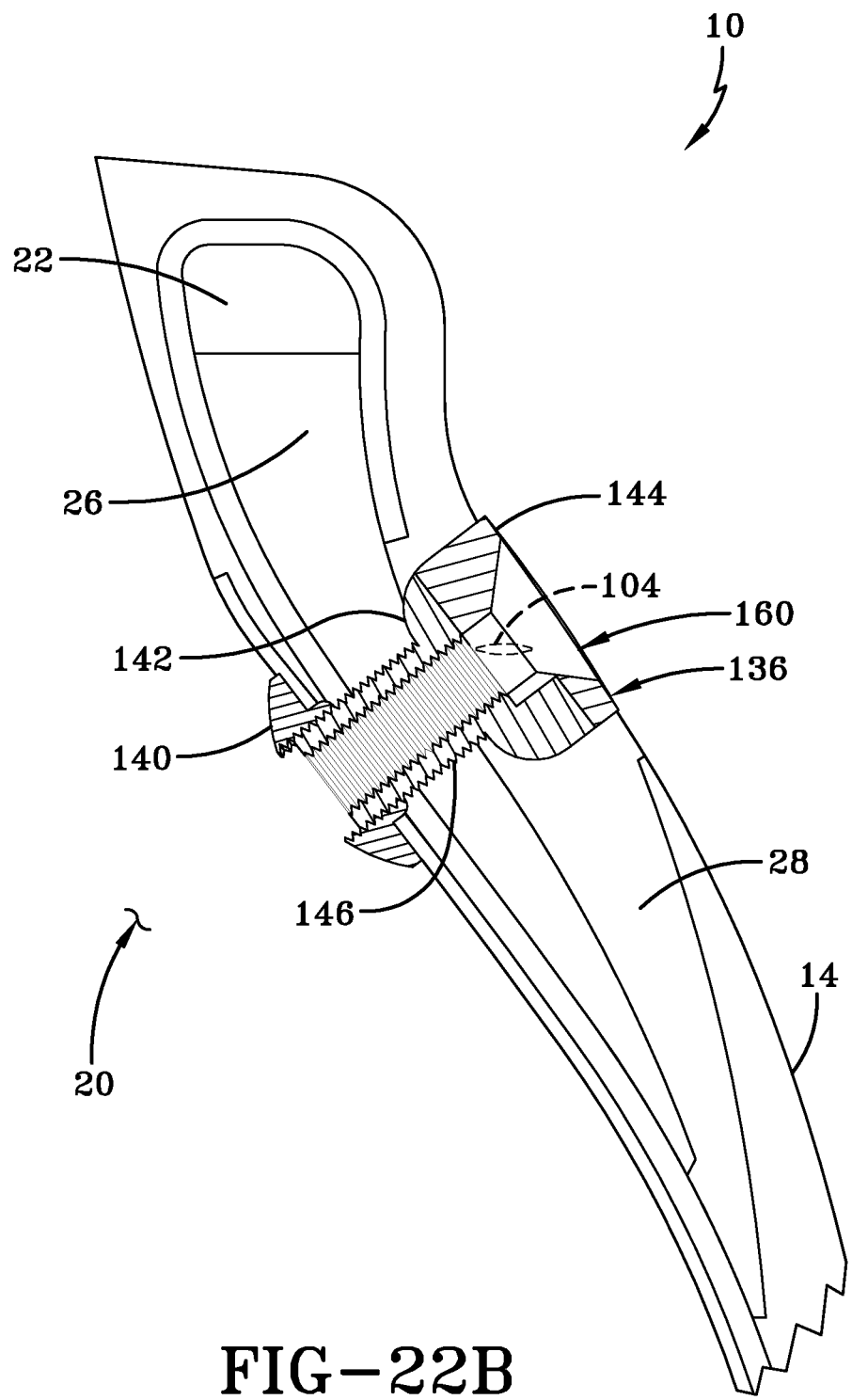
FIG. 22B is an enlarged view of the outlet core taken from FIG. 22A.

FIGS. 20, 21A, 21B, 22A and 22B show the tire with the inlet and outlet temporary core assemblies in place before curing. As seen, the silicone core assembly 104 enclosed within a chafer component 28 of the green tire extends 180 degrees between the pre-cure outlet core assembly 136 and the pre-cure inlet core assembly 170. An enlarged depiction of the inlet core location is shown in FIG. 21B from section view FIG. 21A and the outlet core location is shown enlarged in FIG. 22B from the section view of FIG. 22A. The silicone core assembly 104 resides enclosed within the chafer channel and thereby preserves the structural integrity of the chafer channel through tire cure. The sectional configuration of the assembly 104, as seen, is complementary to chafer channel in which it is encased surrounded by chafer composition, and thereby maintains the configuration of the chafer channel throughout tire cure.

Figure 23:
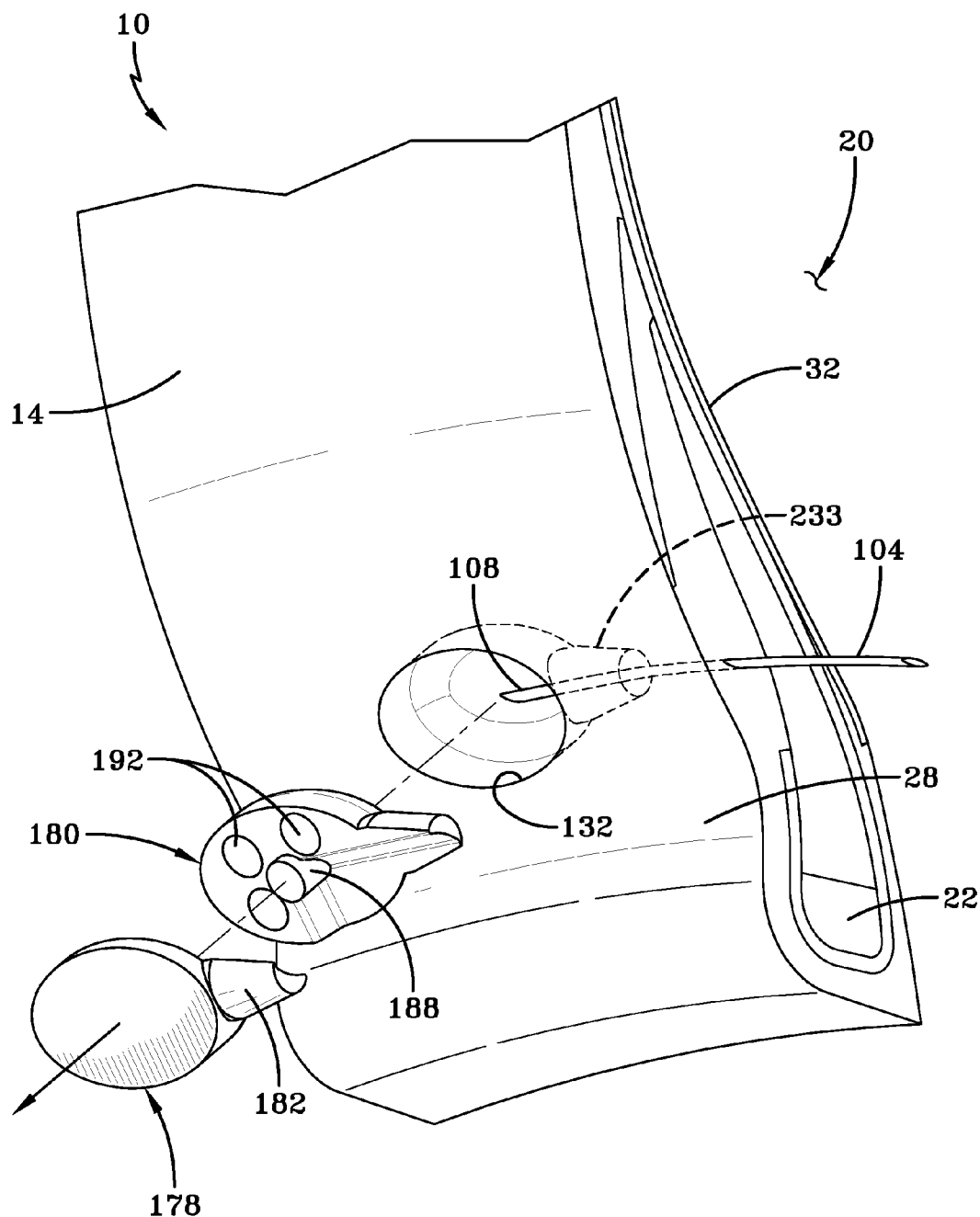
FIG. 23 is an enlarged sectioned view showing the inlet core halves being removed after curing.
Figure 24:
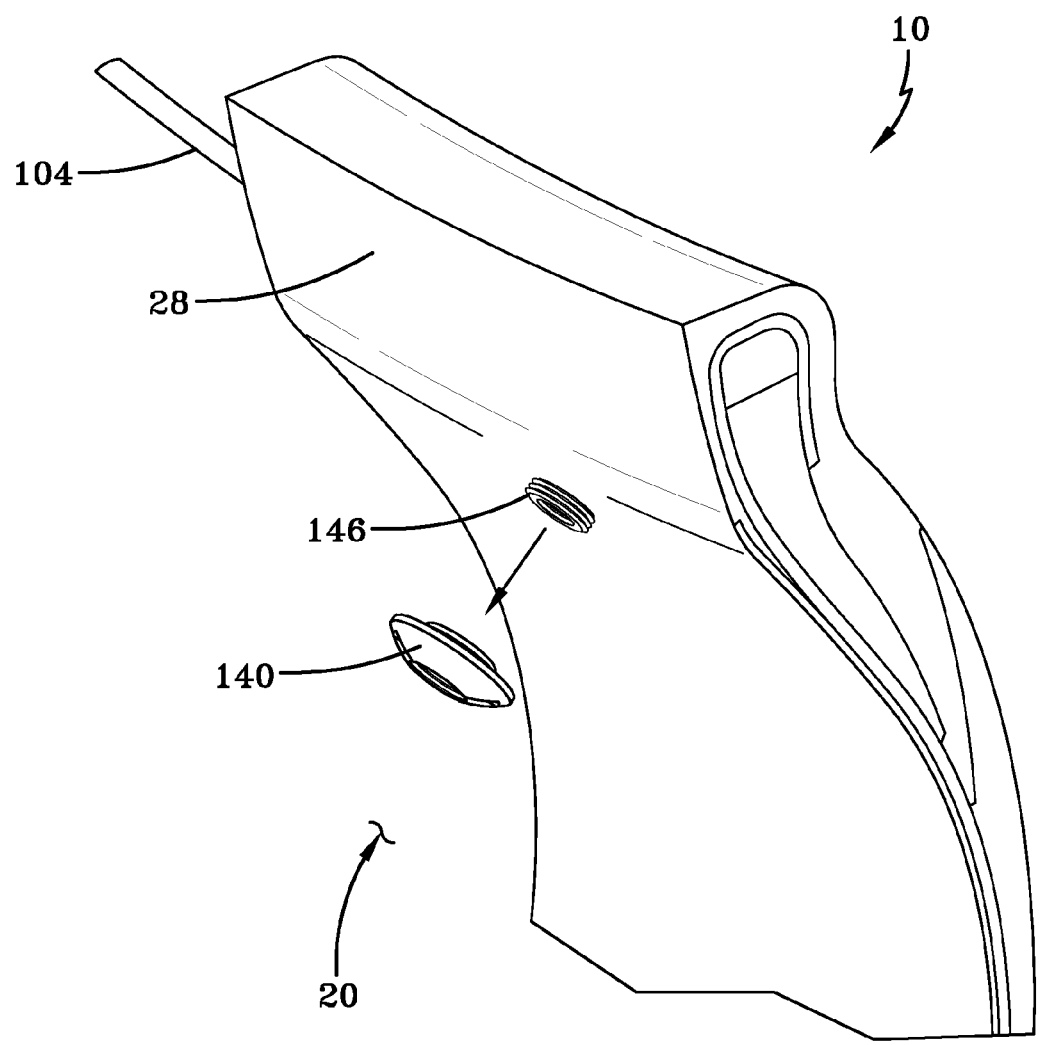
FIG. 24 is an enlarged sectioned view showing the nut removed from the outlet core threaded shaft.
Figure 25:
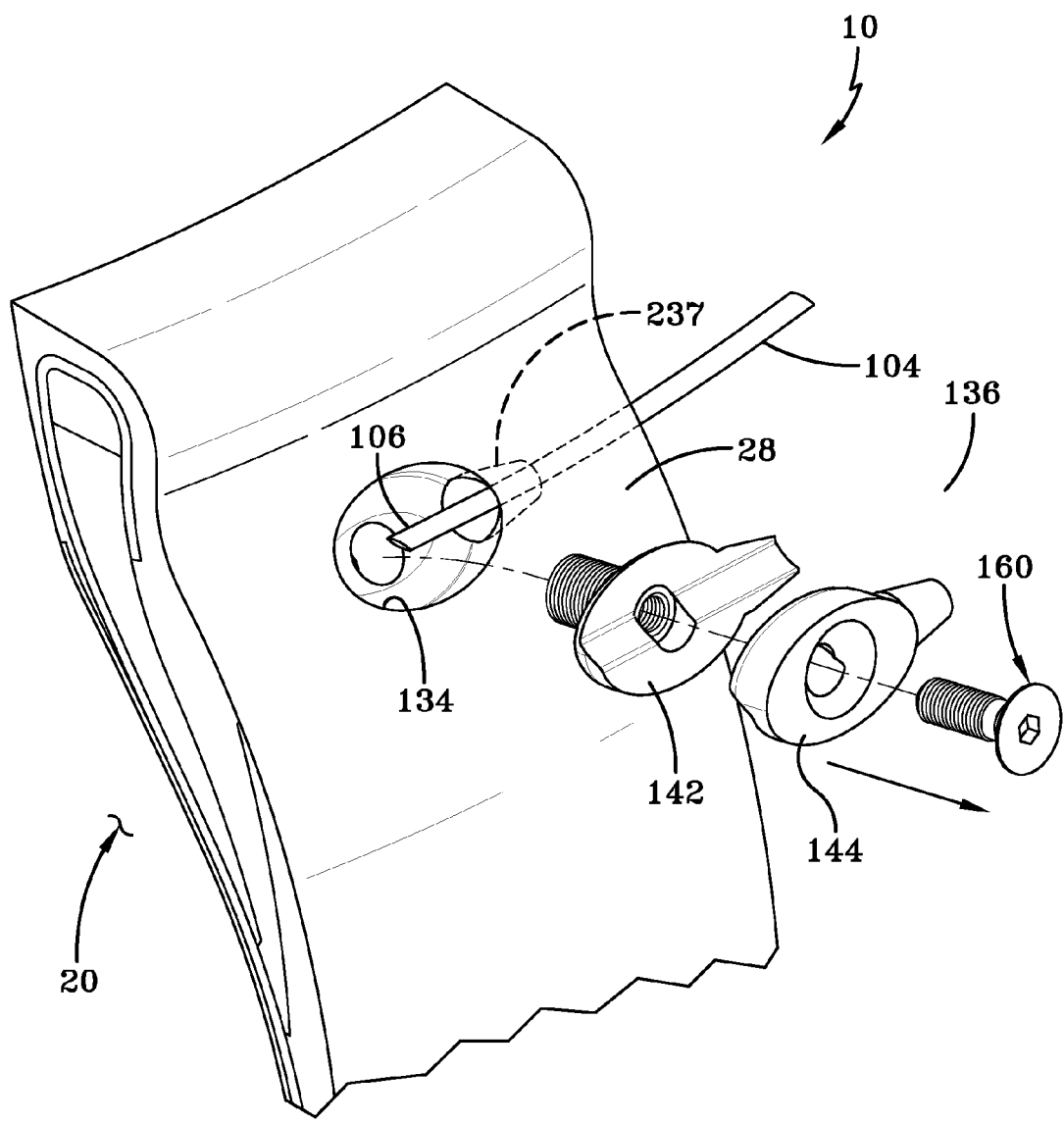
FIG. 25 is an exploded view of the outlet core halves disassembled and removed from the sidewall cavity.
Figure 26:
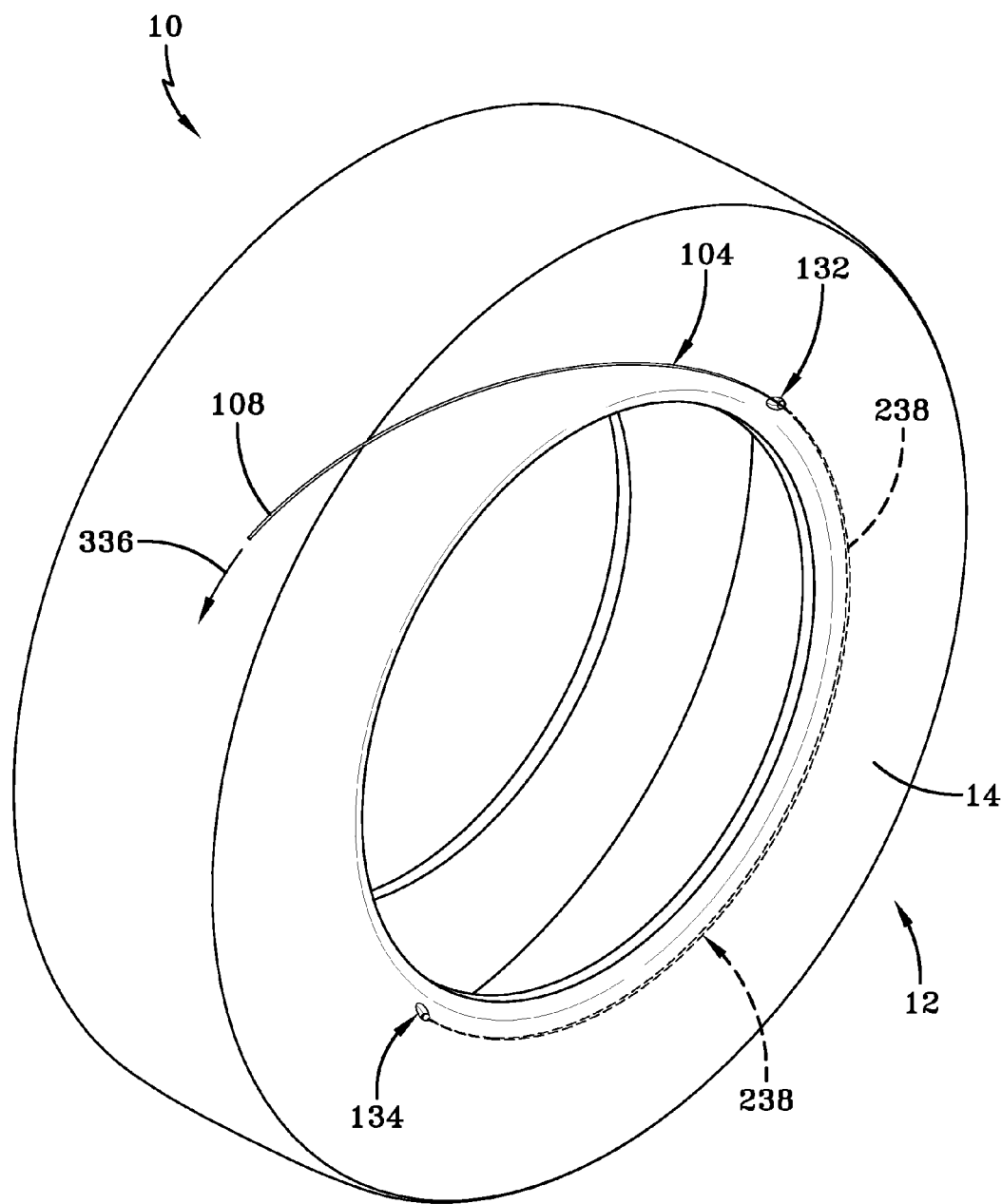
FIG. 26 is a side elevation showing the silicone core strip removed from the tire sidewall.
Figure 27:
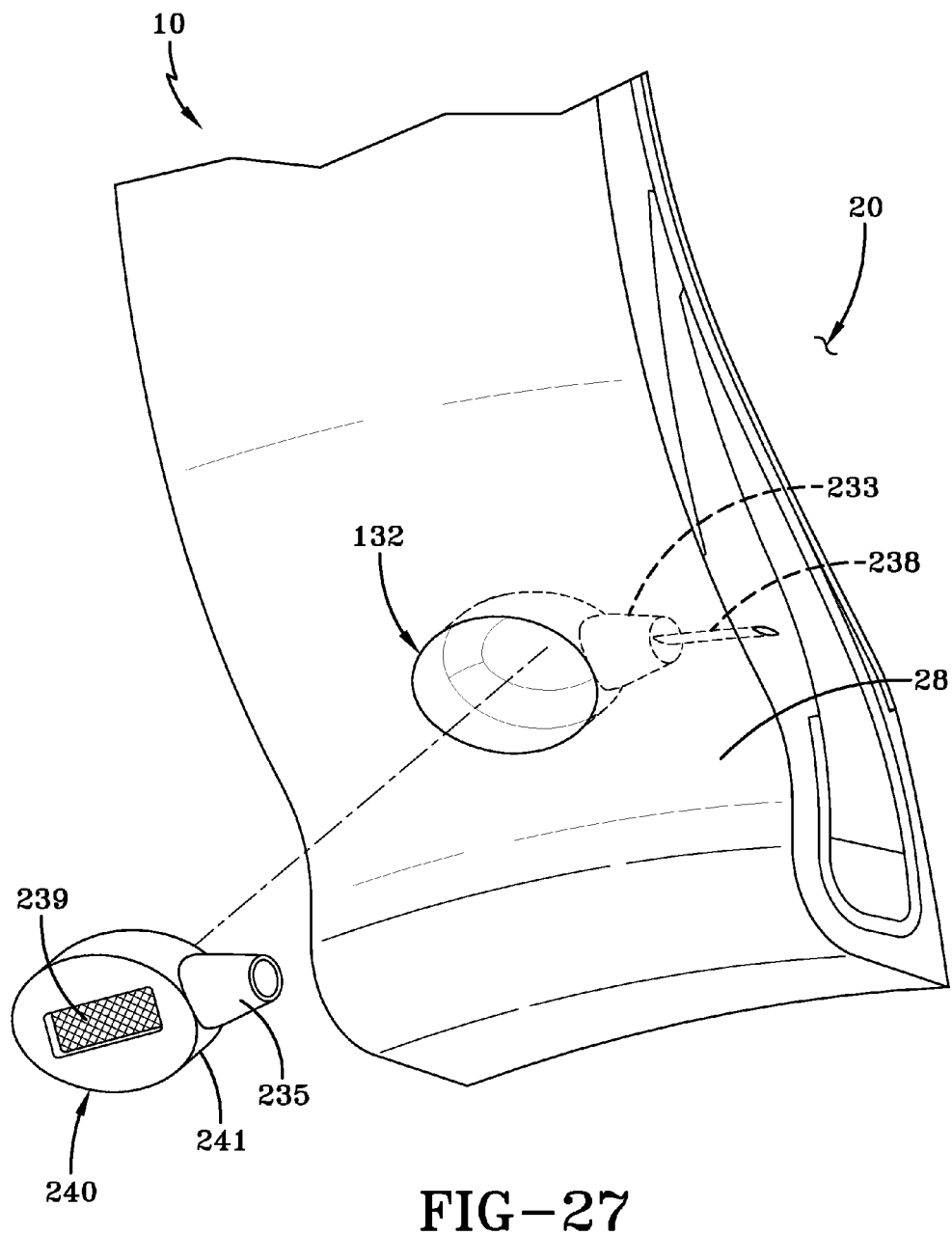
FIG. 27 is an enlarged sectioned view showing the finished inlet cavity ready for permanent inlet insert placement.

Referring to FIG. 23, the post-cure removal of the half-housings 178, 180 from the inlet cavity 132 is shown. The cavity 132 is thus opened including a funnel-shaped cavity portion 233. FIGS. 24 and 25 show the nut 140 removed from the outlet core threaded shaft 146 to initiate a post-cure removal of the outlet core assembly 136. The assembly components 142, 144 are removed from the outlet cavity 134, leaving the cavity 134 including funnel-shaped adjacent cavity portion 237 open. Thereafter, as shown by FIGS. 26 and 27, the silicone core strip assembly 104 is removed from the tire chafer channel, whereby the chafer channel left by the vacated core strip assembly 104 becomes an elongate unobstructed 180 degree air passageway 238 from the inlet cavity 132 to the outlet cavity 134, wholly integrated within the chafer component 28. FIG. 27 shows the post-cure insertion of permanent inlet cavity assembly 240 into the inlet cavity 132. The assembly 240 includes a hollow casing 241 having an internal cavity (not shown) housing a porous air filter (not shown). The installed casing 241 replicates the configuration and shape of the hollow housing 170 described in reference to FIGS. 15A. A conical coupling protrusion 235 extends from the casing 241 and into the funnel cavity 233 off the inlet cavity 132. The protrusion 235 has an internal air passageway which communicates with the cavity within casing 241. An air inlet opening 239 is disposed within an outward face of the casing 241 to allow air to enter into the casing 241 and, from there, to the air passageway within protrusion 235, and then into the integral chafer air passageway 238.

Figure 28A:
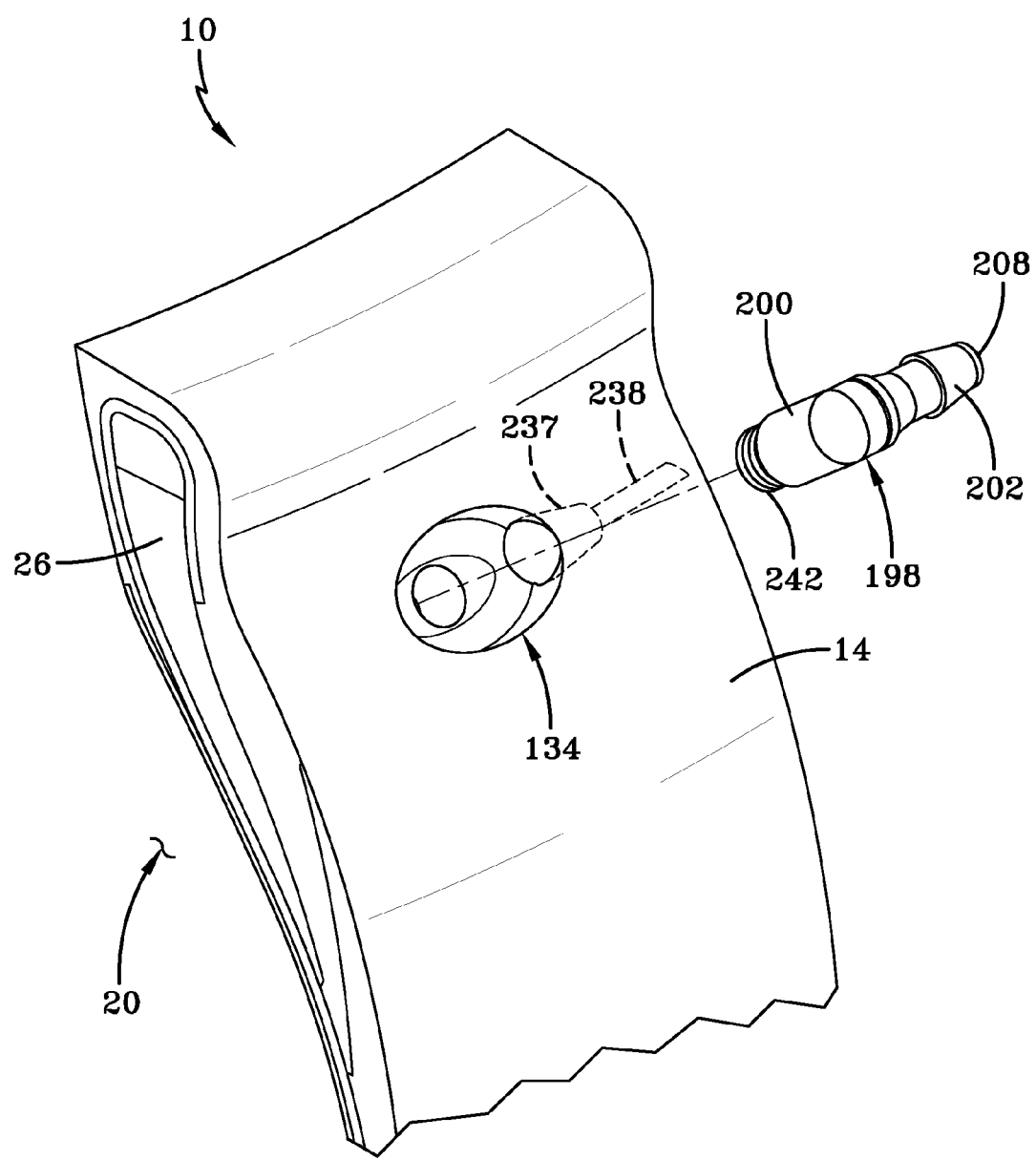
FIG. 28A is an enlarged sectioned view showing the threaded elbow component placed into the outlet cavity.
Figure 28B:
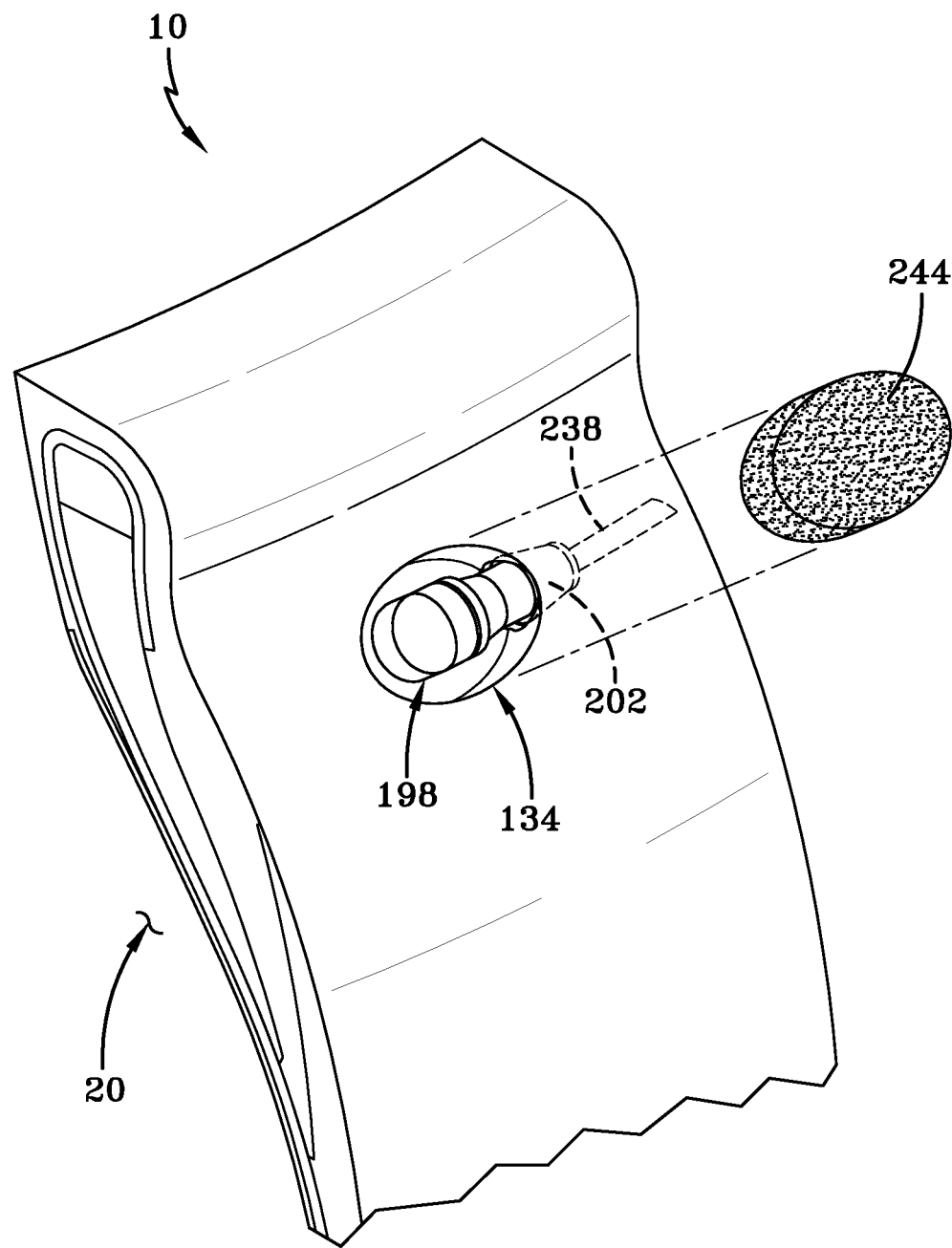
FIG. 28B is an enlarged sectioned view showing the elbow component fully inserted through the sidewall to the cavity chamber with a leading end placed into conical opening and a rubber plug/patch ready to fill the opening.
Figure 28C:
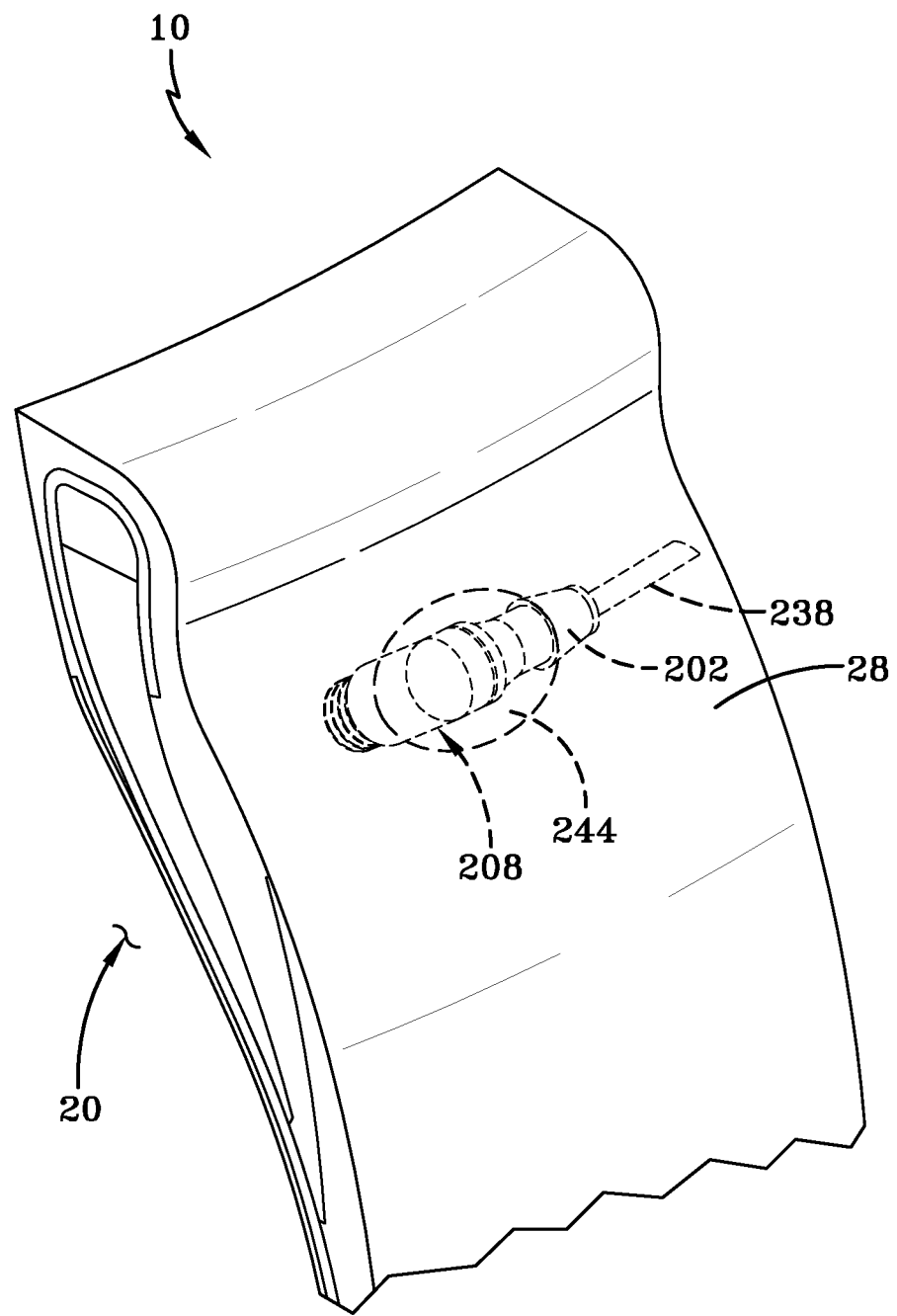
FIG. 28C is enlarged sectioned view showing the patched area after 30 minute cure.
Figure 29A:
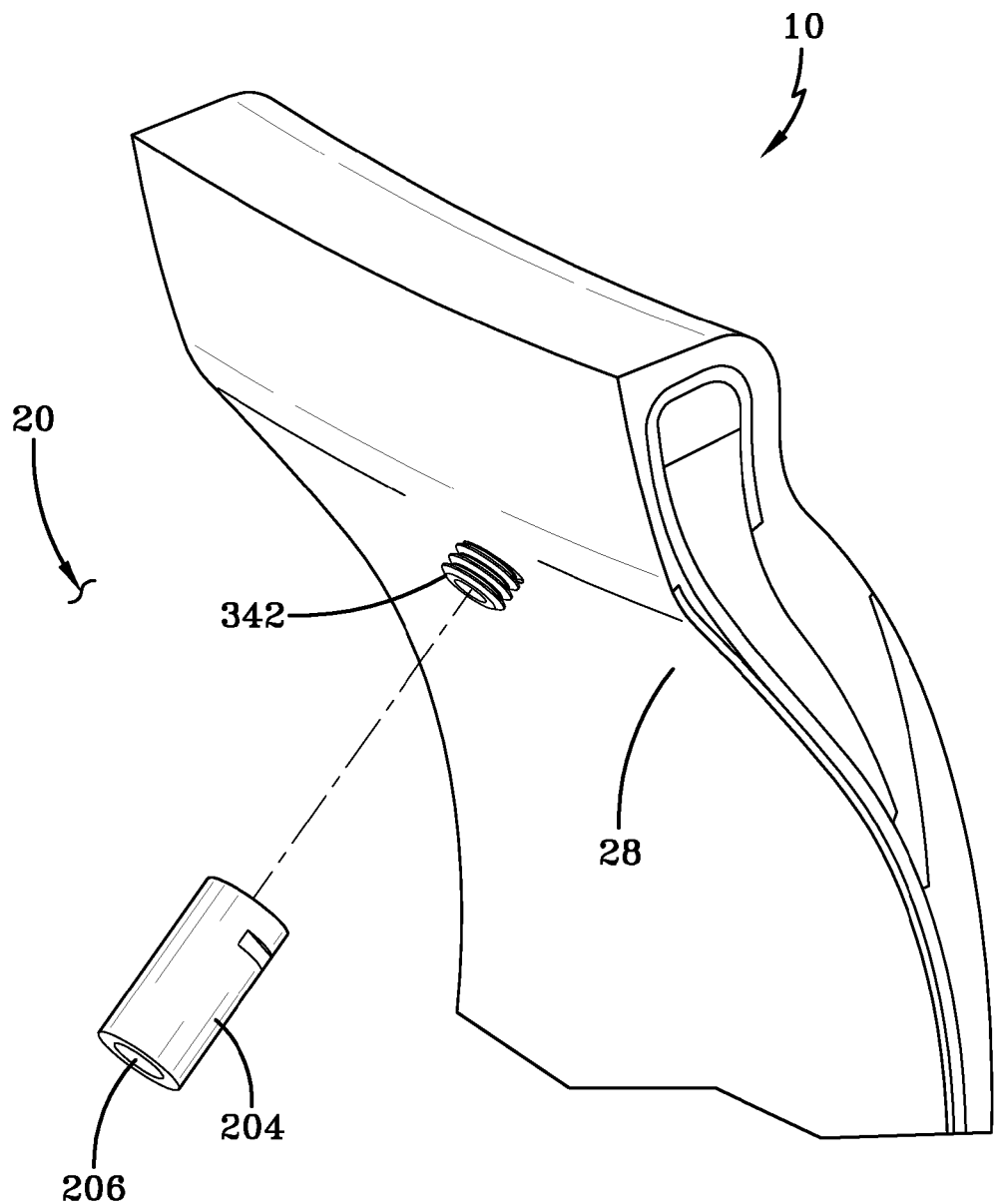
FIG. 29A is an enlarged sectioned view from the cavity chamber showing the outlet valve ready to be threaded onto outlet elbow component.
Figure 29B:
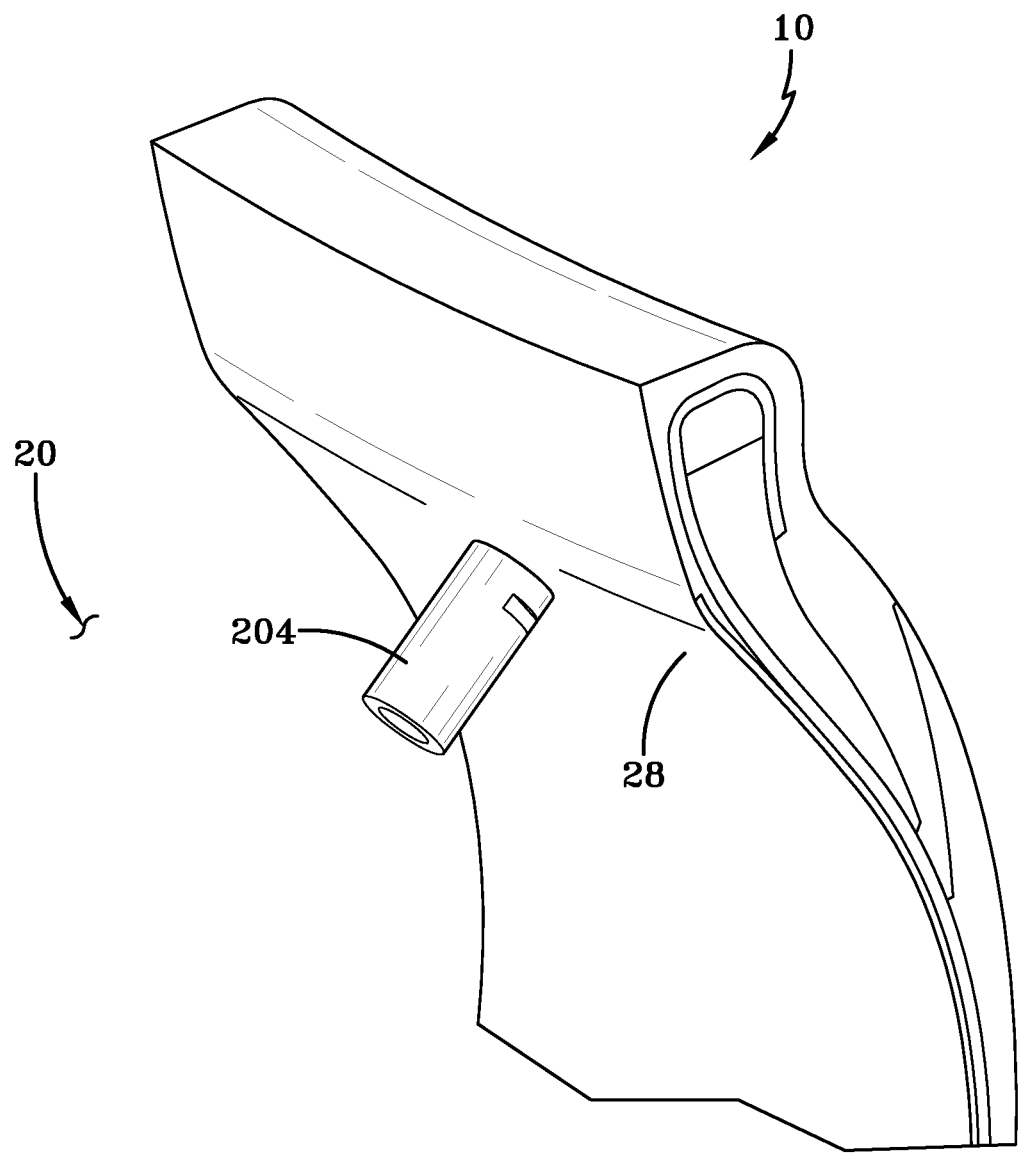
FIG. 29B is an enlarged sectioned view of the outlet valve shown fully seated onto the elbow component to thus complete the first embodiment operation.
Figure 30A:
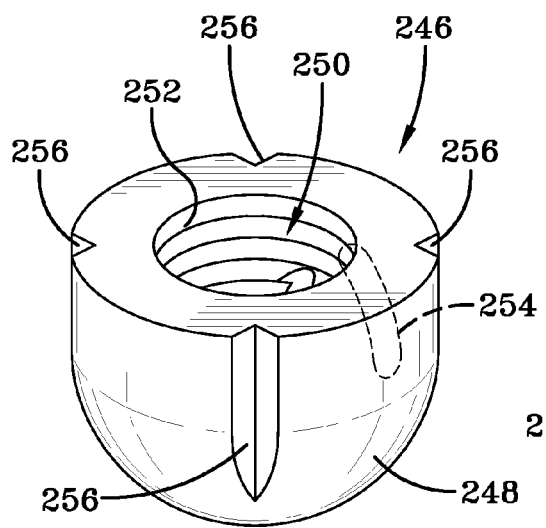
FIGS. 30A through 30D are detailed views of a second, alternative, embodiment of the assembly including an inlet dome nut.
Figure 30B:
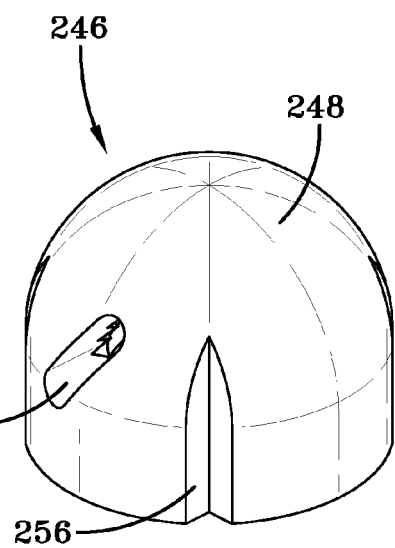
Figure 30C:
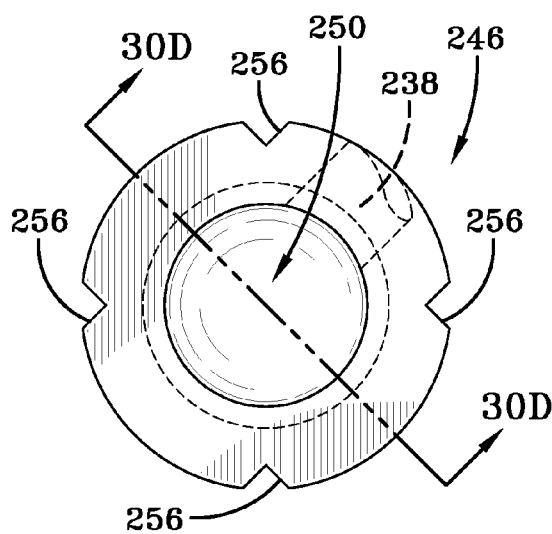
Figure 30D:
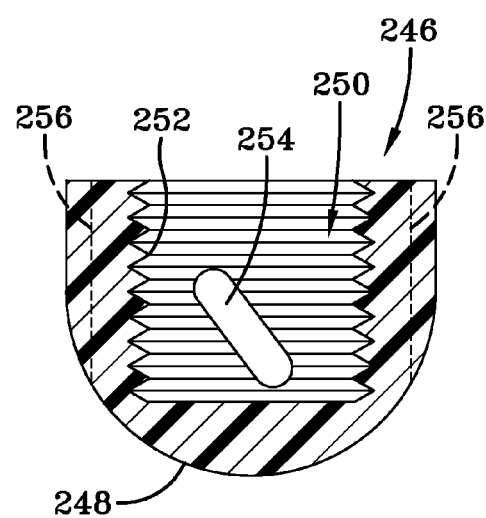
Figure 30E:
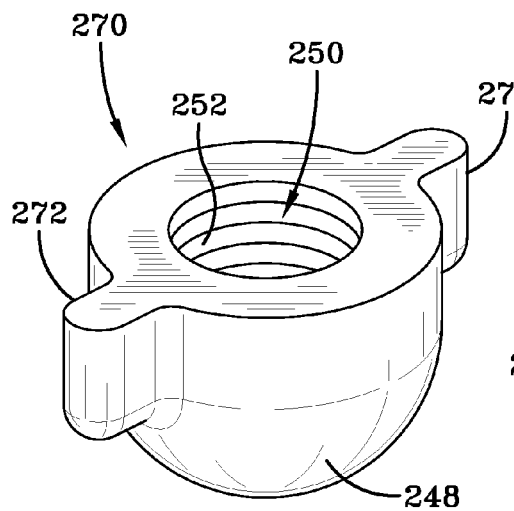
FIGS. 30E through 30H are detailed views of the outlet dome nut embodiment.
Figure 30F:
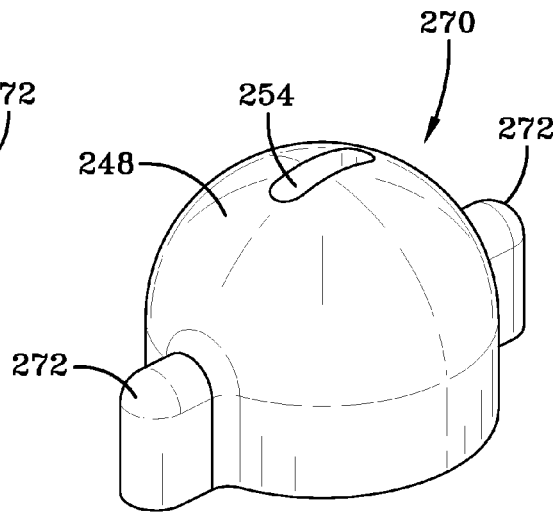
Figure 30H:
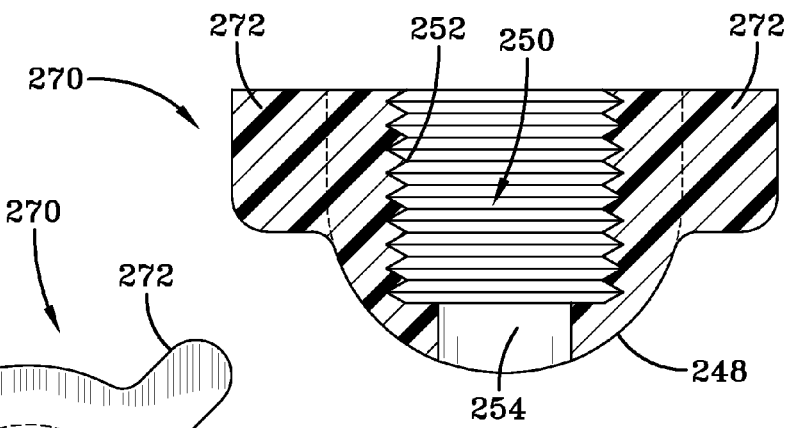
Figure 30G:
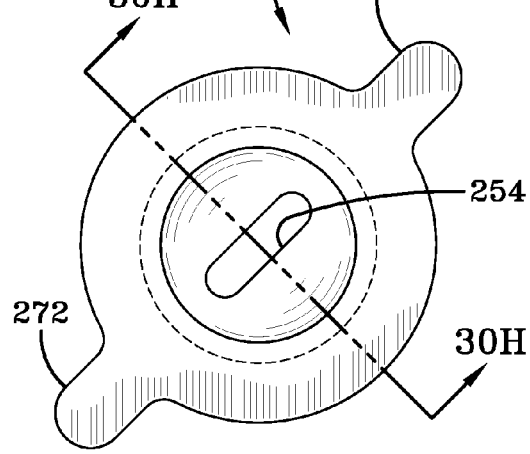

With reference to FIGS. 28A, 28B and 28C, the permanent outlet cavity insert assembly 198 in the embodiment shown in FIGS. 16A and 16B is inserted post-cure into the outlet cavity 134. The conical coupling protrusion 202 is seated within the funnel cavity 237 off the outlet cavity 134 while the L-shaped housing 200 seats within the cavity 134. The threaded coupling end 242 of the assembly 198 depends from the cavity 134 and projects into the tire cavity as shown in FIGS. 29A and 29B. Air flow along post-cure air passageway 238 toward the outlet assembly 198 is captured within the axial bore 208 and directed within the housing 200 to the threaded end 242. As seen in FIG. 28B, a plug 244 formed from rubber or a rubber composite or other suitable material, is inserted into the outlet cavity 134 to enclose the assembly 198 therein.

In FIG. 29A and 29B, a valve mechanism such as valve assembly 198 (FIGS. 16A and 16B), that attaches to the screw threaded end 342 of the post-cure outlet cavity insert assembly 198 from the tire cavity 20 side. The valve assembly 198 opens when the pressure inside the pump tube is greater than the pressure inside the cavity 20 (plus the valve cracking pressure). The L-shaped elbow assembly 198 directs air from the chafer air passageway 338, through the axial passageway 208 of housing 200, into the housing 204 of the valve mechanism. The conical seating between end 202 and the conical entryway 237 into passageway 338 ensures that that air from the chafer passageway 338 is effectively routed into the elbow valve assembly 198.

FIGS. 30A through 30D are views of an alternative, second embodiment of an inlet cavity insert assembly incorporating a dome nut 246. The dome nut 246 has a rounded domed body 248, a center cavity 250, and internal coupling threads 252. Extending through a side of the dome body 248 is an elongate through-slot 254 dimensioned to accommodate close receipt of the silicone strip assembly 104 therethrough. Through slot 254 can be either on the side for the inlet insert or on the crown for the outlet insert. The through-slot 254 communicates with the internal center cavity 250 of the dome nut 246. Four spaced apart elongate indentations 256 are placed within an external surface of the domed body 248 to avoid rotation of the nut when screwing either the filter or the valve to the thread.

FIGS. 30E through 30H are views showing a third embodiment of the inlet cavity insert assembly employing an alternative dome nut 270. The dome nut 270 has a domed body 248, center cavity 250, and coupling threads 252. A pair of gripping flanges 272 extend from opposite sides of the dome body 248. In the alternative dome nut embodiment, the through-slot 254 is placed at the crown of the nut body as shown. Thus, through slot 254 can be either on the side for the inlet insert or on the crown for the outlet insert. The slot 254 in the FIGS. 30E through 30H is likewise dimensioned for close receipt of the silicone strip assembly 104.

Figure 31A:
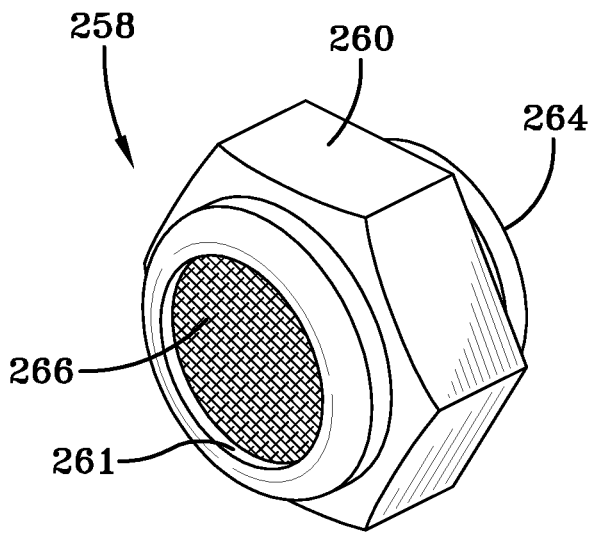
FIGS. 31A through 31C are detailed views of a second, alternative, embodiment of the inlet filter assembly.
Figure 31B:
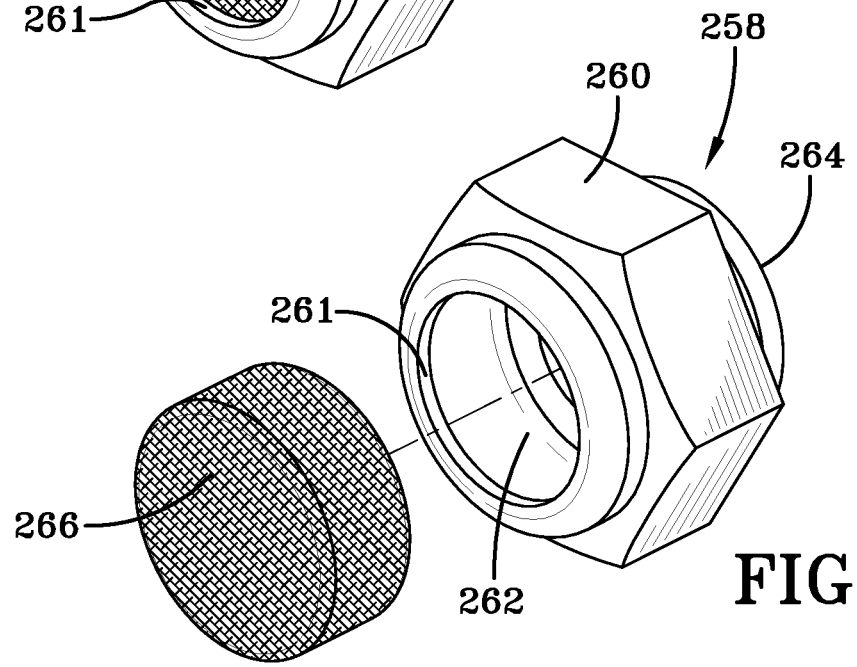
Figure 31C:
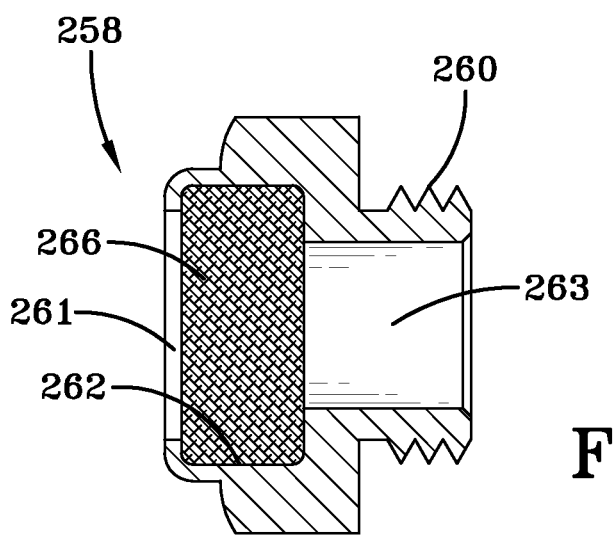
Figure 32A:
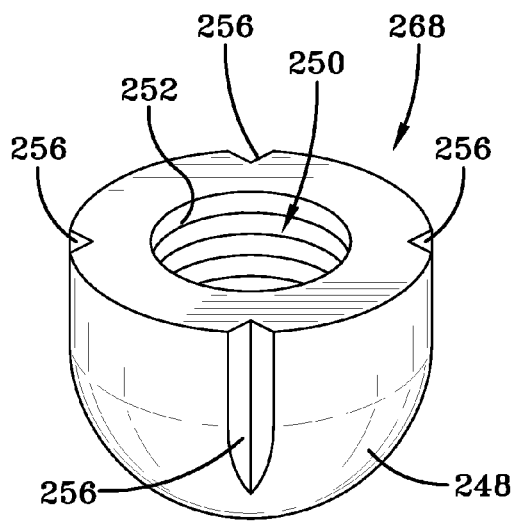
FIGS. 32A through 32D are detailed views of a second embodiment of the outlet dome nut.
Figure 32B:
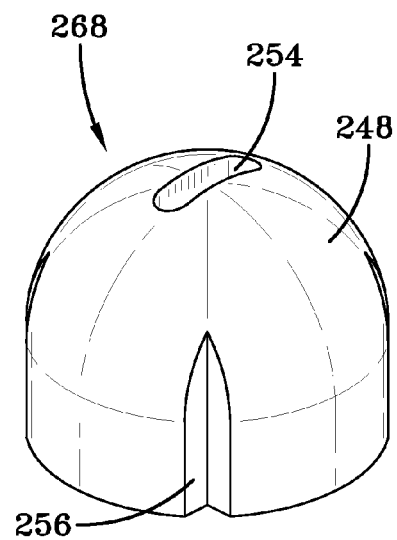
Figure 32C:
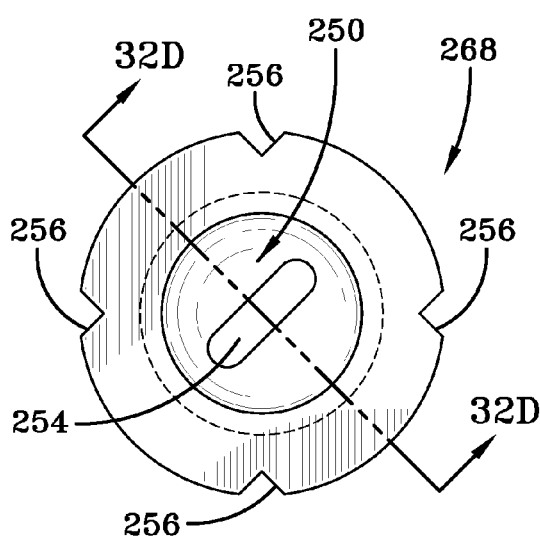
Figure 32D:
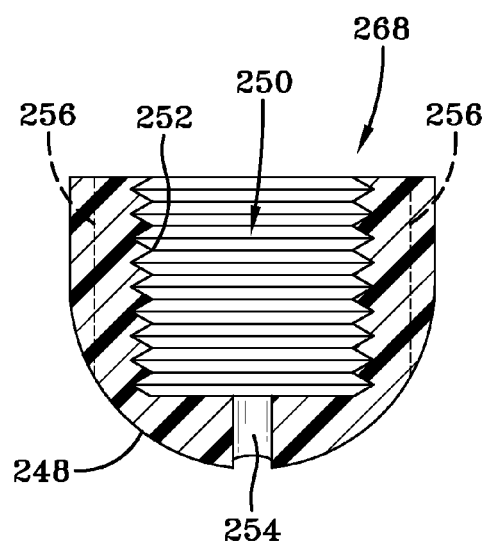

FIGS. 31A through 31C show a filter assembly 258 which couples to the inlet dome nut of FIGS. 30A through 30D or the alternative inlet dome nut of FIGS. 20E through 30H to complete the alternative post-cure inlet cavity insert assembly. The filter assembly 258 includes a hex nut body 260 having an internal chamber 262 and an externally threaded coupling post 264. The chamber 262 is sized to seat a porous filter member 266 therein. The body 260 has an opening 261 communicating with the chamber 262 to admit air into the body 260, through the filter member 266 therein, and out of an axial passage 263 through post 264. The post 264 threads into the dome nut 246 or 270.

FIGS. 32A through 32D show an embodiment of an outlet cavity insert assembly dome nut 268 in which the indentations 256 in the dome nut body are deployed as in the embodiment of inlet dome nut embodiment FIGS. 30A through 30D while the crown placement of slot 254 is similar to the inlet dome nut of FIGS. 30E through 30H. The outlet dome nut 268 has an internal chamber 250, coupling threads 252 and through-slot 254 sized to admit closely the silicone strip assembly 104.

Referring to FIGS. 33A through 33C, a second embodiment of an outlet valve assembly 272 is shown. The valve assembly 272 is an alternative to the valve assembly 204. Valve assembly 272 is a one-way ball valve including a hexagonal valve body 274, a coupling nut 276, an axial bore 278 extending through the body 274 to an outlet bore 290, a compression spring 284 seated within body 274, a threaded stop plug 282 coupled into threads 280 within bore 278, and a ball valve 286 seated within the housing 274 at the shoulder separating the axial bore 278 with the outlet passage 290. The housing 274 has an externally threaded coupling neck 288 at a forward end adapted to couple into the outlet dome nut shown in FIGS. 32A and 32B in a post-cure assembly procedure. A one-way ball valve of the type shown is commercially available, such as from Beswick Engineering located in Greenland, N.H., U.S.A. The ball valve 286 under bias from spring 284 seats against shoulder 227. The compression pressure is set by threaded insertion of plug 282 into the axial bore 278. Air pressure from the tire cavity impinges the ball 286 and forces the ball valve against shoulder 287 so long as the tire cavity pressure is at or exceeds a pressure threshold. When the pressure from the tire cavity falls below the threshold, upstream air pressure from air forced along air passageway 238 pressures on the ball 286, forcing the ball 286 away from the shoulder 227 and allowing air to flow from passageway 290, along the bore 278, out of housing 274, and into the tire cavity.

Figure 34B:
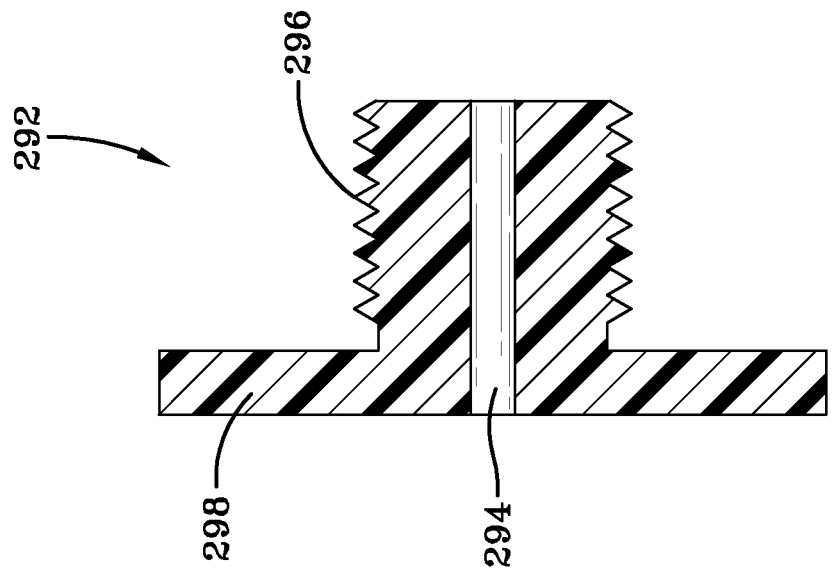
FIGS. 34A and 34B are detailed views of dome nut cap.
Figure 34A:
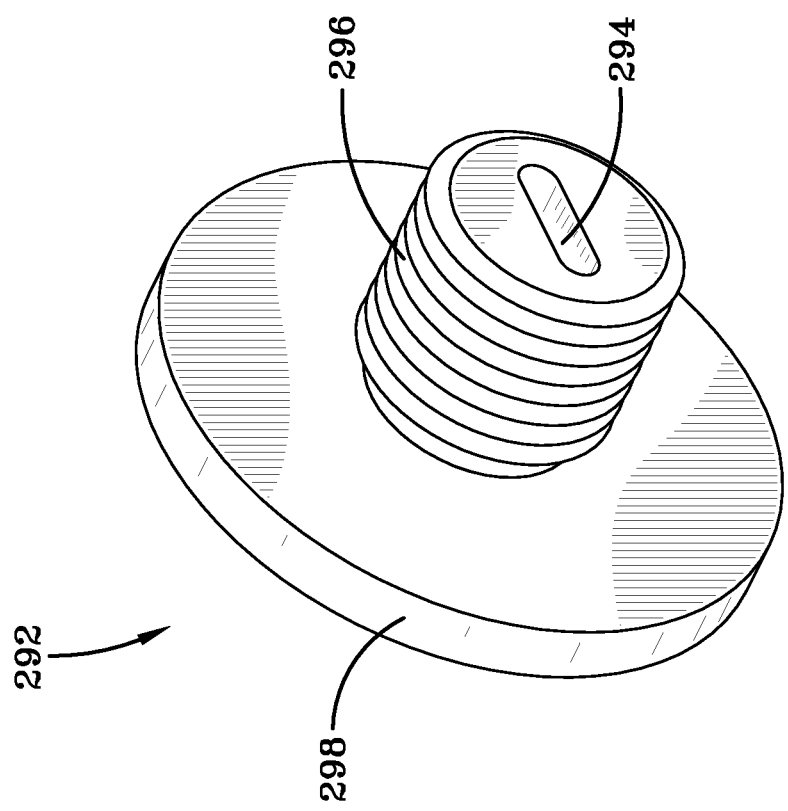
Figure 35A:
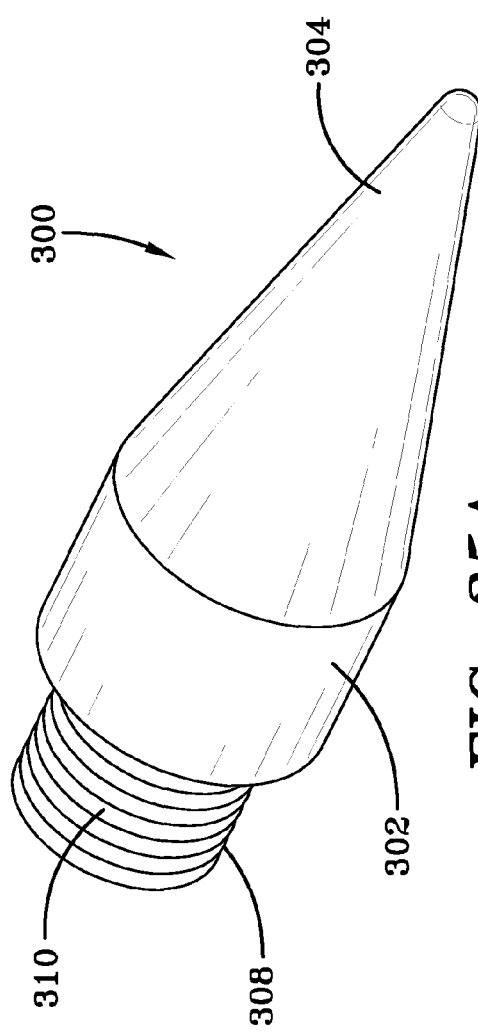
FIGS. 35A and 35B are detailed views of a hollow needle component.
Figure 35B:
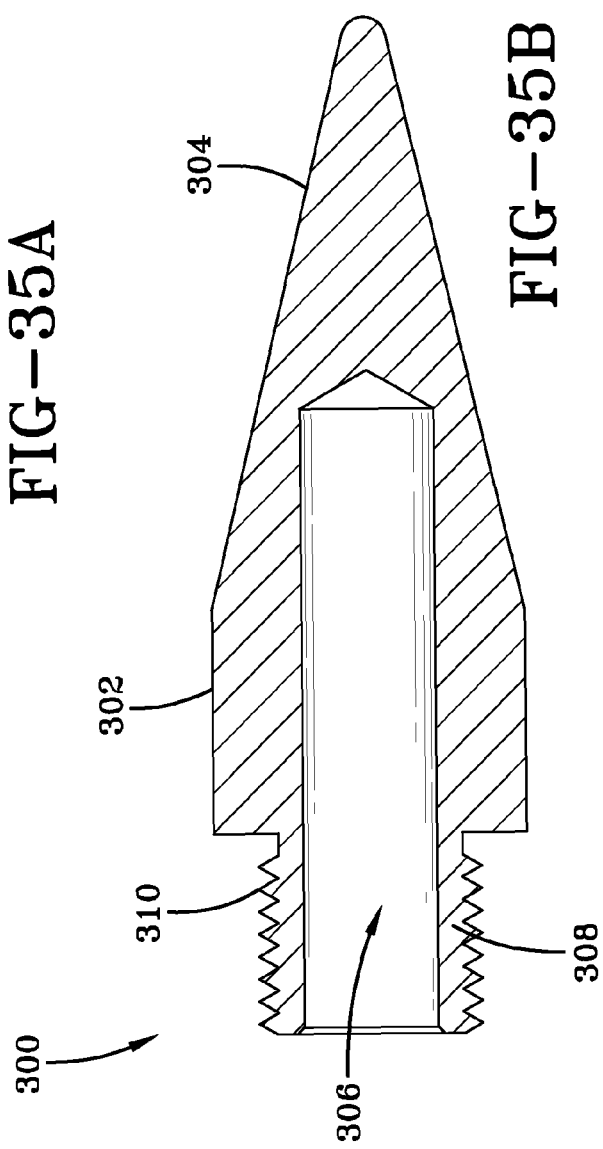

FIGS. 34A and 34B show detail views of a dome nut cap 268 for use in the dome nut system. The cap 292 includes an axial through-passageway sized and configured for receipt of an end of silicone strip assembly 104; a threaded cylindrical body 296, and a circular cap head 298. FIGS. 35A and 35B show details of the hollow needle component or punch 300 for the dome nut system embodiment. The punch 300 includes a cylindrical body 402, a conical punch nose portion 304, a blind, rearwardly open axial bore 306, and a coupling shank 308 having external threads 310.

Figure 36A:
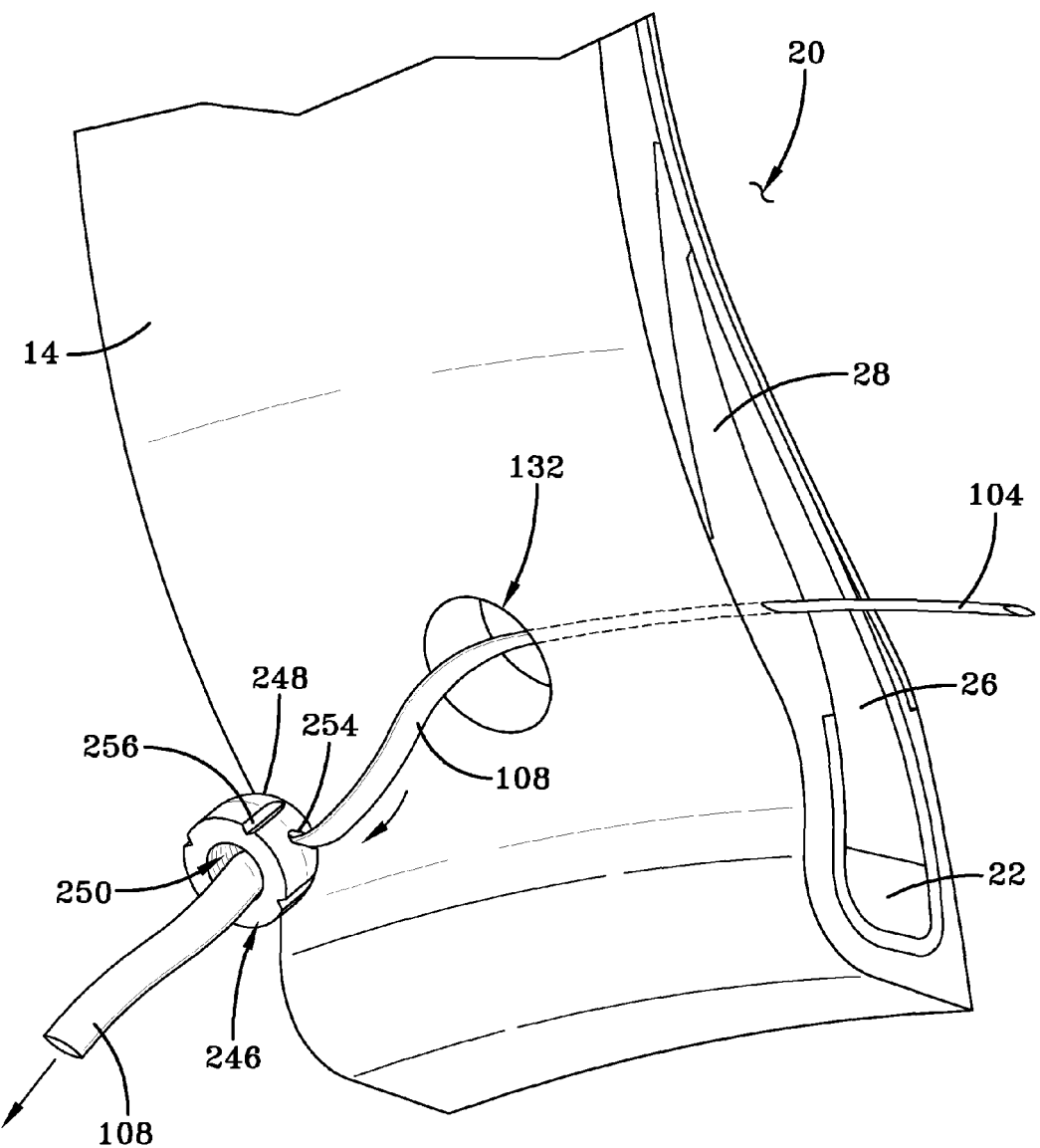
FIG. 36A is an enlarged sectioned view of a tire showing the core strip inserted through the inlet dome nut and the dome nut being placed into the formed inlet chafer opening.
Figure 36B:
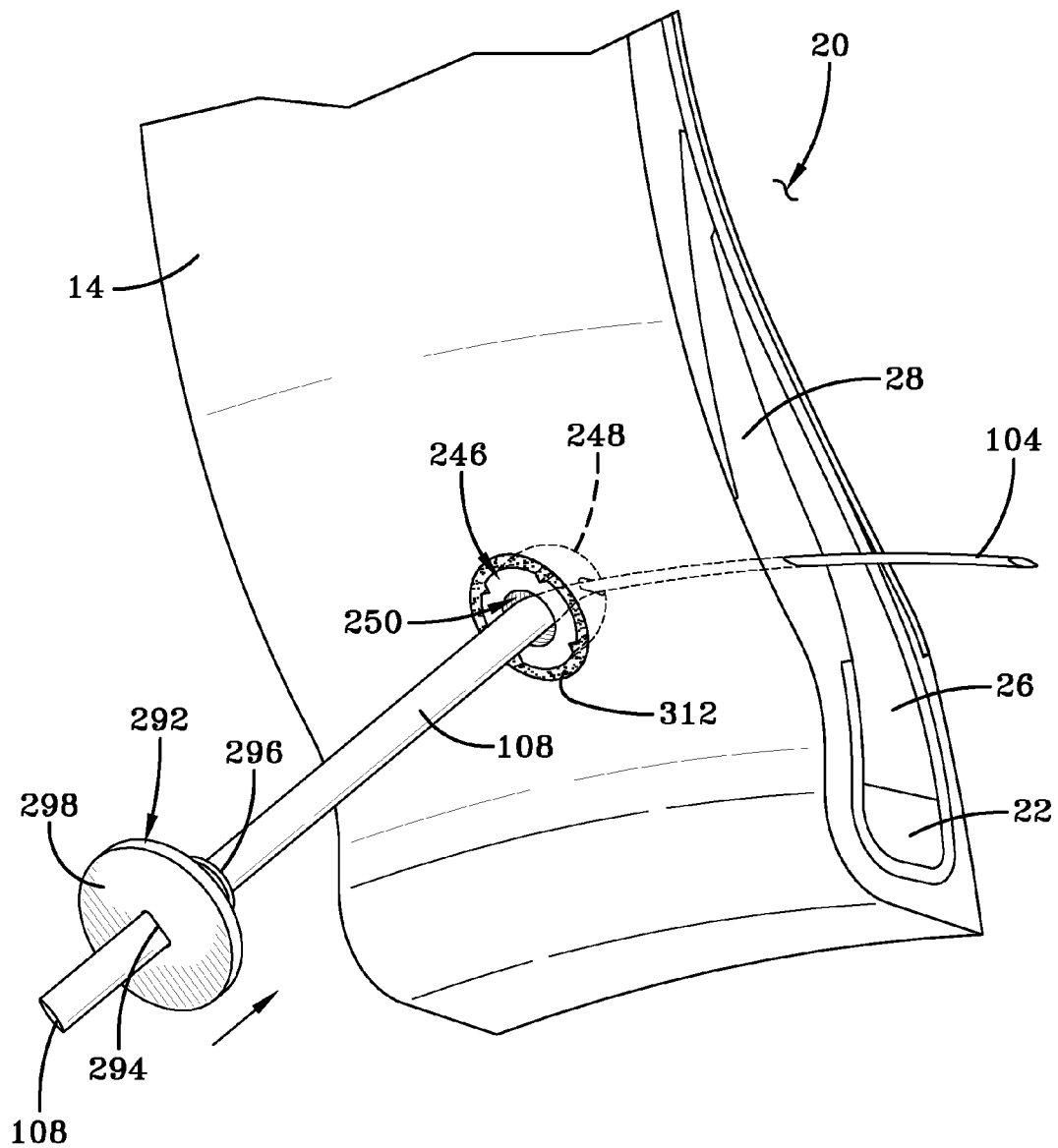
FIG. 36B is an enlarged sectioned view showing a void around the inlet dome nut filled with chafer compound and the core strip inserted through the protective cap.
Figure 36C:
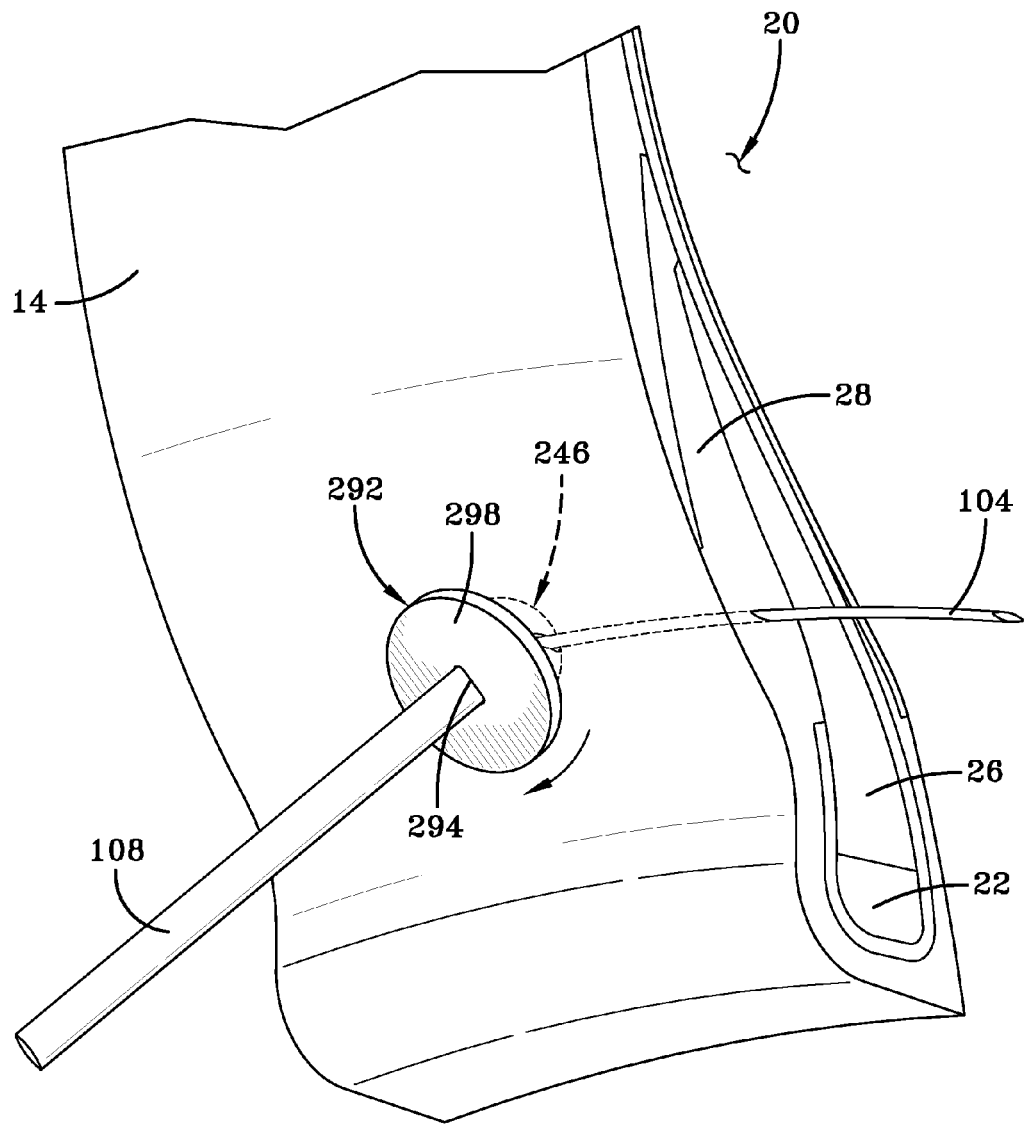
FIG. 36C is an enlarged sectioned view of the protective cap threaded into the inlet dome nut at the inlet location in anticipation of tire curing.

FIGS. 36A through 36B show in sequence the deployment of the dome nut inlet cavity insert assembly into a pre-cure tire. The silicone strip assembly 104 of the green tire extends through the chafer passageway as previously described with a surplus assembly end portion 108 protruding from the inlet cavity 132. The inlet dome nut embodiment of FIG. 30A through 30D is inverted and press inserted into the cavity 132 after free end portion 108 of the silicone strip assembly 104 is routed through the slot 254 of the dome nut 246 and free of the dome nut cavity 250. A void around the inlet dome nut 248 is filled with a chafer compound 312. The cap 292 threads into the inserted and seated dome nut 248 with free end portion 108 projected through the slit 294 of the cap 292 in anticipation of tire cure.

FIGS. 37A through 37F show in sequence the deployment of the dome nut embodiment of the outlet cavity insert assembly into a tire. The outlet free end 106 of the silicone strip assembly 104 is inserted through the crown slit 254 of an inverted outlet dome nut 268 (FIGS. 32A through 32D) and routed into the axial bore 306 of the needle component 300. The component 300 and dome nut 268 are then coupled (FIG.

Figure 37A:
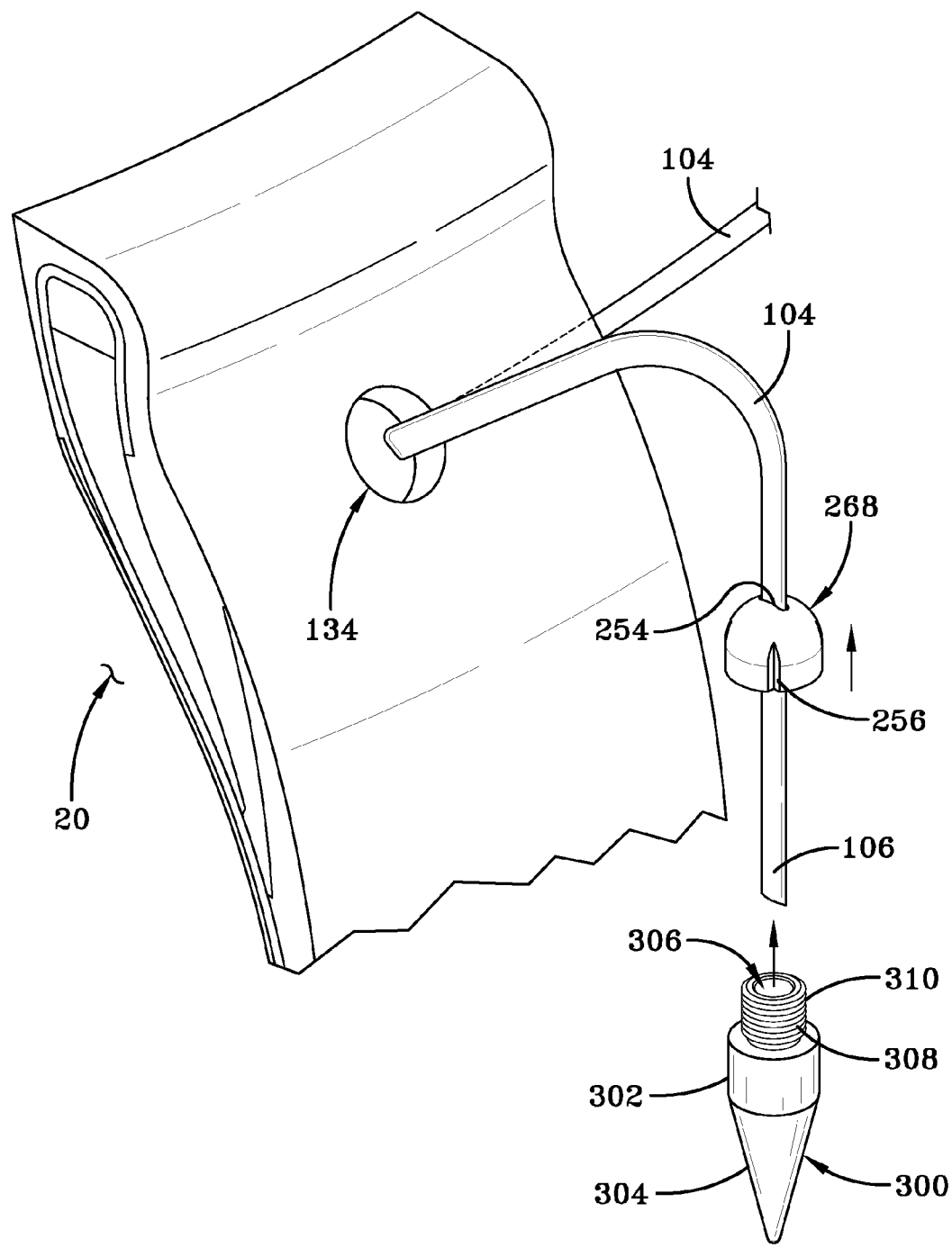
FIG. 37A is an enlarged tire section showing the core strip inserted through the outlet dome nut and pressed into the hollow needle opening.
Figure 37B:
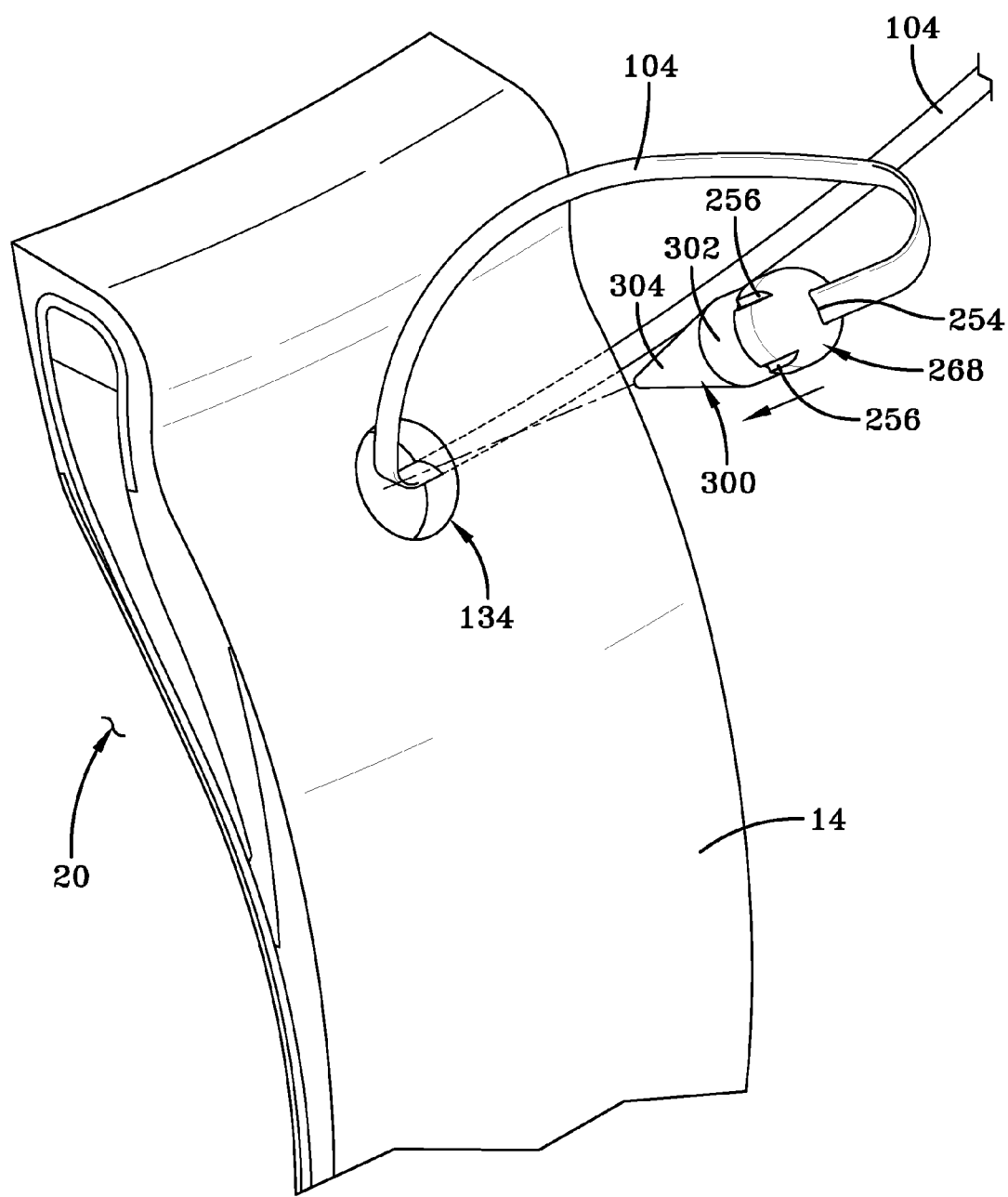
FIG. 37B is an enlarged sectioned view showing the outlet dome nut and hollow needle assembled and placed into the formed outlet chafer opening and forced though the tire sidewall.
Figure 37C:
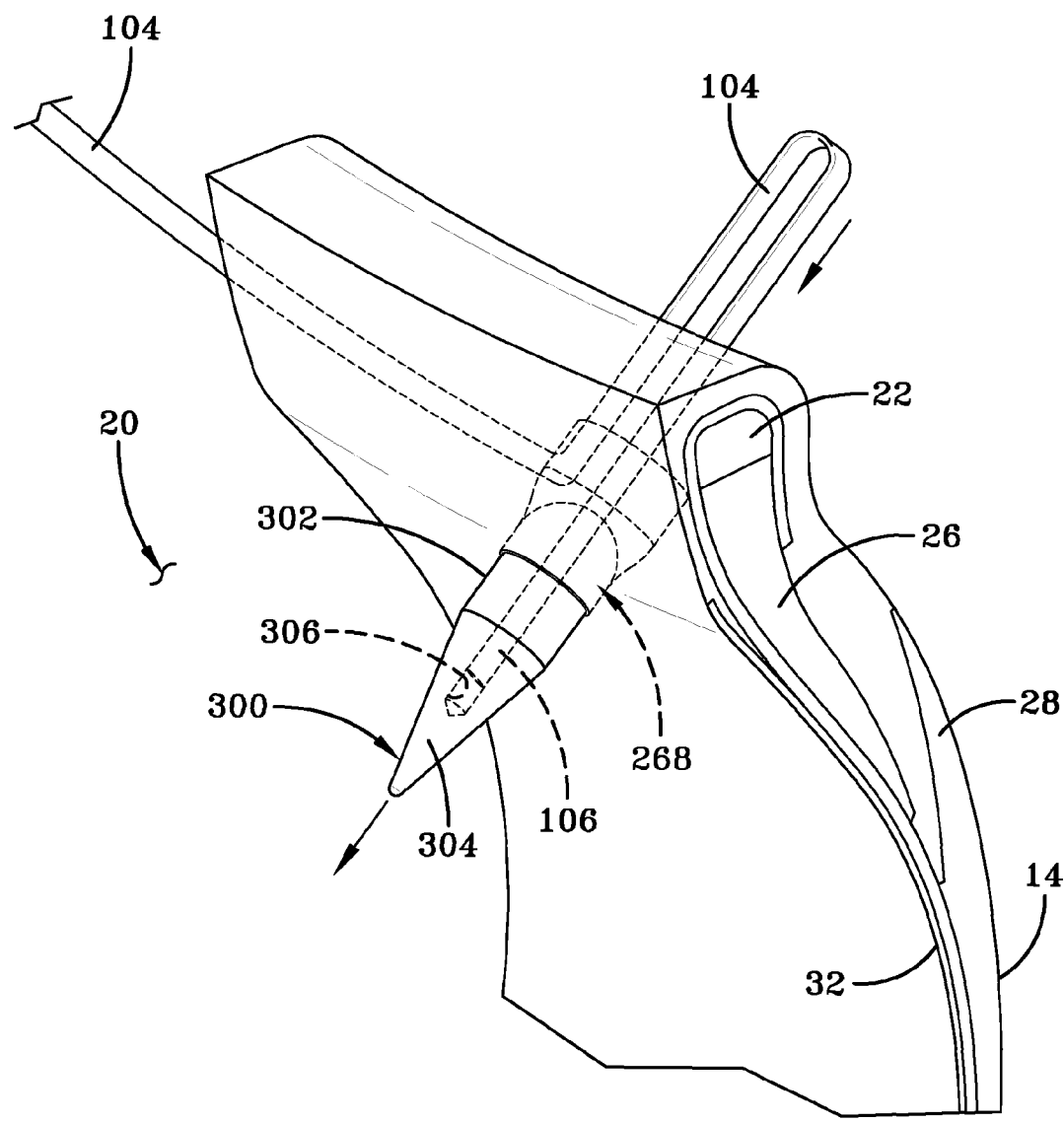
FIG. 37C is an enlarged detail view from the tire cavity showing the hollow needle fully inserted through the green tire sidewall.
Figure 37D:
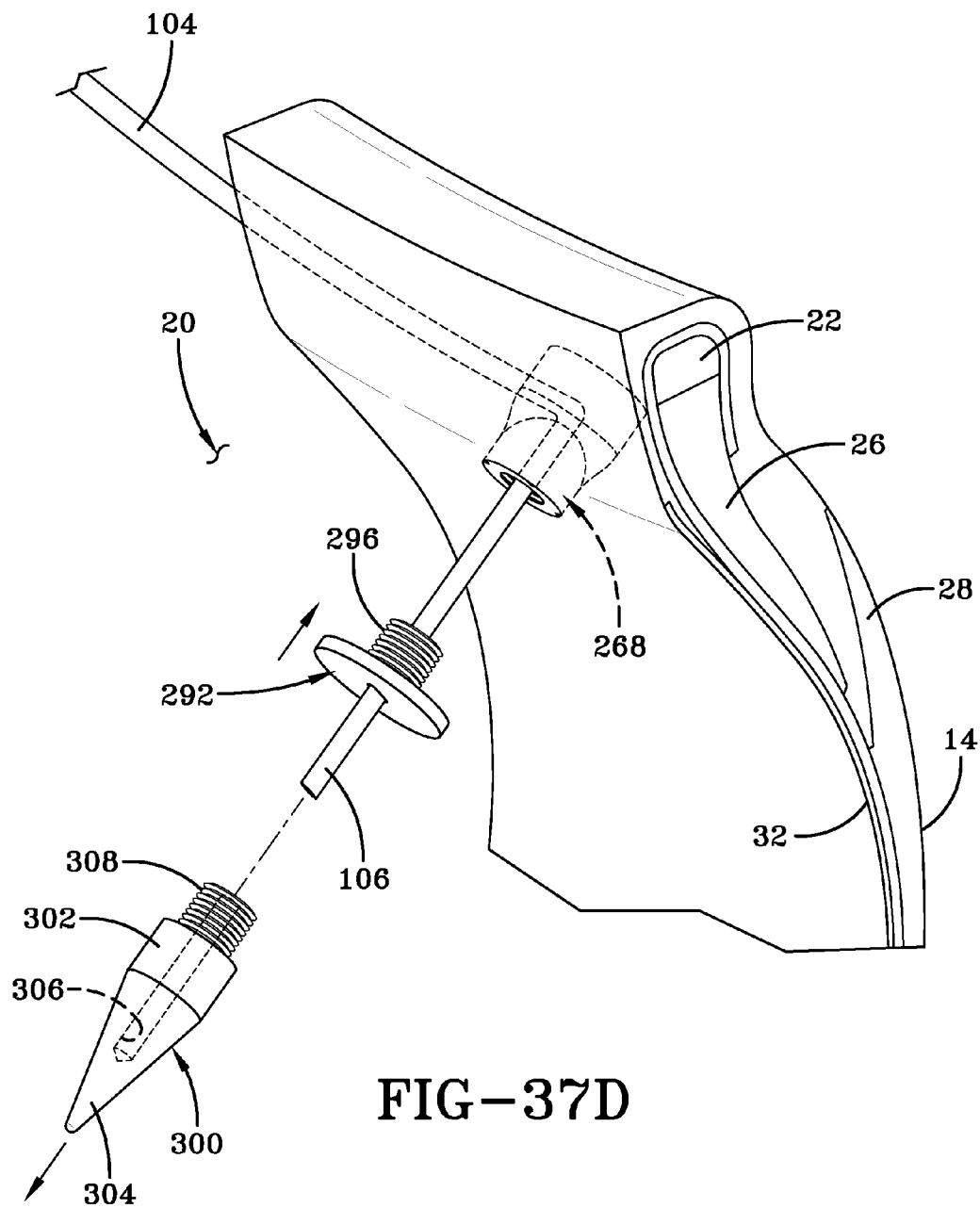
FIG. 37D is an enlarged detail view showing the hollow needle removed from the outlet dome nut and the core strip inserted through the protective cap.
Figure 37E:
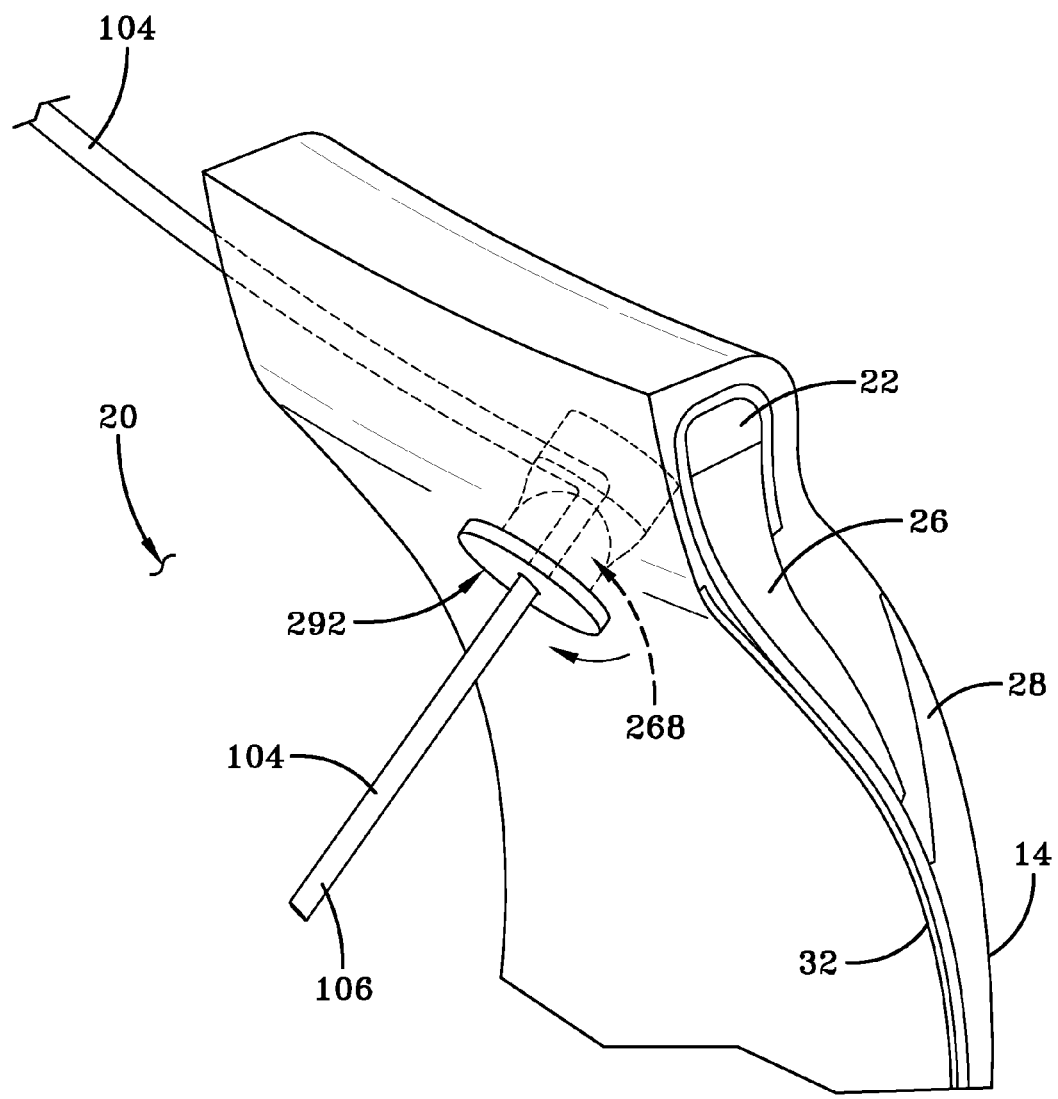
FIG. 37E is a detail view showing the protective cap threaded into the outlet dome nut.
Figure 37F:
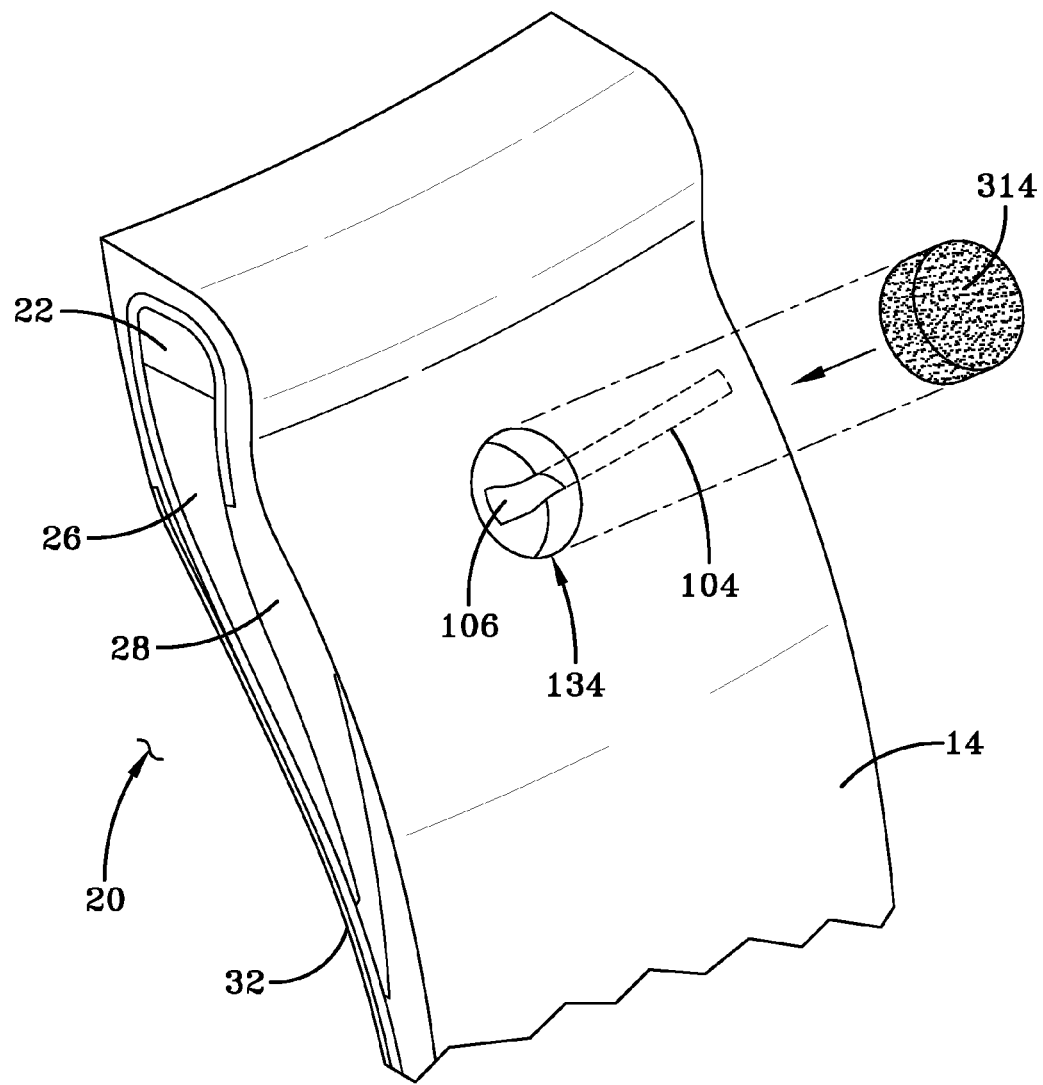
FIG. 37F is an enlarged detail view showing the outlet chafer opening fully filled with chafer compound at the outlet location in anticipation of tire curing.

37B) and inserted through the outlet cavity 134 as shown in FIG. 37C, with the needle conical tip forcing through the inner side of the tire sidewall defining cavity 20. The needle component 300 projects into the tire cavity 20 as shown. The needle component 300 is removed and replaced with the cap 292, with the free end 106 of the strip assembly 104 extending through the cap slot as shown in FIG. 37D and 37E. From the outward side of the cavity 134, a plug 314 composed of chafer material is inserted into the cavity 134 to fill the cavity for the cure procedure.

Figure 38:
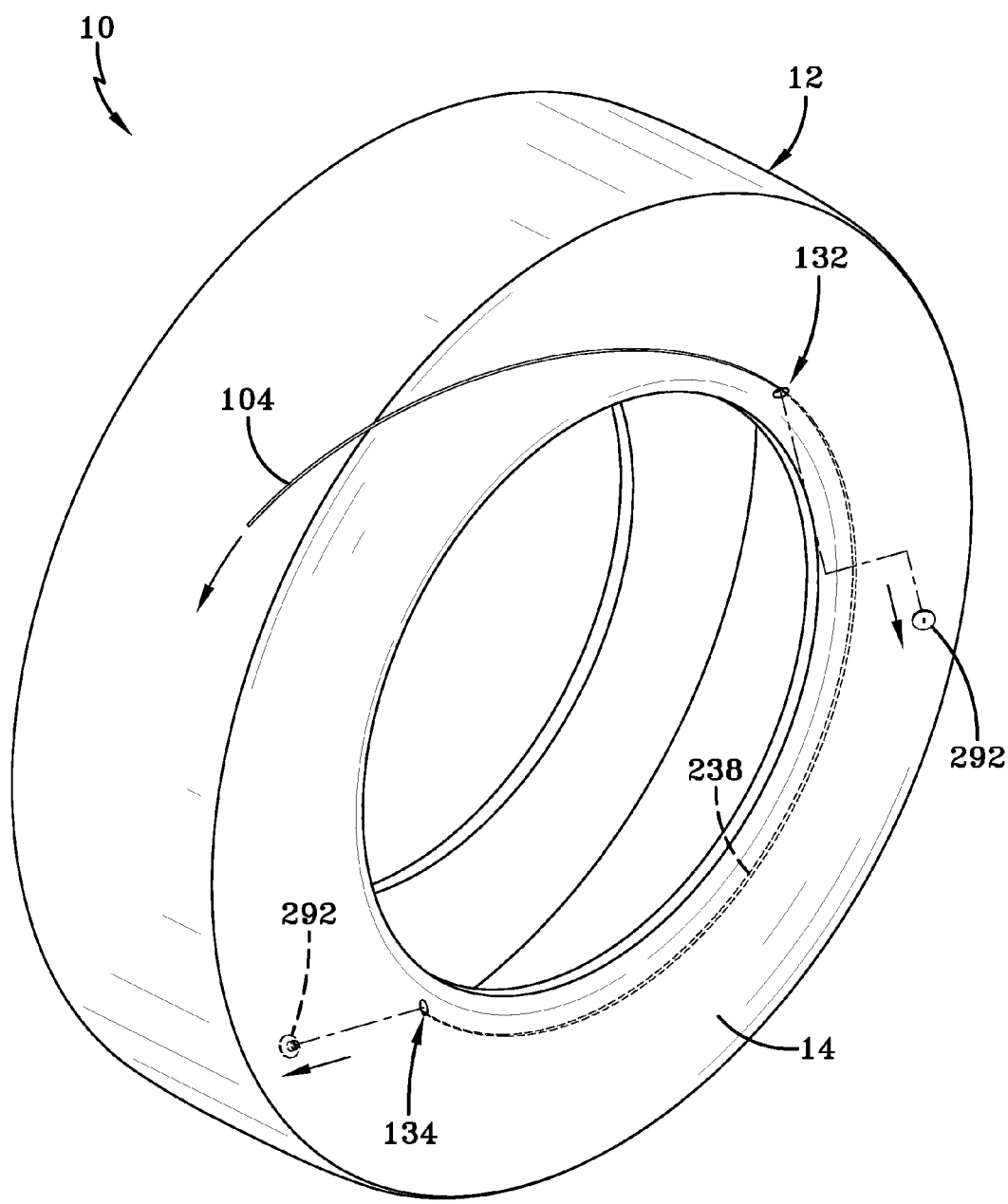
FIG. 38 is a side elevation view of the tire after curing, showing the protective caps removed from both the inlet and outlet dome nuts and the silicone core strip being removed from tire sidewall.
Figure 39:
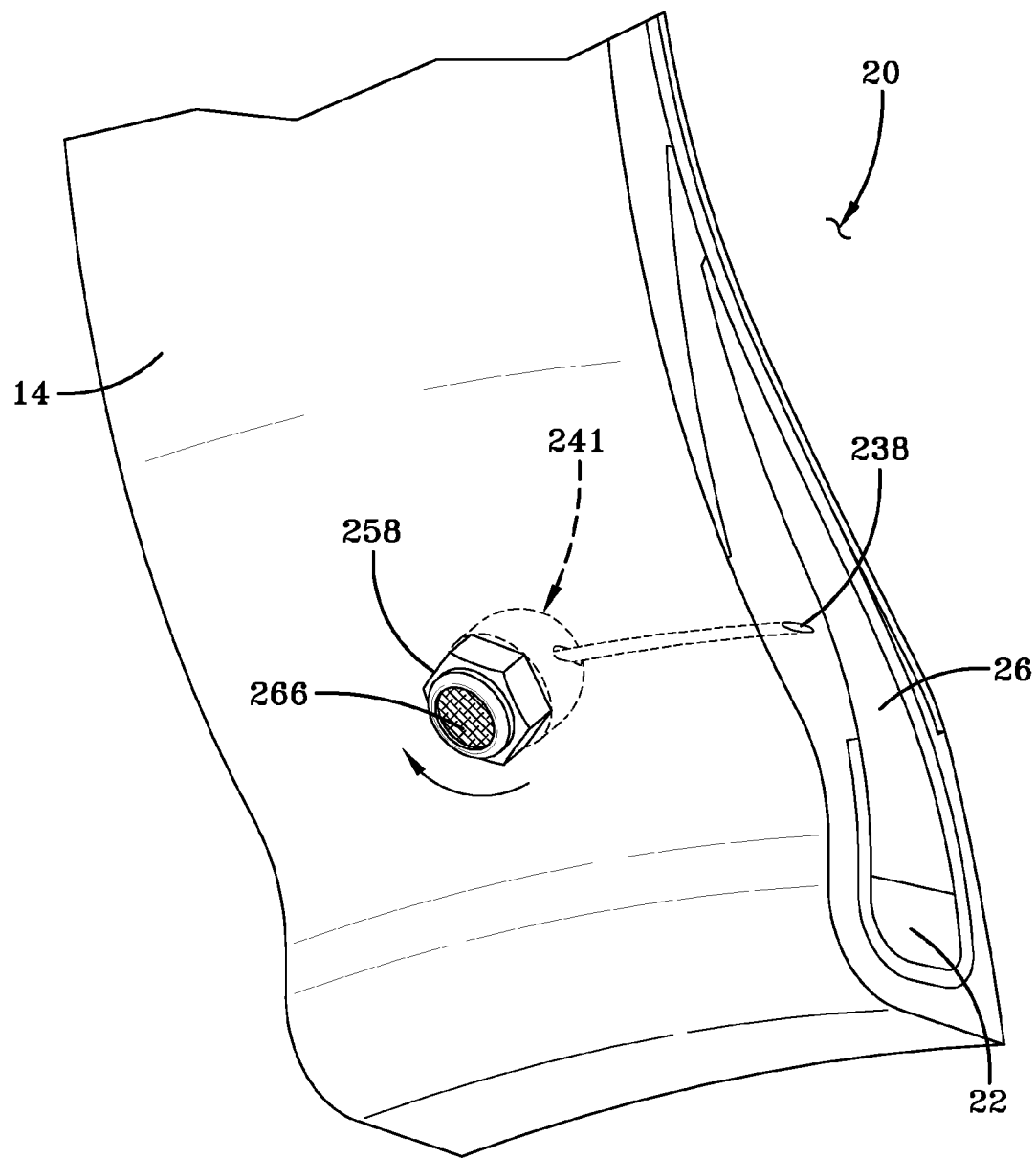
FIG. 39 is an enlarged detail view showing the filter threaded into the inlet dome nut.
Figure 40:
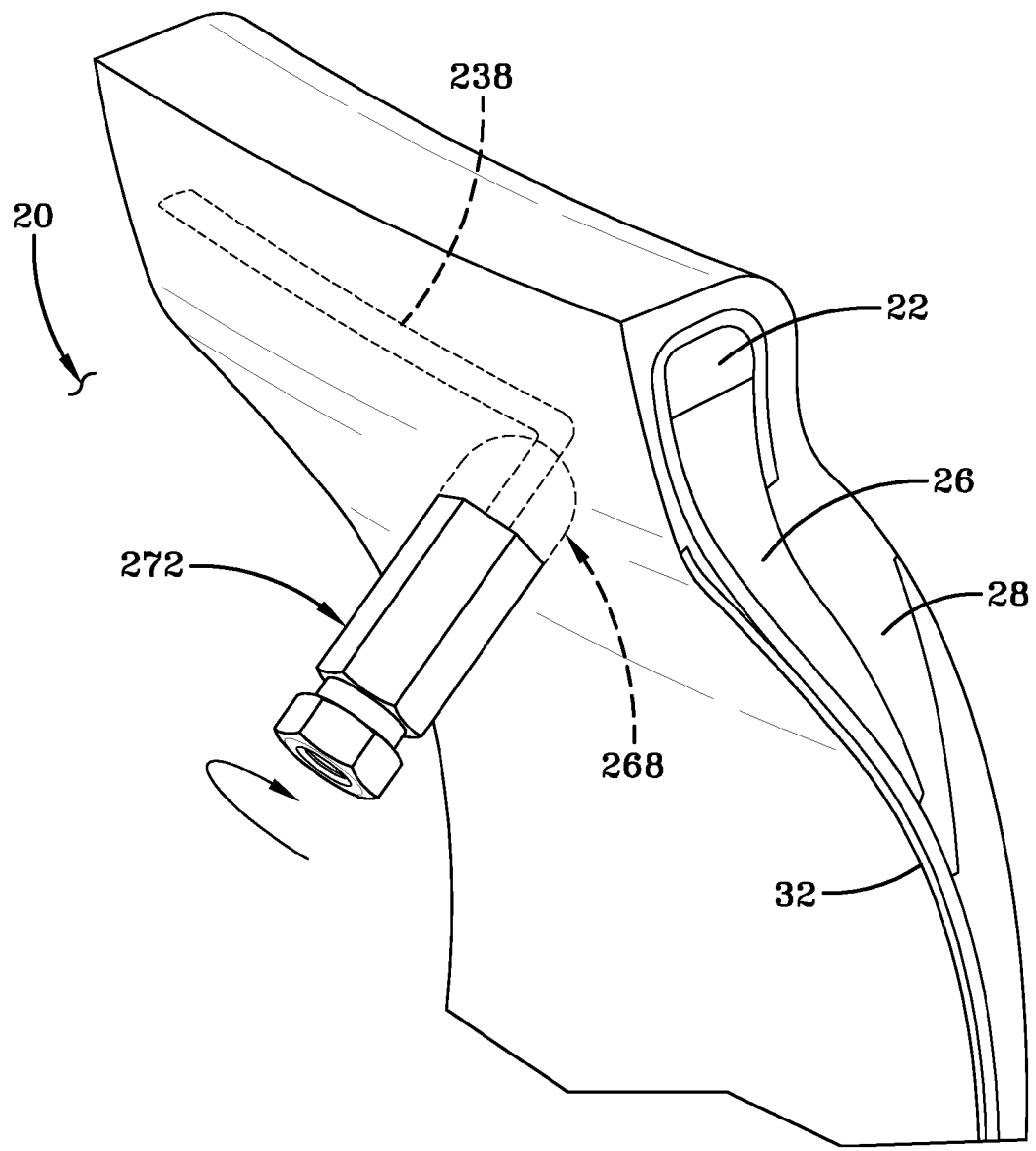
FIG. 40 is an enlarged detail view showing the one-way valve threaded into the outlet dome nut.
Figure 41:
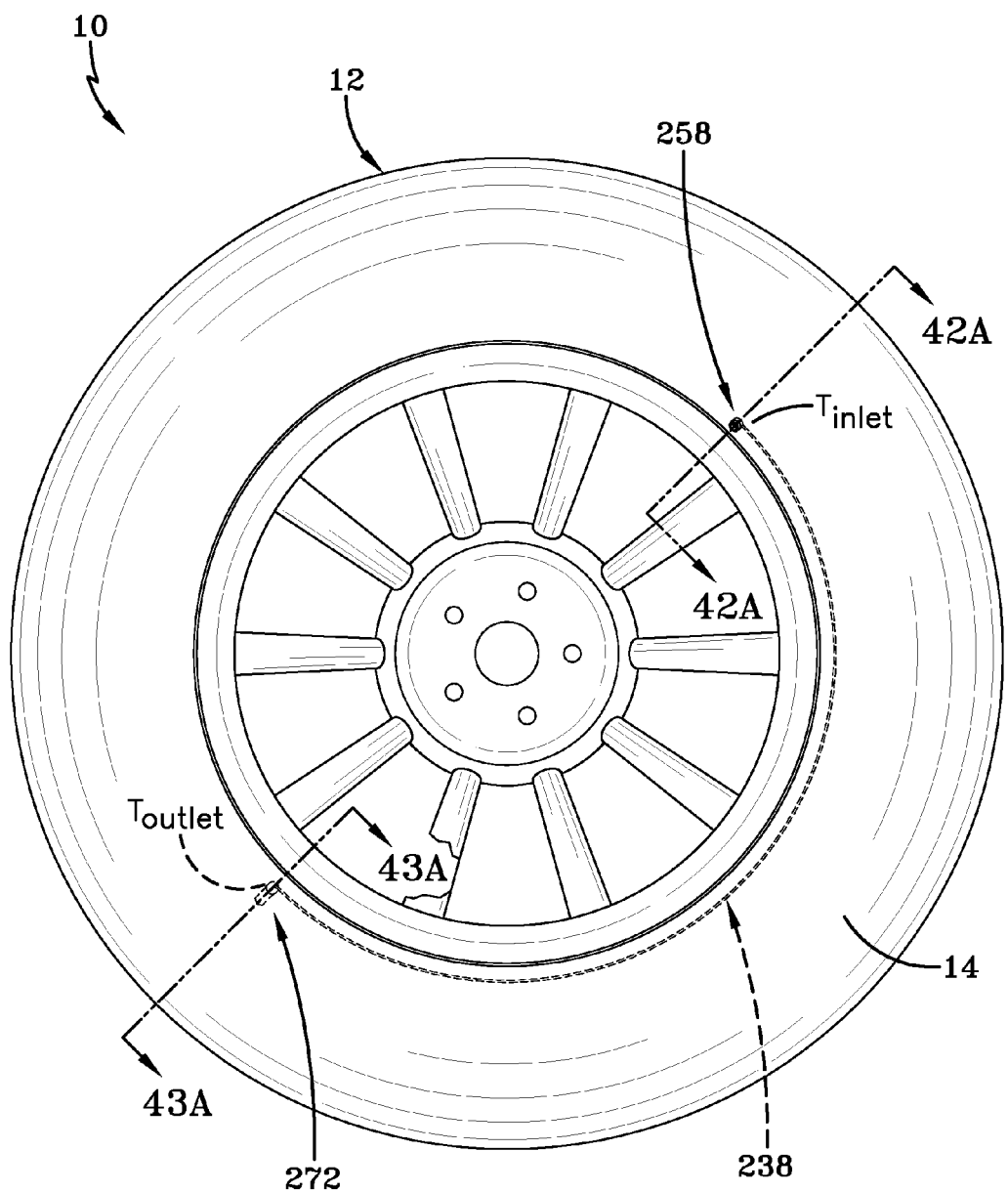
FIG. 41 is a side view of the finished 2nd embodiment tire assembly.

FIG. 38 shows a post-cure tire with the protective caps 292 being removed from both the inlet and outlet dome nuts 246, 268 respectively. The silicone strip assembly 104 is removed from the tire sidewall inlet cavity 132, leaving the vacated air passageway 238 enclosed within the chafer tire component 28 and extending between the inlet and outlet cavities 132, 134. FIG. 39 shows the filter assembly 258 threaded into the inlet dome nut 246. Air from outside of the tire accordingly follows a path through the filter 266, the dome nut 246, and into the air passageway 238. FIG. 40 shows the one-way valve assembly 272 previously described threaded onto the outlet dome nut 268 and positioned to reside and project into the tire cavity 20. FIG. 41 shows the post-cure second embodiment of the tire assembly with the chafer enclosed air passageway extending 180 degrees between the inlet cavity insert assembly 258 and the outlet cavity insert assembly 272.

Figure 42A:
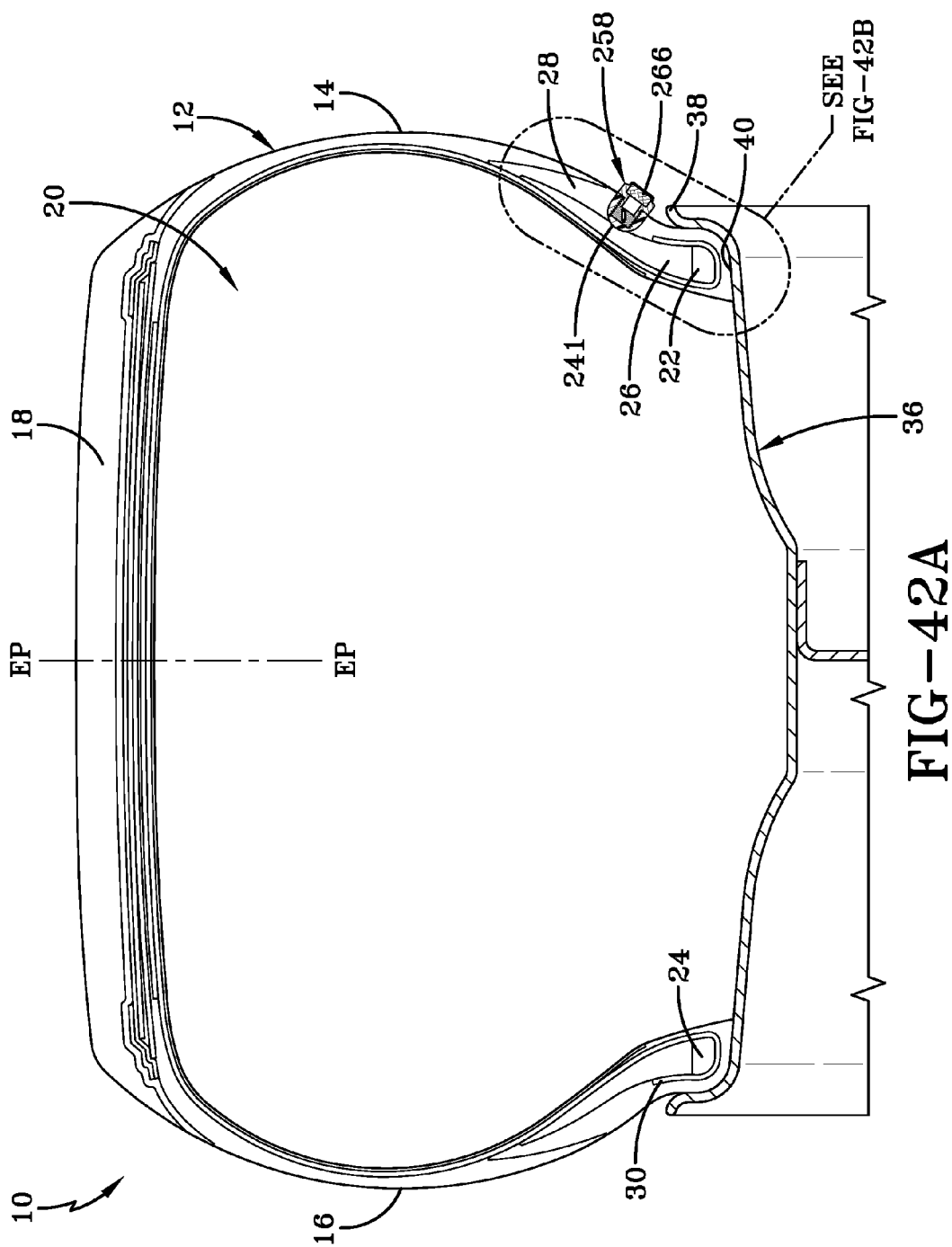
FIG. 42A is a section view taken from FIG. 41 showing the location of the inlet dome nut with attached filter.
Figure 42B:
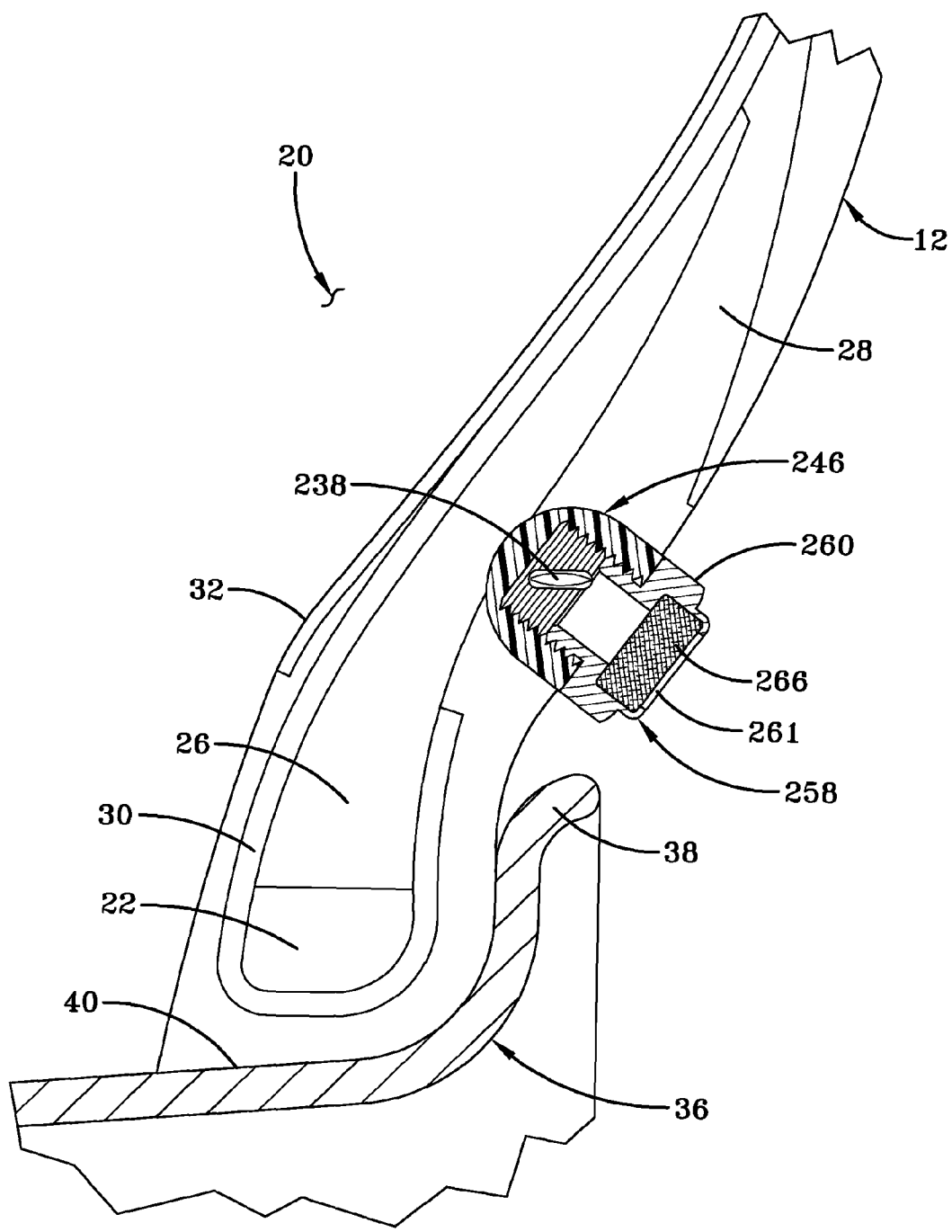
FIG. 42B is an enlarged view of the inlet and filter taken from FIG. 42A.
Figure 43A:
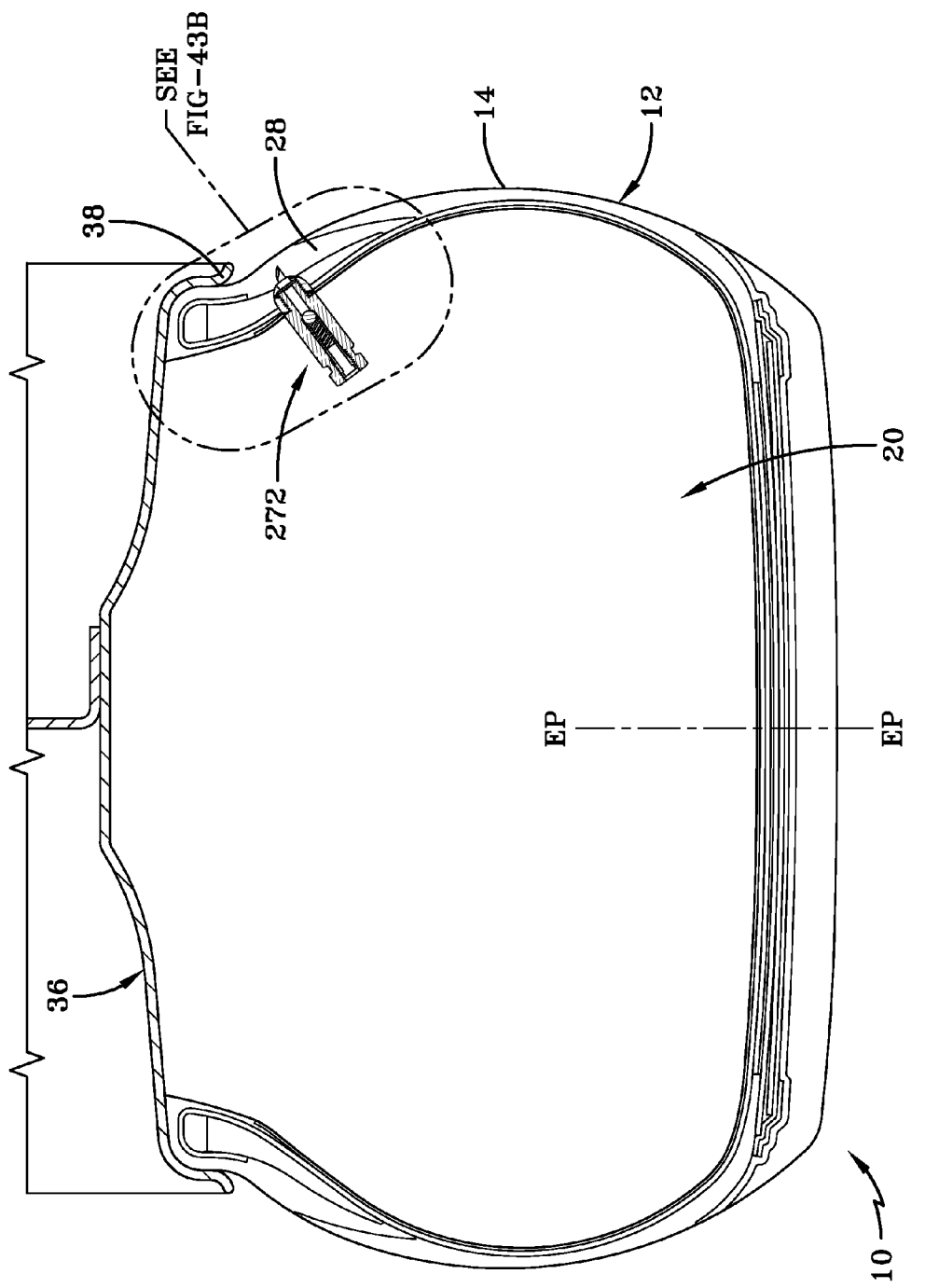
FIG. 43A is a section view taken from FIG. 41 showing the location of the outlet dome nut with attached one-way valve.
Figure 43B:
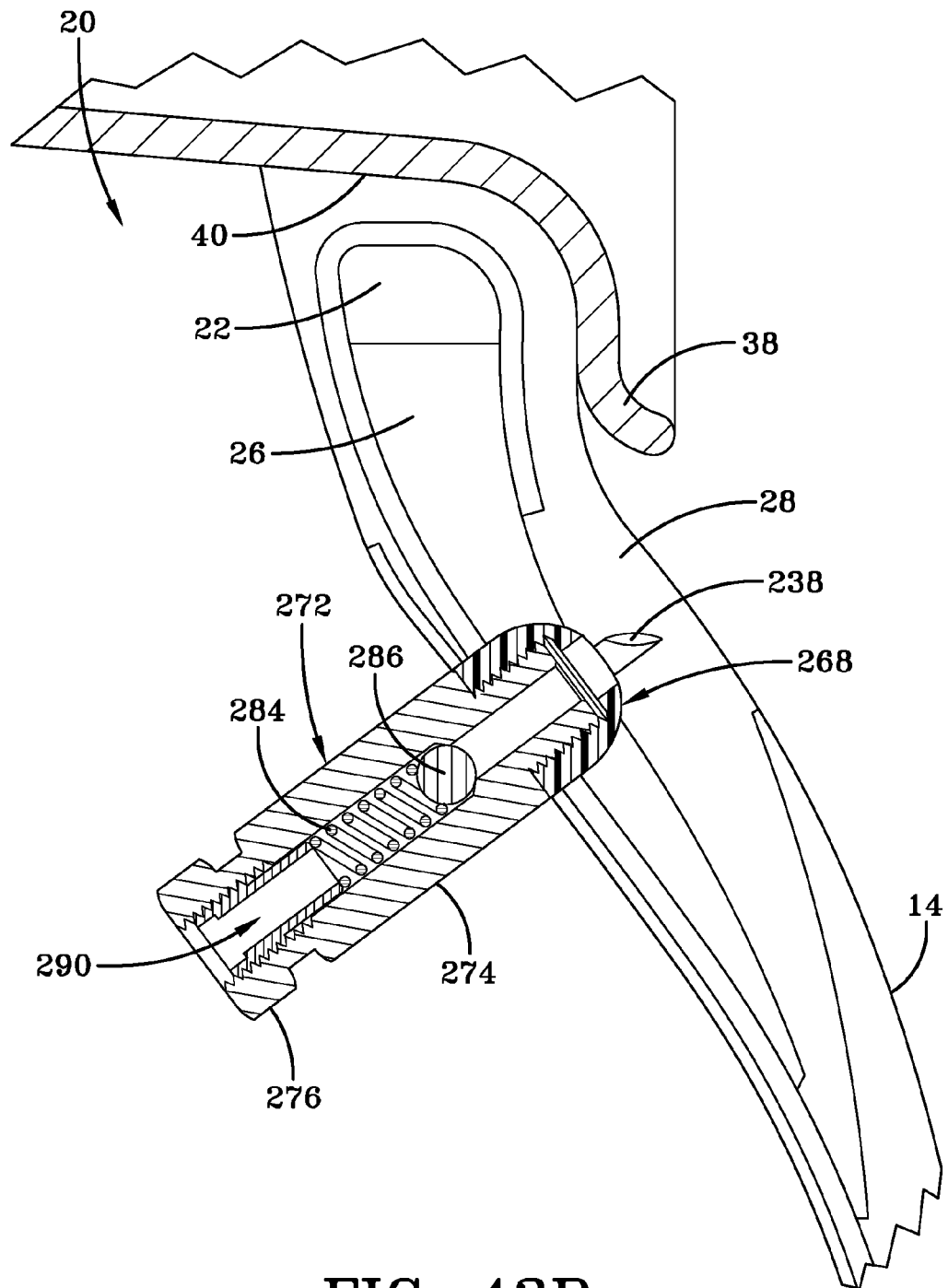
FIG. 43B is an enlarged view of the outlet dome nut and one-way valve taken from FIG. 43A.

FIGS. 42A and 42B show the location of the inlet dome nut 246 and filter assembly 258 within the chafer 28 at a lower region of sidewall 14. At such a location, the inlet assembly is located radially above the rim flange 38 so that damage to the assembly from the rim flange is avoided. FIGS. 43A and 43B show the location of the outlet dome nut 268 and valve assembly 272 connected and located within the chafer 28 at a lower region of sidewall 14, radially above rim flange 38.

Figure 44:
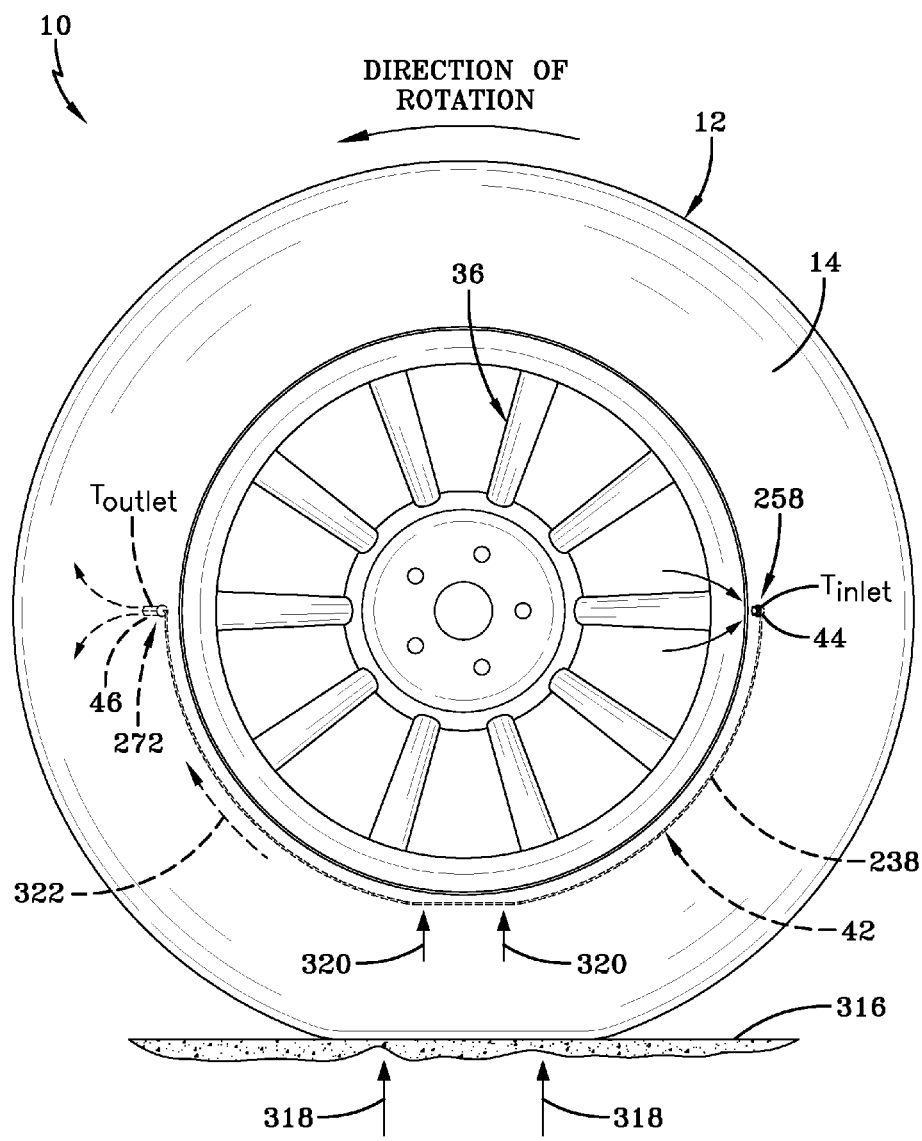
FIG. 44 is a side view of the finished tire showing air flow from inlet to outlet located in the tire cavity.

FIG. 44 shows the air maintenance assembly 42 in the post-cure tire 12 in operation and rolling against the ground surface 316. The air maintenance assembly 42 represents a peristaltic air pump system in which a compressible air passageway 238 progressively pumps air along the passageway from the inlet to the outlet and there to the tire cavity as required to maintain internal tire cavity pressure at a required level. As will be appreciated from FIG. 44, the inlet assembly 258 and the outlet assembly 272 are positioned generally 180 degrees apart, separated by the internal chafer air passageway 238. The tire rotates in a direction of rotation indicated, causing a footprint to be formed against the ground surface 316. A compressive force 318 is directed into the tire from the footprint and acts to flatten a segment of the air passageway 238 opposite the footprint as shown at 320. Flattening of the segment of the passageway 238 forces air from the segment along internal passageway 238 in the direction 322, toward the outlet assembly 272.

As the tire continues to rotate in the direction indicated along the ground surface 316, the air passageway 238 within the chafer component will be sequentially flattened or squeezed opposite the tire footprint segment by segment in direction 322 opposite to the direction of tire rotation. The sequential flattening of the air passageway 238 segment by segment causes evacuated air from the flattened segments to be pumped to the outlet assembly 272. When the air flow pressure is sufficient against the outlet valving mechanism, whether embodied as the ball valve (FIGS. 33A, 33B, 33C), the membrane valve (FIGS. 17A, 17B), the Lee valve (FIGS. 16A, 16B) or other known substitute valving mechanisms, the valve will open and allow air to flow through the outlet assembly 272 to the tire cavity 20. Air exiting the outlet assembly 272 is routed to the tire cavity 20 and serves to re-inflate the tire to a desired pressure level.

With the tire rotating in direction 322, flattened tube segments are sequentially refilled by air flowing into the filtered inlet assembly 258 along the passageway 238. The inflow of air from the inlet assembly 258 continues until the outlet assembly 272 passes the tire footprint. When the tire rotates further, the inlet assembly 258 will eventually pass the tire footprint against ground surface 316, and airflow resumes to the outlet assembly 272 along the passageway The above-described cycle is then repeated for each tire revolution, half of each rotation resulting in pumped air going to the tire cavity and half of the rotation the pumped air is directed back out the inlet assembly filter. It will be appreciated that while the direction of rotation is indicated, the subject tire assembly and its peristaltic pump assembly 42 will function in like manner in a (clockwise) reverse direction of rotation. The peristaltic pump is accordingly bi-directional and equally functional with the tire assembly moving in a forward or a reverse direction of rotation.

The location of the peristaltic pump, air maintenance assembly 42 will be understood from FIGS. 42A, 42B, 43A, 43B and 44. In the chafer component, the air passageway 238 is in a high flex region of the tire which causes a requisite flattening pressure from the tire rolling against ground surface 316 to be applied to passageway 238. The air maintenance passageway 238 is integrated into and enclosed by the chafer tire component to prevent air leakage that would otherwise degrade the operational efficiency of the pump. Other tire components having high-flex regions may alternatively employed for location of the air maintenance assembly 42 if so desired. For example, without intent to delimit such alternative components and locations, the assembly 42 may be incorporated at a more radially outward location in the tire sidewall 14. The passageway 238 would, in similar manner to that described previously, be deployed within a sidewall ply component during green tire build.

Pursuant to the foregoing, it will be appreciated that a method of constructing a tire having an associate air maintenance pumping assembly results. The method includes: constructing an elongate strip core 58; encasing the strip core 58 into a containment within an uncured flexible tire component (preferably but not necessarily chafer strip 70), the strip core extending between an air inlet cavity or cavity 132 and an air outlet cavity or cavity 134 in the flexible tire component; building on a tire building drum 116 a green tire carcass from tire components including the flexible tire component and encased strip core; curing the green tire carcass into a cured finished tire 10 including the flexible tire component 170 containing the strip core 58; removing the encased strip core 58 from the cured flexible tire component to leave within the flexible tire component a substantially unobstructed air passageway 238; and inserting a post-cure air inlet assembly 240 or 258 or 272 into the air inlet cavity 132 and a post-cure air inlet assembly 198 or 210 into the air outlet cavity 134.

It will further be appreciated in the preferred method that the strip core 58 (or 104 as encased by rubber gum strip 92) is longitudinally removed by a free end from the cured flexible tire component, chafer strip 70, generally tangential to the tire carcass, by means of drawing on the free end 108 of the strip core and extending the air outlet assembly 198, 210 inward through a tire sidewall by means of utilization of punch 138 into communication with the tire cavity 20.

The preferred method further includes inserting a pre-cure temporary air inlet assembly 170 into the air inlet cavity 132 prior to curing the green tire carcass; and inserting a temporary air outlet assembly 136 into the air outlet cavity 134 prior to curing the green tire carcass; and removing the temporary air inlet assembly 170 and the temporary air outlet assembly 136 after curing the green tire carcass, to be replaced by the permanent post-cure inlet assembly (240 or 258 or 272) and post-cure permanent outlet assembly. The temporary inserts at the inlet and outlet positions serve to keep the cavities 132, 134 open during tire cure for eventual post-cure insertion of the permanent inlet and outlet cavity assemblies.

The method also includes encasing the strip core into a containment within the uncured flexible tire component by forming, preferably by an extrusion, a channel or tube 80 into the uncured flexible tire component (chafer strip 70) defined by channel sidewalls 82, 84 and a channel bottom wall 86; inserting the strip core 104 into the channel; and collapsing a flexible channel sidewall or flap 114 to enclose the sidewall 82 over the strip core 104. The uncured flexible tire component is preferably a tire chafer component but other alternative tire components may be substituted so long as the tire components exhibit sufficiently high flexure during tire rotation to progressively collapse the air passageway 238 in a rolling tire footprint.

It will further be appreciated that the temporary cavity insert assemblies at the inlet and outlet cavities 132, 134 provide a connector system that is flexible and multi-purpose. In the air maintenance tire and connector system thus provided, the elongate integral air passageway formed by the silicone strip assembly 104 at the pre-cure tire build stage, and by the vacated air passageway 238 post-removal of the assembly 104 in a post-cure procedure. The connector assembly represented by the connectors in FIGS. 14A through 14D (outlet core assembly 136) and in FIGS. 15A through 15C (inlet core assembly 170) each include a hollow body having a central chamber, a protruding coupling funnel housing end extending from the hollow body to couple into the air passageway, and a through-channel extending through the funnel housing end to the central chamber. The connector assembly further provides, in the outlet core assembly 136, a dependant coupling post 146 extending from the hollow body. The coupling post 146 an axial length sufficient to project inward from the cavity 134 through a tire wall thickness to the tire central cavity 20. The axial air conducting through- bore extends through the coupling post 146 from the hollow housing central cavity 148 to a remote end of the coupling post positioned within the tire central cavity 20. The remote end of the coupling post 146 is operative for sequential alternative attachment to: the punch device 138 for penetrating through the tire wall thickness to the tire central cavity 20 in post-tire build, pre-tire cure procedure in which the assembly 136 is inserted into its cavity 134; a capping nut 140 attaching to the remote end of the coupling post 146 operative to enclose the axial post through-bore throughout the tire curing procedure; and a valve device attaching post-curing of the tire to the remote end of the coupling post, the valve device such as at numeral 204 operative to regulate air flow between the hollow housing into the tire cavity.

The connector system described and shown in the dome nut embodiment of FIGS. 30A through 30G, 31A through 31C, 32A through 32D and 33 through 44 (inclusive) includes a hollow dome-shaped nut body 246, 268, 270 having a central chamber 250 within the nut body opening to an outward body side; and a through-channel 254 extending through the nut body operative to conduct air flow communication between the integral air passageway 238 within the chafer 28 (or other flexible tire component selected) and the central chamber 250 of the nut body. A hollow dome-shaped inlet nut 246, 270 is seated within the inlet cavity 132 and a hollow dome-shaped outlet nut 268 within the outlet cavity 134, with the outlet and inlet nuts oriented within respective cavities to face in opposite directions. The inlet nut 268 or 270 couples to air inlet filter device 258 (an air inlet device) for conducting air external to the tire carcass into the inlet nut central chamber 250; and the outlet nut 268 couples to outlet valve assembly 272 (a valve device) positioned within the tire cavity 20. The valve device 272 is operative to regulate a flow of air from the outlet dome nut body 248 to the tire cavity 20.

It will further be noted that the connector and tire assembly utilizes and includes the removable elongate silicone strip assembly 104 to form the air passageway 238 during a pre-cure build of the tire carcass as described. As explained, the strip assembly is withdrawn post-cure from the air passageway 238 of the tire carcass. The through-channel 254 in the nut bodies of the inlet nut and the outlet nut have a cross-sectional configuration to closely admit a respective opposite free end 106, 108 of the core strip therethrough. The through-channel 254 in the nut bodies may be alternatively located at the crown apex region or in a sidewall location.

The chafer component strip 70, as will be appreciated from FIGS. 6 through 11 inclusive, represents a flexible tire component strip forming a portion of the tire carcass 12. The tire component strip in the form of chafer strip 70 provides the channel 90 within an upper surface defined by opposed strip lip portions 82, 84 and a channel bottom wall 86; the air passageway 238 formed within the flexible chafer tire component 70 extending between the air inlet cavity 132 and the air outlet 134 cavity in at least a partial circumferential, and preferably a 180 degree, path around the tire carcass 12. The elongate passageway-shaping strip assembly 104 occupies and forms the air passageway 238 of the flexible chafer tire component 70 during green tire build and tire cure. The passageway-shaping, silicone strip assembly 104 is operative to form and maintain the air passageway 238 to a desired cross-sectional configuration which replicates the cross-sectional configuration of the silicone strip assembly 104.

The passageway-shaping, silicone strip assembly 104 is removable from the air passageway 238 in a post-cure procedure. The free end portions 106. 108 are accessible at the air inlet and air outlet cavities, respectively, whereby the silicone strip assembly 104 may be removed by an axial withdrawal force application to the free end portion 106 or 108 of the silicone strip assembly 104.

It will be noted in FIGS. 5 and 10A through 10C, that the passageway-shaping strip assembly 104 has a generally elliptical cross-sectional configuration and is configured having a silicone core 58 encased by a sheath 92 composed of a release material such as a rubber composition. The flexible chafer tire component 70 increases side-to side (the axial direction in the tire carcass 12) in sectional thickness from the radially outward region 72 to the radially inward region 88. The channel 90 which becomes air passageway 238 resides within the radially inward, thicker region 88. The channel 90 is formed to extend into region 88, angling radially inward toward the radially outward region 72 as seen in FIGS. 10A through 10C at an angle $\theta$ within a preferred range −20 to +20 degrees.

With reference to FIG. 26, the preferred method of extracting the elongate strip assembly 104 from the air passageway defined by the assembly 104 occurs in a post-cure procedure. The assembly 104 is extracted longitudinally from occupancy within the flexible tire component (chafer 28), whereby defining the air passageway in 238 within the chafer component by the space previously occupied by the elongate strip assembly 104. The elongate strip free end portion 108 is accessible at the air inlet cavity 132 and the free end portion 106 at the air outlet cavity 134. The elongate strip assembly 104 is moved and extracted tangentially end to end relative to the tire carcass from the air inlet cavity 132 by a withdrawal force applied to the elongate strip free end 108. Alternatively, the assembly 104 may be extracted from the outlet opening 134 by means of free end 106. Application of the withdrawal force may be in the form of a tensile force applied to the free end portion 108 of the elongate strip assembly 104 alone or in conjunction with other extraction techniques. For example, without restriction intended, an extraction pneumatic system may be deployed to push the assembly 104 from the chafer channel. As will be understood, a pneumatic system (not shown) of known type may consist of an air blow gun on to which a nozzle is attached. The nozzle may be configured to thread into the outlet dome nut 268 (FIGS. 32A through 32D) cured into the outlet cavity 134. The gun delivers a volume of pressurized air into the passageway 238, forcing the silicone strip assembly 104 tangential to the tire carcass and out the inlet cavity 132. A lubricant such as a mixture of water and detergent may be injected along the silicone strip assembly to assist in achieving its extraction. Once the silicone strip 104 is withdrawn, an air inlet device as explained is inserted into the air inlet cavity 132 and an air outlet device into the air outlet cavity 134 in air flow communication with opposite ends of the defined air passageway 238.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance uncured tire assembly comprising:
an uncured tire carcass;
a flexible tire component strip forming a portion of the tire carcass, the tire component strip having a channel extending therein defined by opposed lip portions and a channel bottom wall;
an air passageway within the flexible tire component formed by a channel within the flexible tire component, the channel extending between an air inlet cavity and an air outlet cavity in the flexible tire component, the channel forming the air passageway extending at least a partial circumferential path around the tire carcass;
an elongate passageway-shaping strip assembly occupying and enclosed within the channel of the flexible tire component, the passageway shaping strip assembly operative to form and maintain the channel to a cross-sectional configuration replicating a cross-sectional configuration of the passageway-shaping strip assembly.

2. The air maintenance uncured tire assembly of claim 1, wherein the passageway-shaping strip is removable from the channel.

3. The air maintenance uncured tire assembly of claim 2, wherein the passageway-shaping strip assembly comprises a free end portion accessible to at least one of the air inlet and air outlet cavities.

4. The air maintenance uncured tire assembly of claim 3, wherein the passageway-shaping strip assembly is operatively removable from the air passageway by a withdrawal force application to the free end portion of the passageway-shaping strip assembly.

5. The air maintenance uncured tire assembly of claim 4, wherein the passageway-shaping strip assembly has a substantially elliptical cross-sectional configuration.

6. The air maintenance uncured tire assembly of claim 5, wherein the passageway-shaping strip assembly has a core substantially composed of a silicone material.

7. The air maintenance uncured tire assembly of claim 6, wherein the passageway-shaping strip assembly has an outer sheath surrounding the core substantially composed of a rubber composition.

8. The air maintenance uncured tire assembly of claim 1, wherein the flexible tire component comprises a chafer component.

9. The air maintenance uncured tire assembly of claim 8, wherein the chafer component increases in sectional thickness from a radially outward region to a radially inward region, the channel residing within the radially inward region.

10. The air maintenance uncured tire assembly of claim 9, wherein the channel extends at an angle into an upper surface of the radially inward region toward the radially outward region.

11. The air maintenance uncured tire assembly of claim 10, wherein the passageway-shaping strip assembly is removable from the air passageway.

12. The air maintenance uncured tire assembly of claim 11, wherein the passageway-shaping strip assembly comprises a free end portion accessible to at least one of the air inlet and air outlet cavities.

13. The air maintenance uncured tire assembly of claim 12, wherein the passageway-shaping strip assembly is operatively removable from the air passageway by a withdrawal force application to the free end portion of the passageway-shaping strip assembly.

14. The air maintenance uncured tire assembly of claim 13, wherein the passageway-shaping strip assembly has a substantially elliptical cross-sectional configuration.

15. The air maintenance uncured tire assembly of claim 14, wherein the passageway-shaping strip assembly has a core substantially composed of a silicone material.

16. The air maintenance uncured tire assembly of claim 15, wherein the passageway-shaping strip assembly has an outer sheath surrounding the core substantially composed of a rubber composition.

17. The air maintenance uncured tire assembly of claim 1, wherein the channel forming the air passageway extends a circumferential path of substantially 180 degrees around a circumference of the tire carcass.

* * * * *